United States Patent [19]

Albo

[11] 4,301,911

[45] Nov. 24, 1981

[54] APPARATUS FOR HANDLING A TUBULAR CARTON BLANK

[75] Inventor: Ronald T. Albo, Los Gatos, Calif.

[73] Assignee: Pneumatic Scale Corporation, Quincy, Mass.

[21] Appl. No.: 58,483

[22] Filed: Jul. 18, 1979

[51] Int. Cl.$^3$ .................. B65G 47/24

[52] U.S. Cl. .................. 198/412; 493/180; 493/302

[58] Field of Search .................. 198/412, 411, 46; 414/783; 93/44, 44.1 R, 44.1 GT, 59 ES; 493/180, 302, 175, 176, 126, 162

[56] References Cited

U.S. PATENT DOCUMENTS

| | | | |
|---|---|---|---|
| 2,212,472 | 8/1940 | Hartmann | 93/44.1 R |
| 2,794,372 | 6/1957 | Goss | 93/49 R |
| 2,864,288 | 12/1958 | Engleson et al. | 198/411 X |
| 3,248,841 | 5/1966 | Heffelfinger et al. | 93/44.1 R |
| 3,259,297 | 7/1966 | Kalajian | 229/7 R |
| 3,370,515 | 2/1968 | Guzzardo | 93/44.1 R X |
| 3,378,128 | 4/1968 | Stevenson, Jr. et al. | 198/412 X |
| 3,687,352 | 8/1972 | Kalajian | 229/7 R |
| 3,749,300 | 7/1973 | Jones | 229/37 R |
| 3,759,366 | 9/1973 | Adank | 198/412 |
| 3,775,943 | 12/1973 | Jones | 53/282 |
| 3,800,677 | 4/1974 | Jones et al. | 93/36 DA |
| 3,815,484 | 6/1974 | Jones | 93/49 M |
| 4,011,984 | 3/1977 | Matovich, Jr. | 229/37 R |
| 4,037,370 | 7/1977 | Williams | 53/375 |
| 4,084,489 | 4/1978 | Matovich, Jr. | 93/36.8 |
| 4,123,966 | 11/1978 | Buschor | 93/49 R |

*Primary Examiner*—James F. Coan
*Attorney, Agent, or Firm*—Knobbe, Martens

[57] ABSTRACT

An apparatus and method is disclosed for forming a liquid-tight container having a rectangular cross-section formed from a one-piece, T-shaped blank of paperboard material. The carton preferably includes an access flap and straw element on one side thereof which, when manually lifted, exposes an end of the straw element from which the contents of the carbon may be consumed by a user. The apparatus is compact in nature, possessing relatively few transport mechanisms which advance the T-shaped carton blank through a plurality of work stations. A novel method and apparatus for serially applying the straw element and access panel to the carton blank is disclosed, wherein the straw element and a length of polyethylene coated Mylar tape is automatically bonded to the carbon blank upon a rotating heat sealing and alignment drum. A conveyor for collating a plural number of the carton blanks about a forming mandrel is also provided, and is positioned transversely to the remainder of the apparatus thereby significantly reducing the overall size of the apparatus. An ultrasonic welder bonds the side seams and end closure panels of the container upon a rotating crossbar mandrel which eliminates any misalignment during the sealing process. A substantially rigid conveyor transport carries a plurality of the carton blanks through pre-form, filler, and end closure work stations, and includes plural anvils for the ultrasonic welding process. An ejector mechanism is additionally provided which ejects the filled carton blanks from the rigid conveyor along a dual direction path, thereby eliminating the possibility of creasing or puncturing the filled and sealed container. The apparatus of the present invention additionally accommodates the production of differing size containers with only minor adjustments.

5 Claims, 79 Drawing Figures

Fig. 6
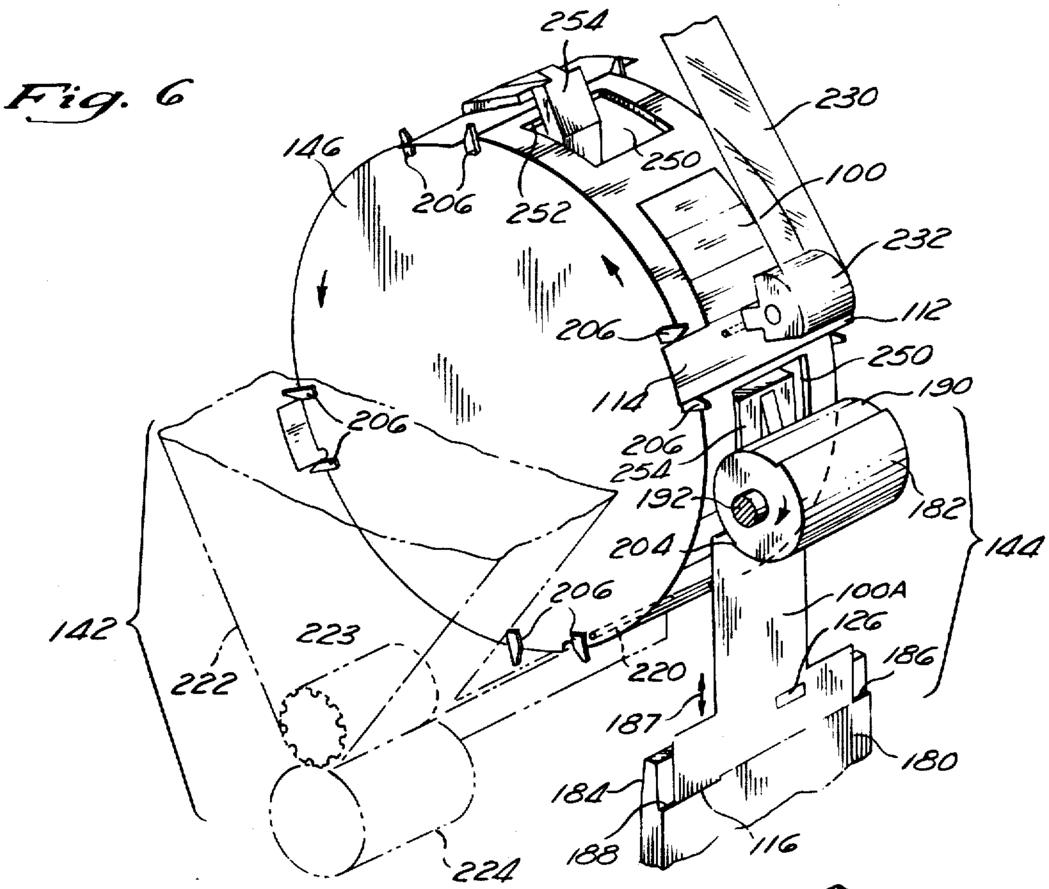
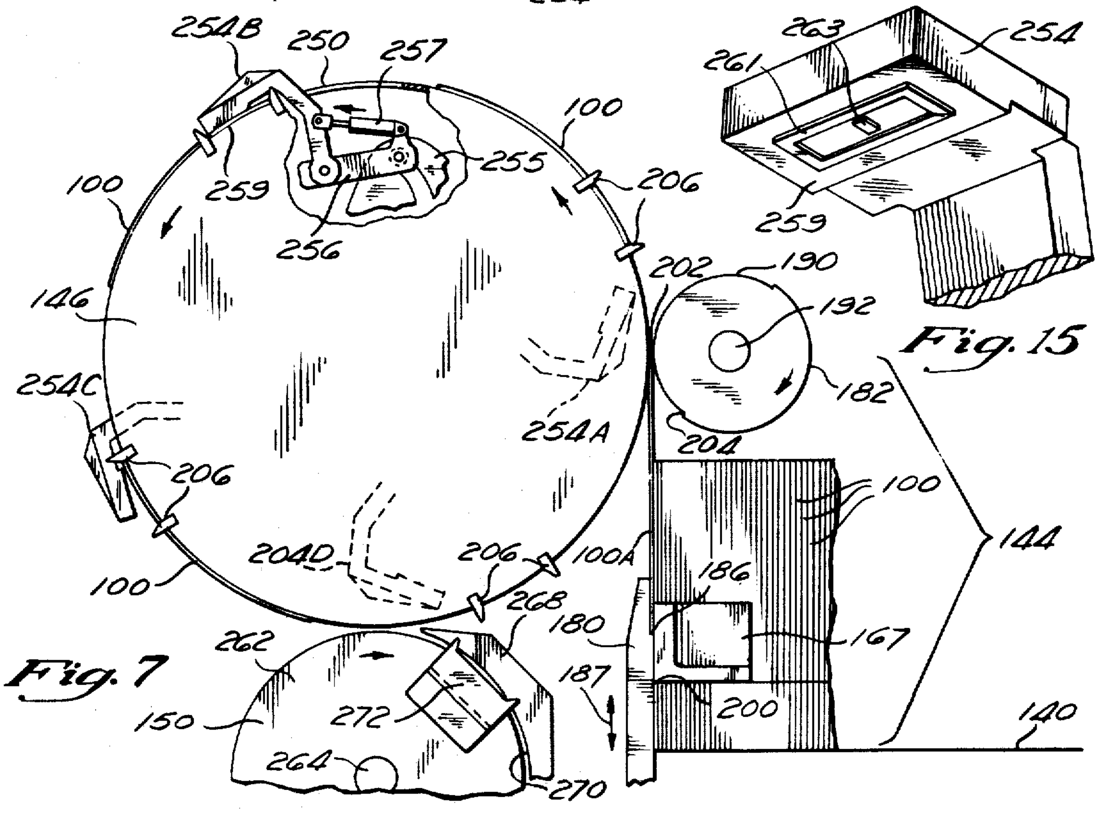
Fig. 7
Fig. 15

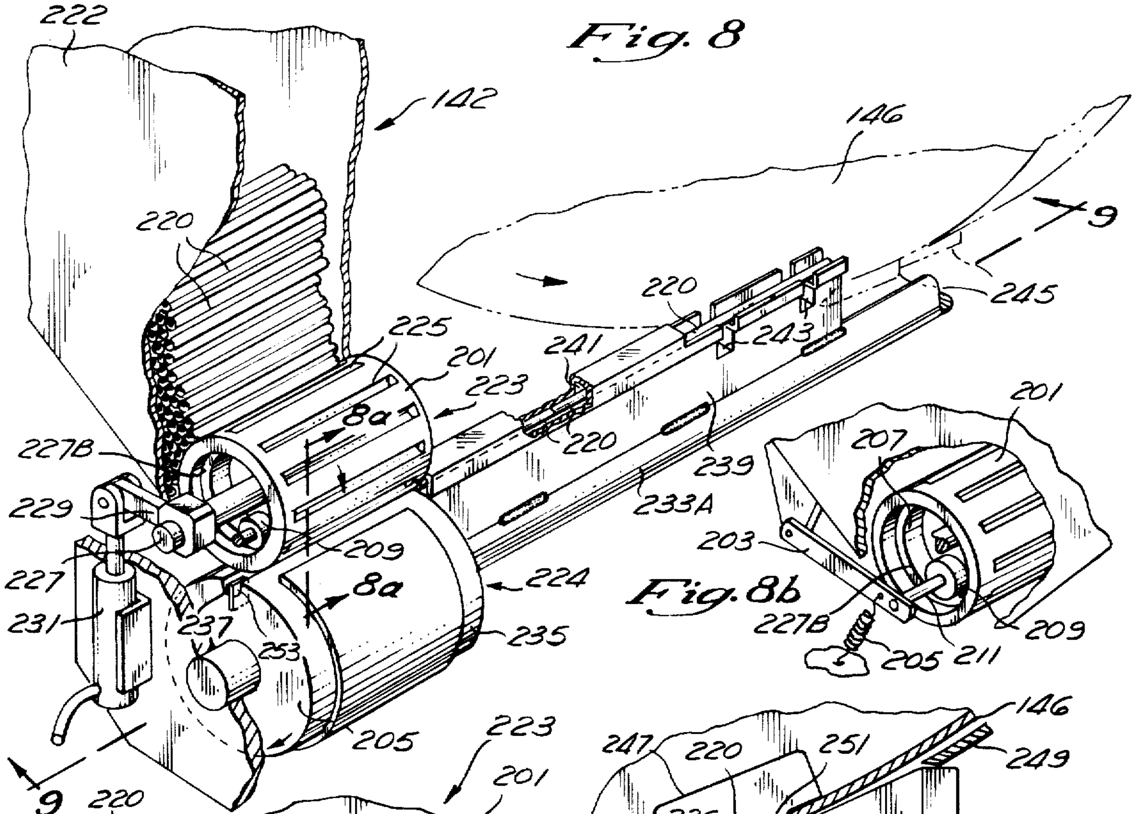
Fig. 8
Fig. 8b
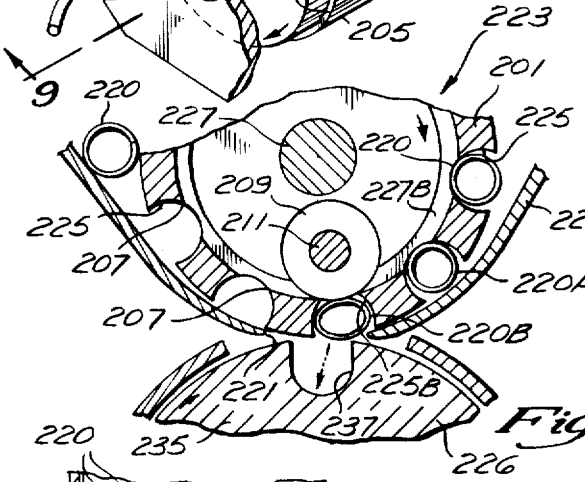
Fig. 8a
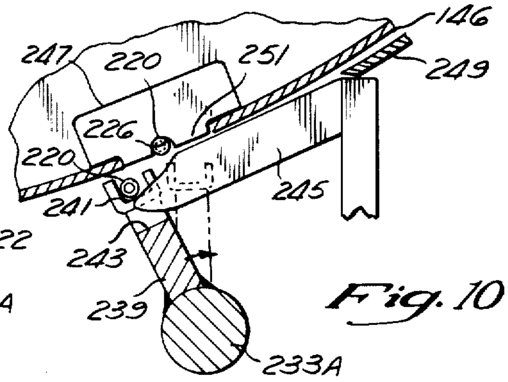
Fig. 10
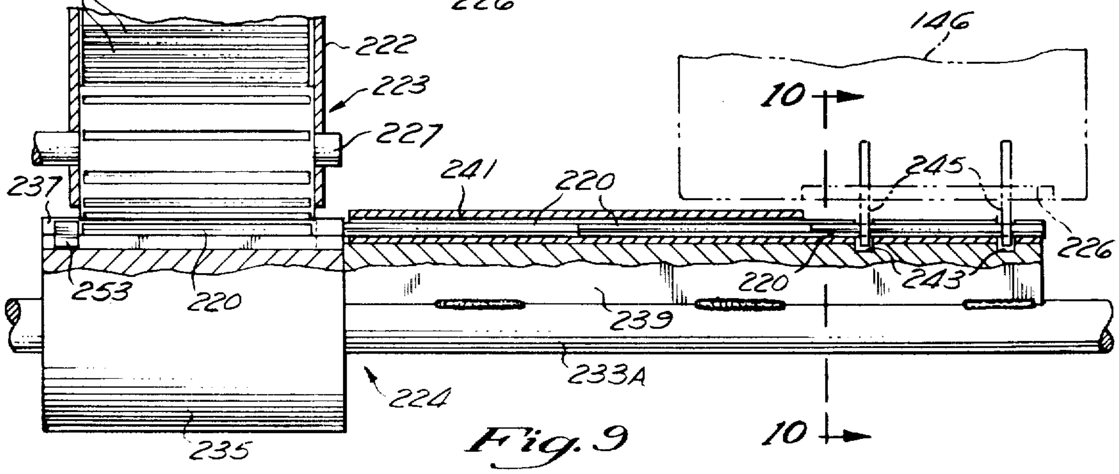
Fig. 9

Fig. 11
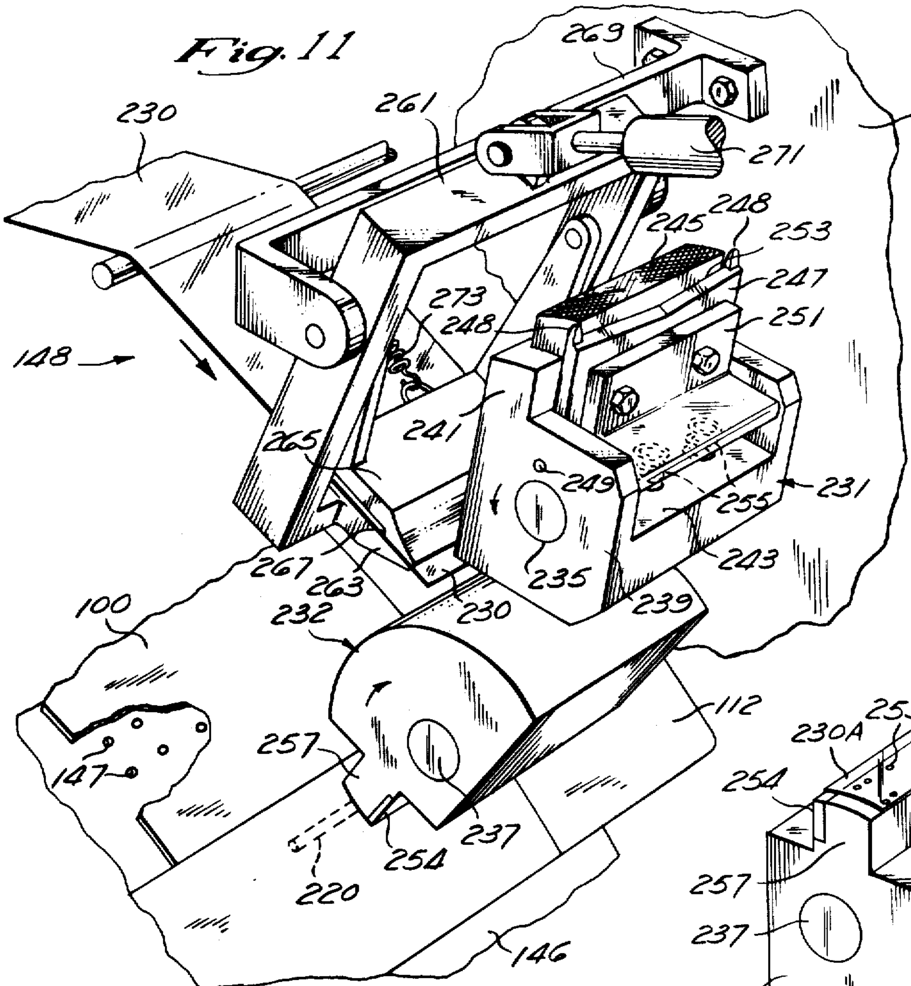
Fig. 12
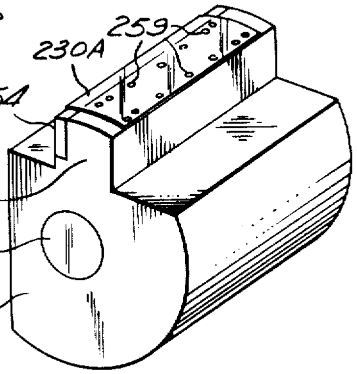
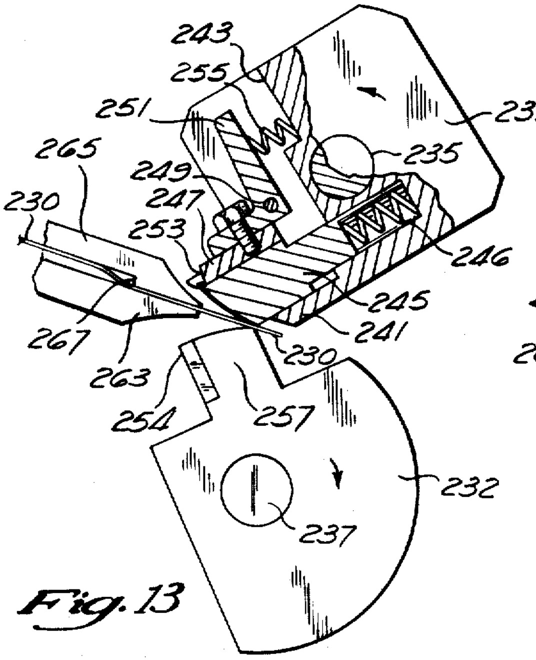
Fig. 13
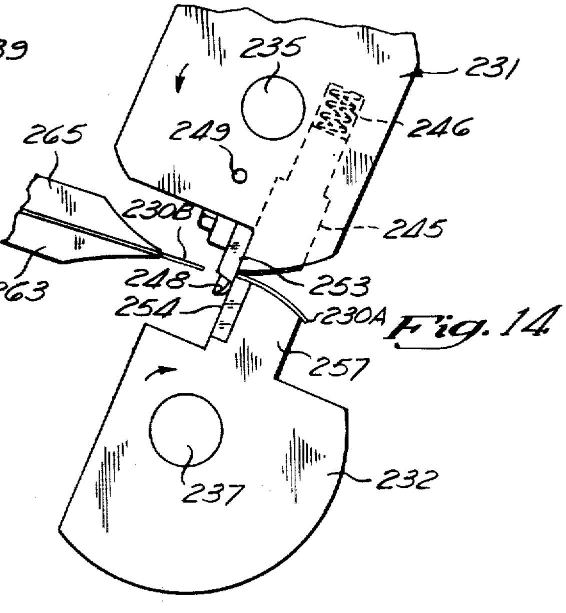
Fig. 14

Fig. 16
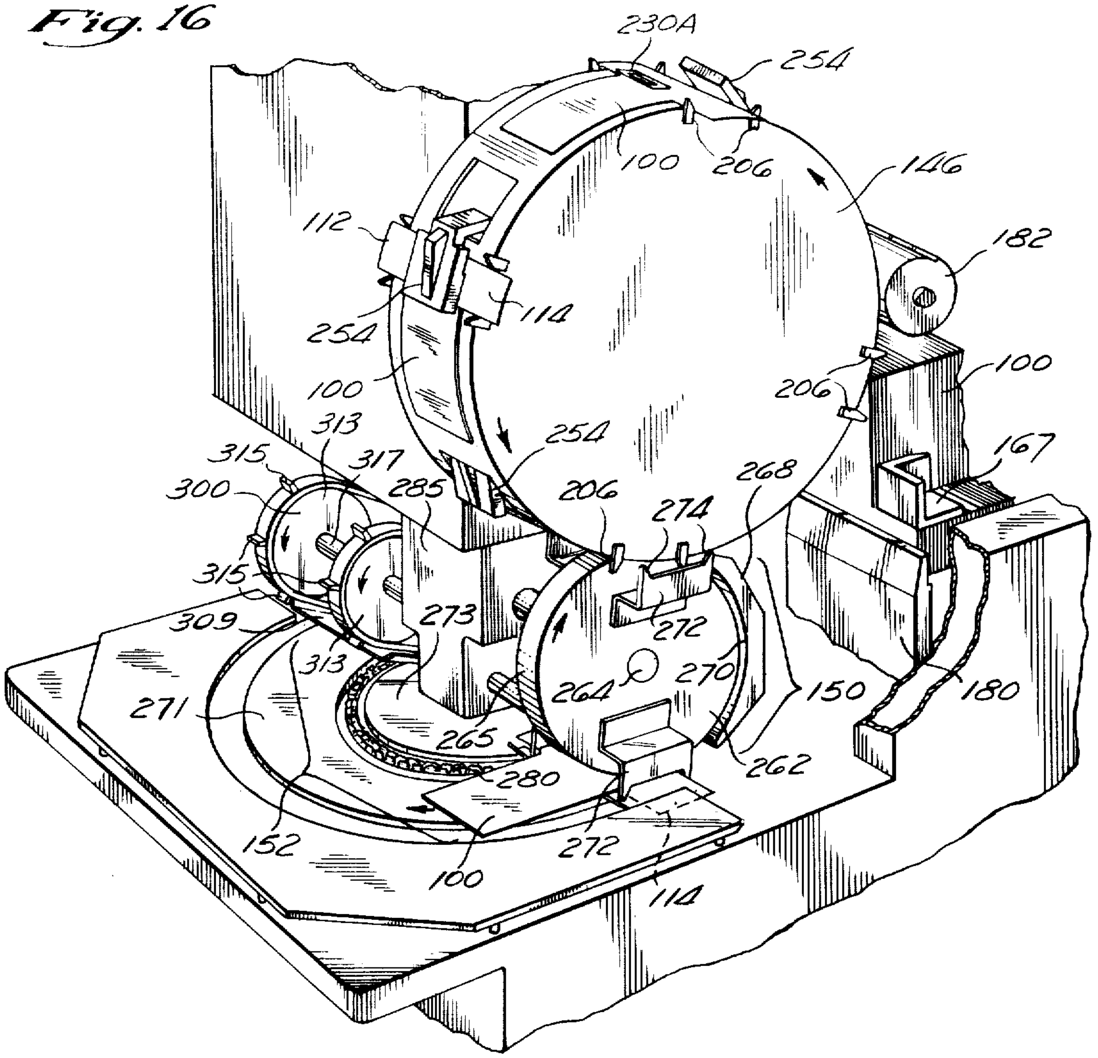
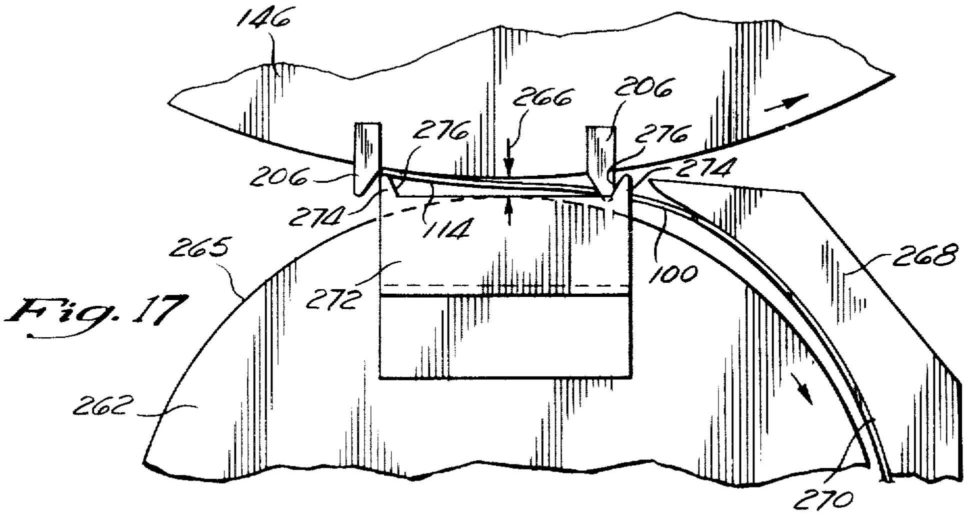
Fig. 17

Fig. 18
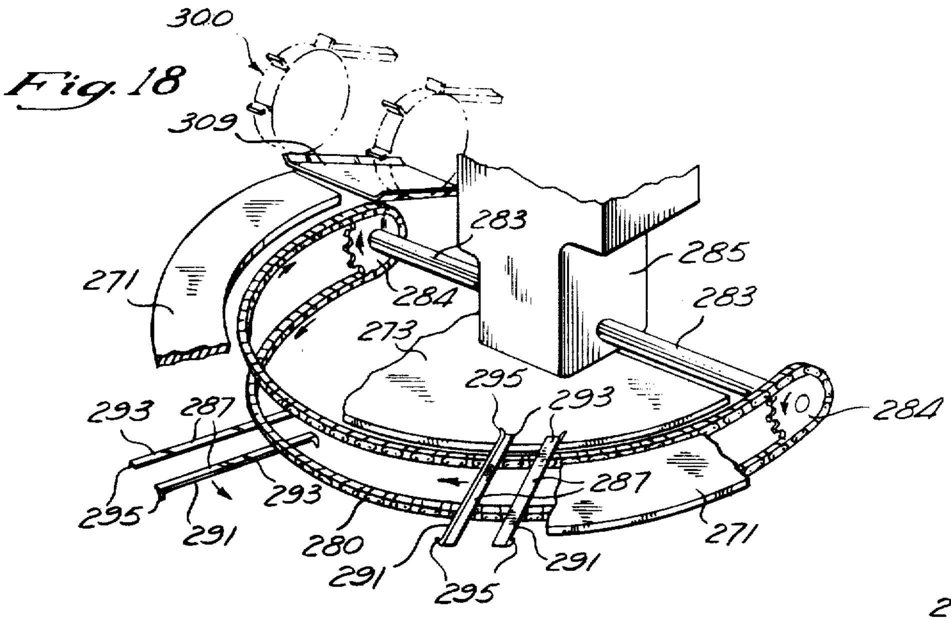
Fig. 19
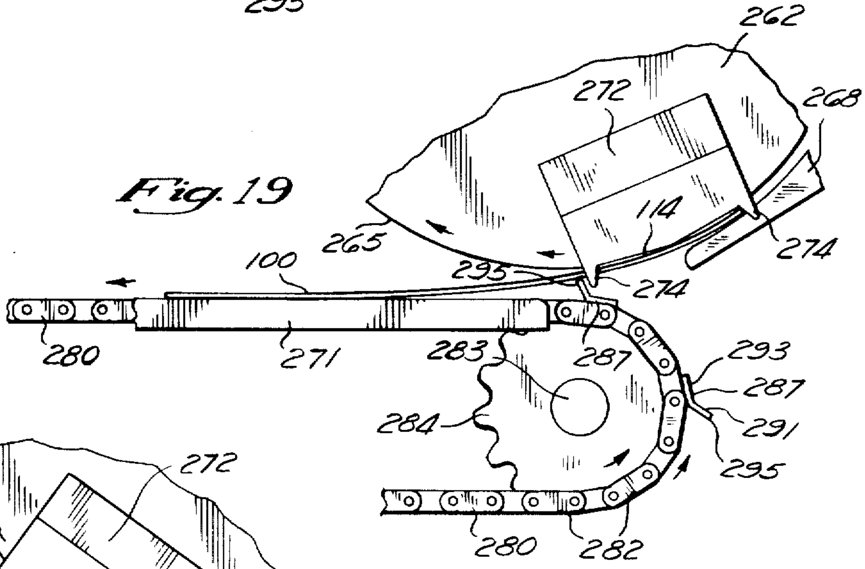
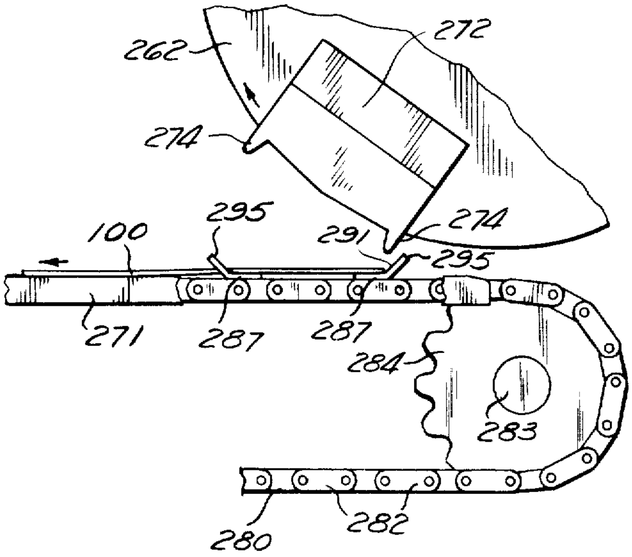
Fig. 19a

Fig. 23
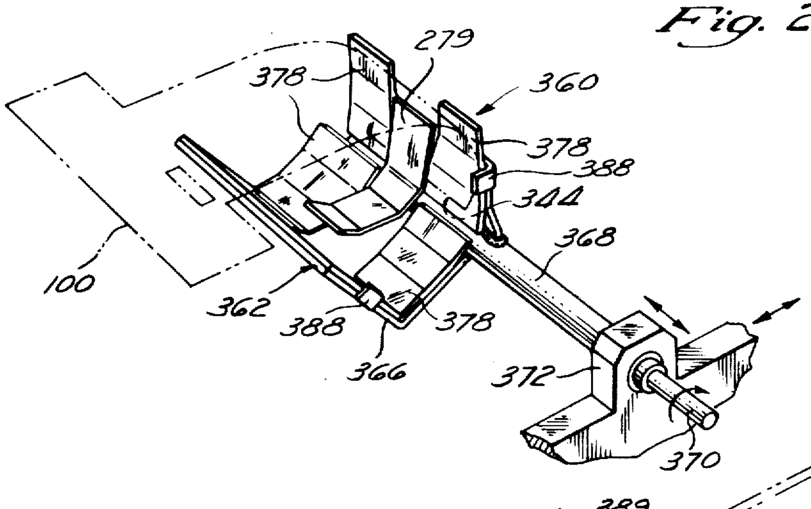
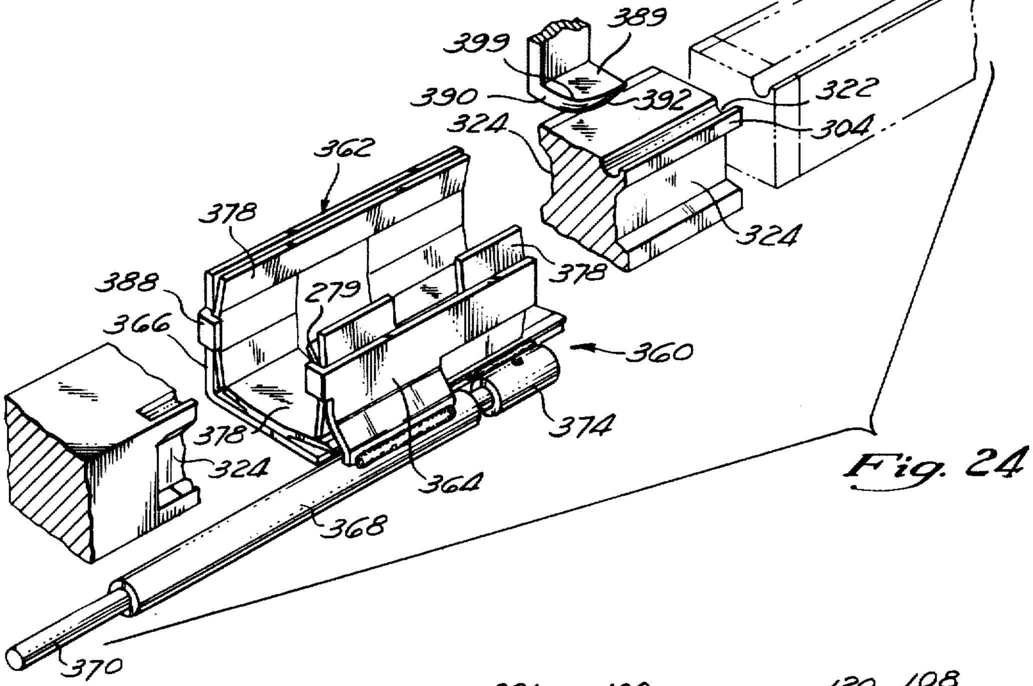
Fig. 24
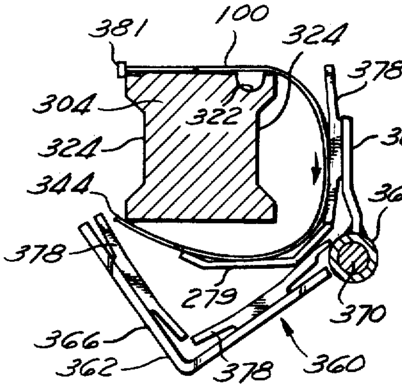
Fig. 25
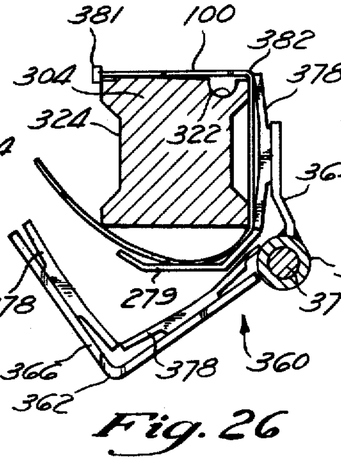
Fig. 26
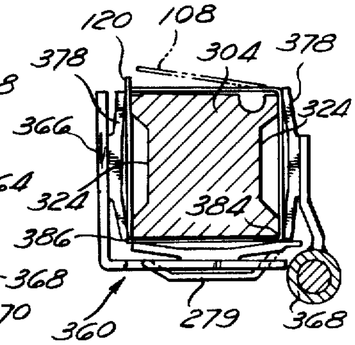
Fig. 27

Fig. 28
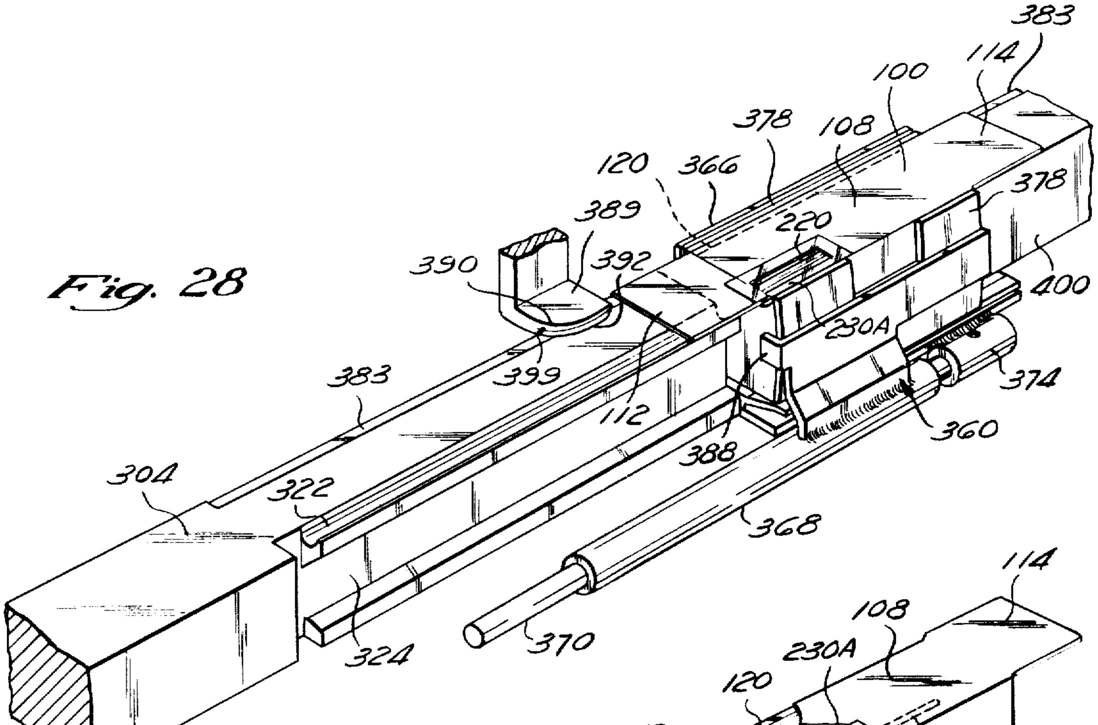
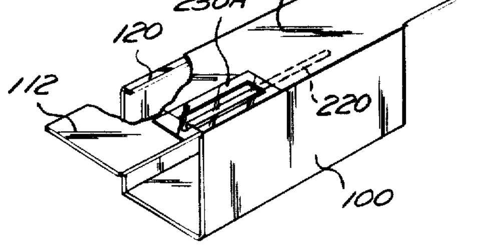
Fig. 29
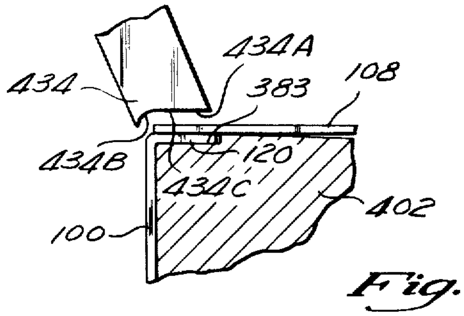
Fig. 28a

Fig. 30
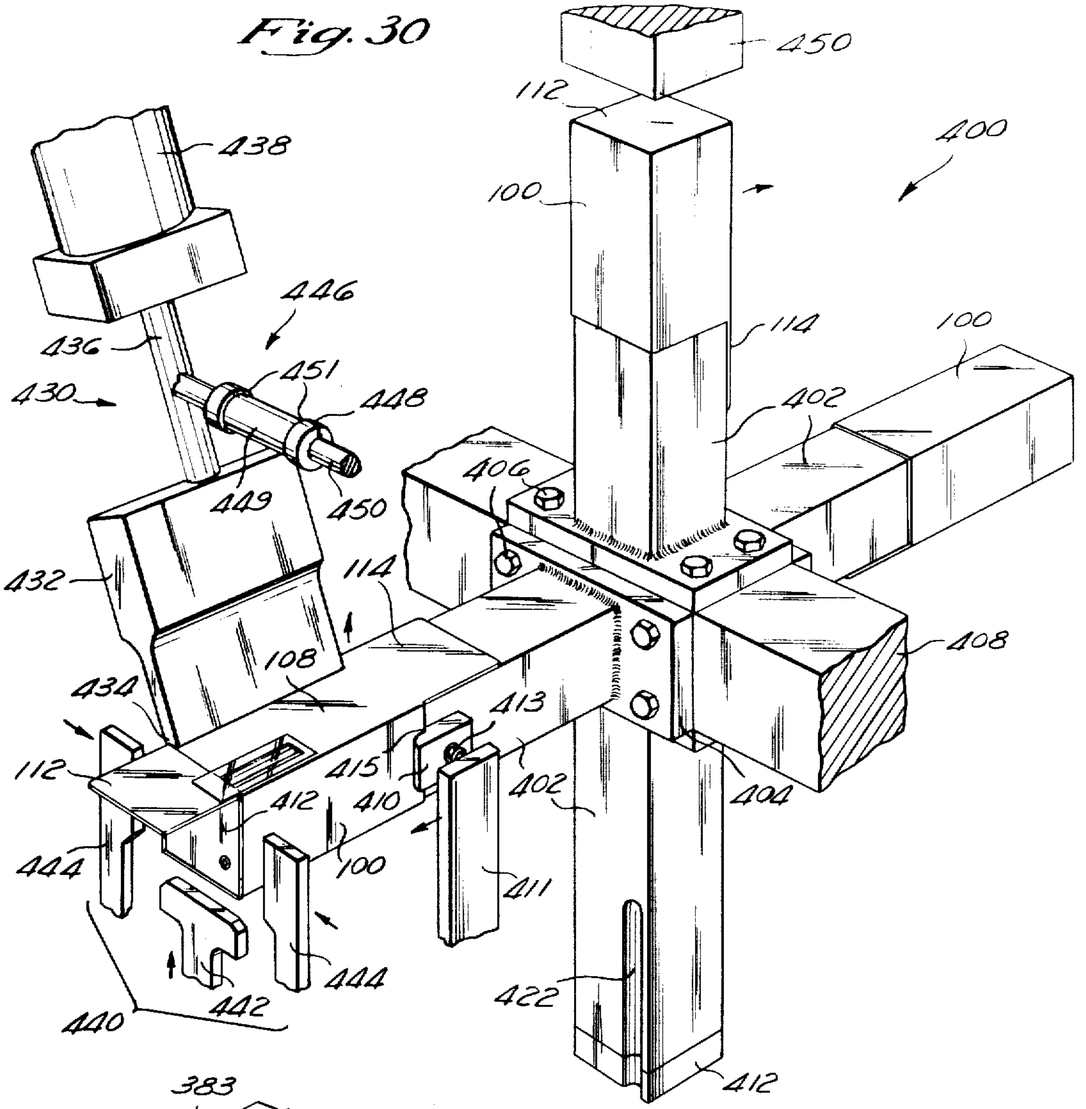
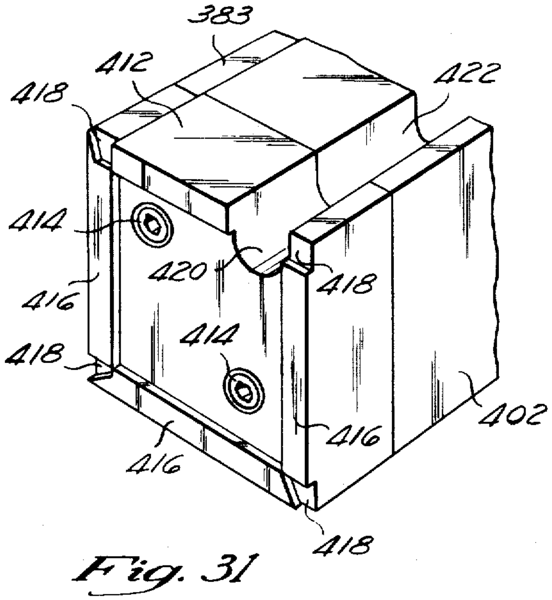
Fig. 31
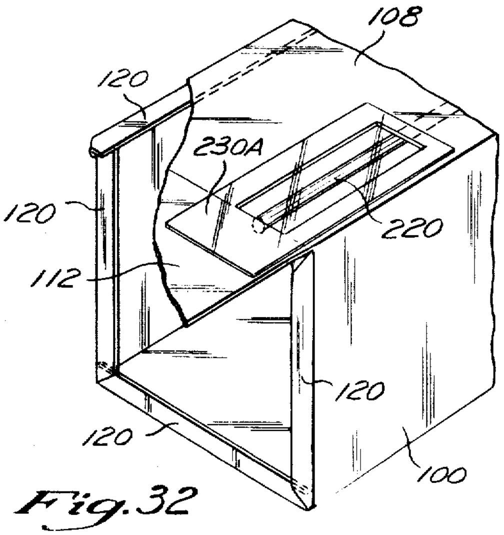
Fig. 32

Fig. 33
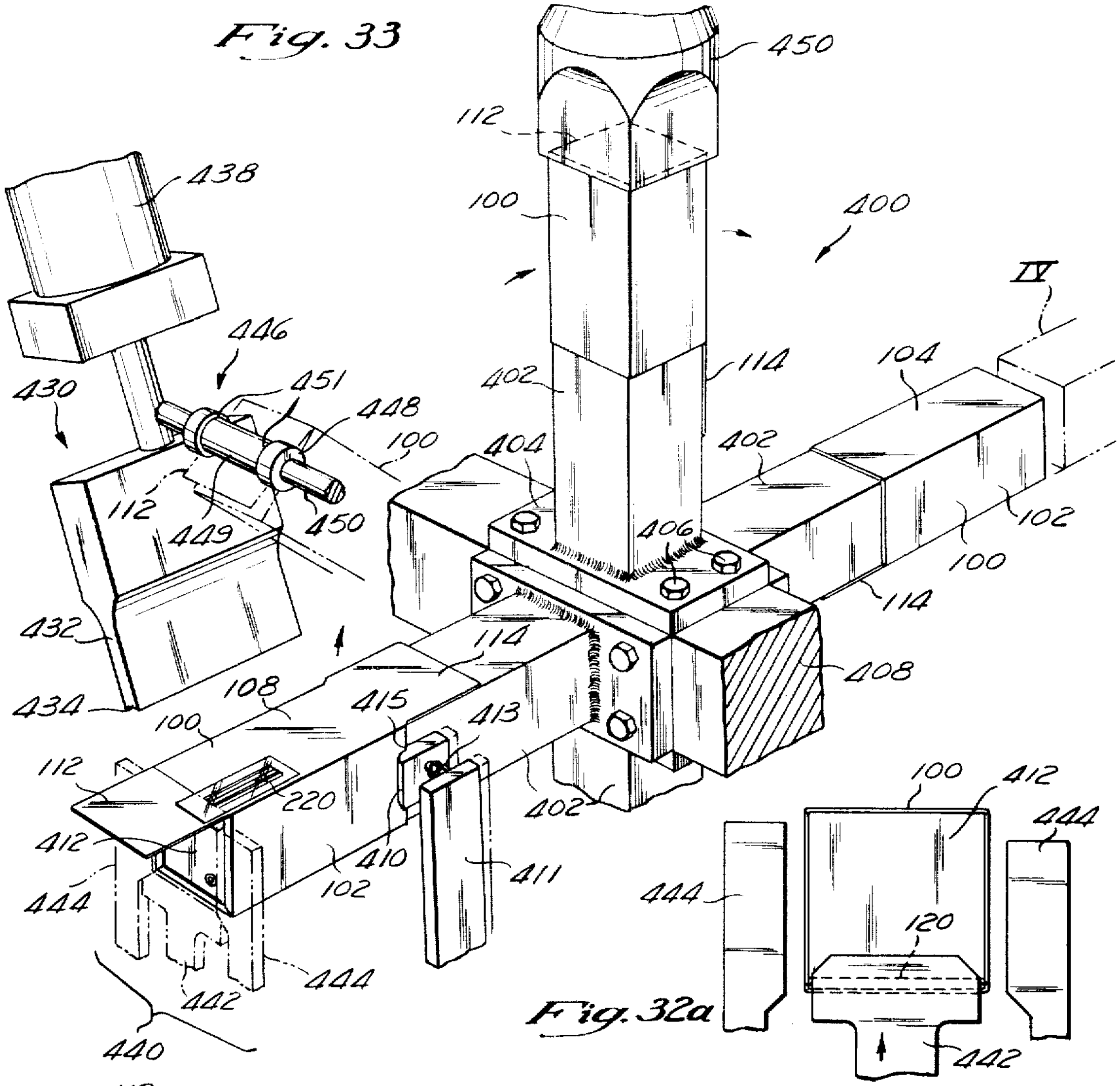
Fig. 32a
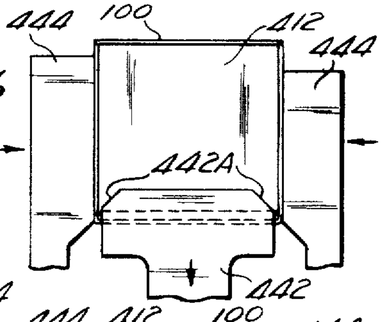
Fig. 32b
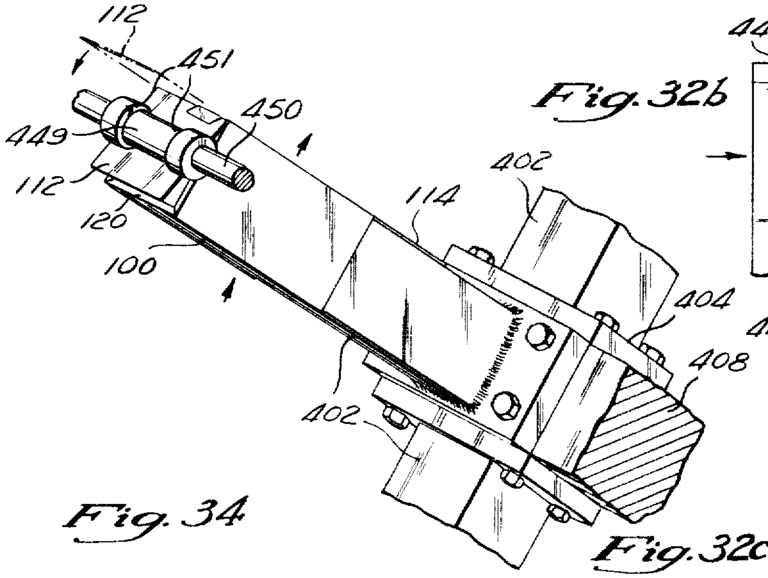
Fig. 34
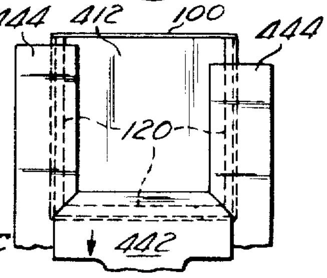
Fig. 32c Fig. 38
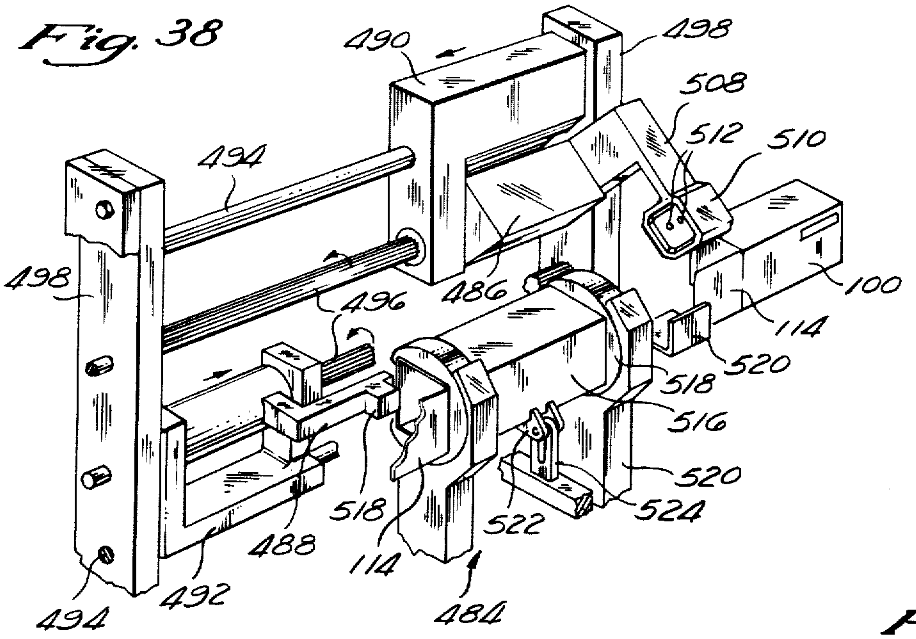
Fig. 40A
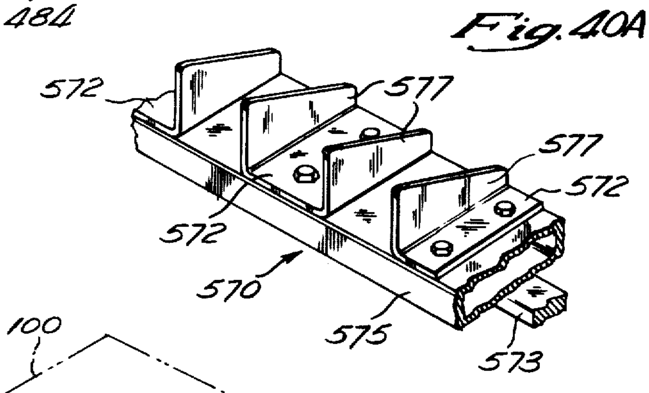
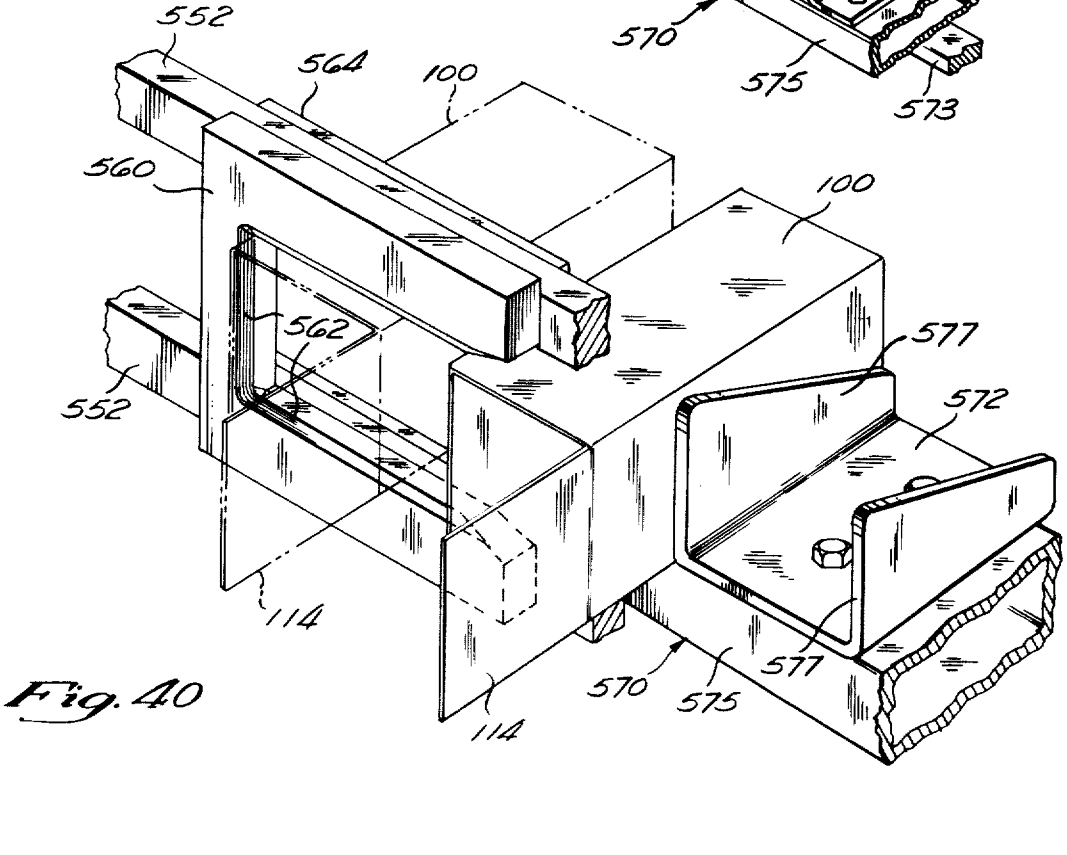
Fig. 40

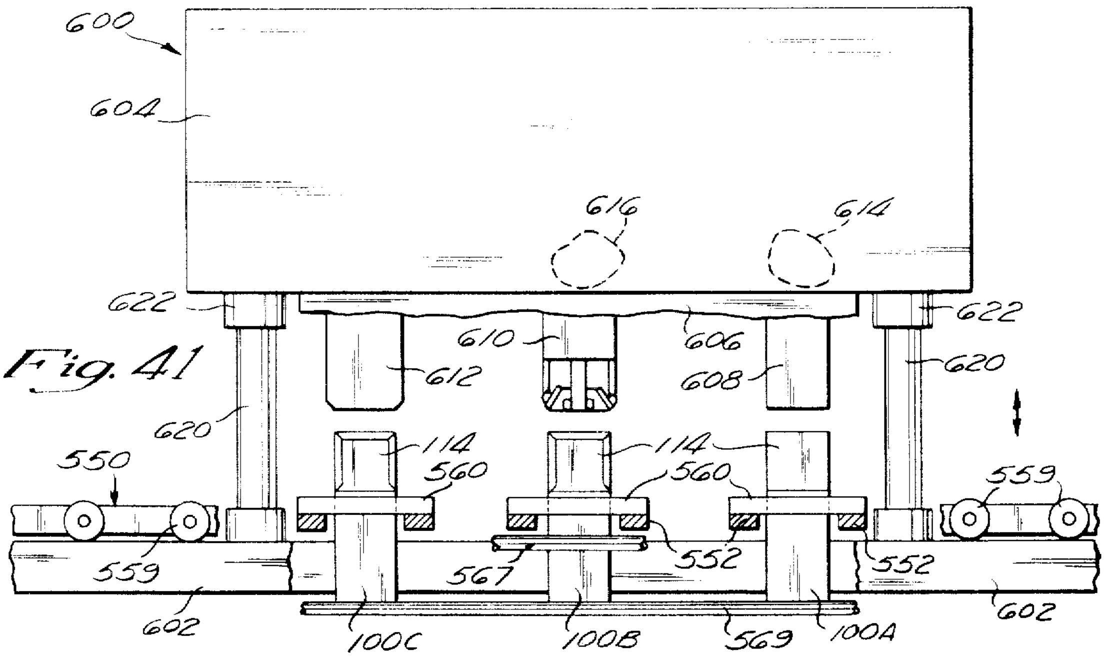
Fig. 41
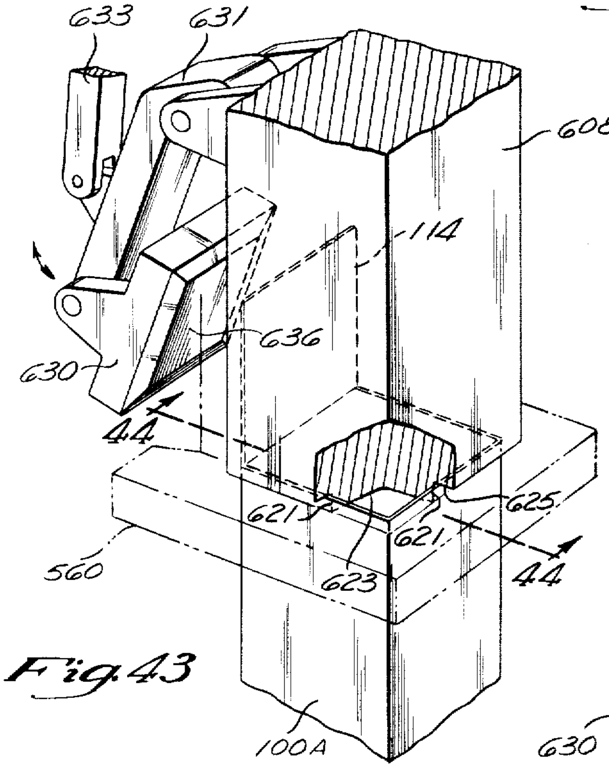
Fig. 43
Fig. 42
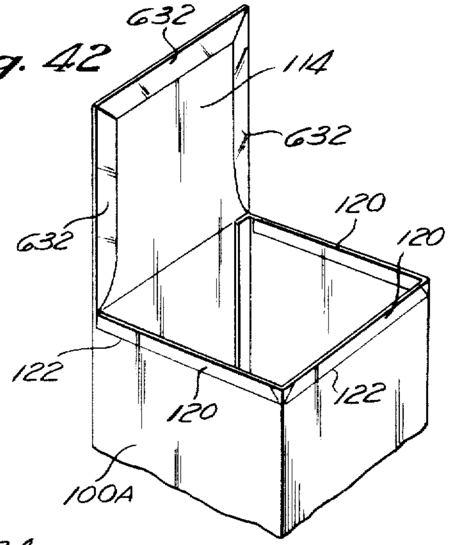
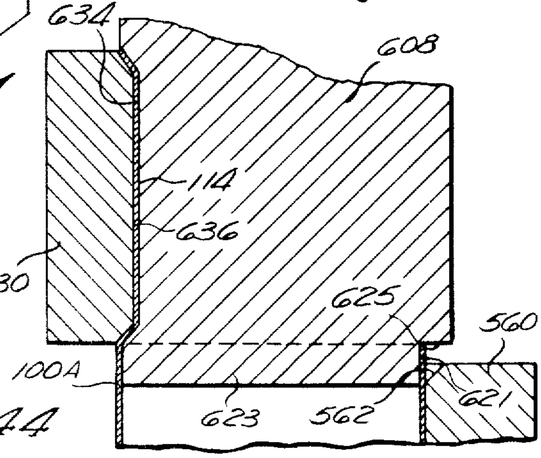
Fig. 44

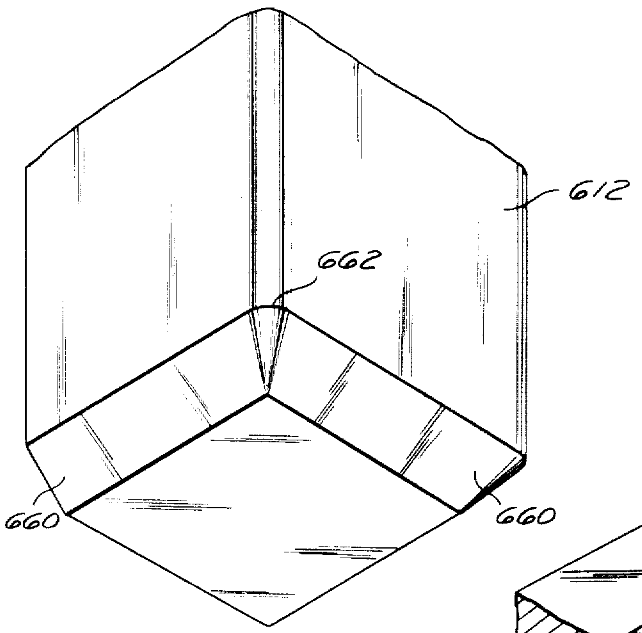
Fig. 49
Fig. 50
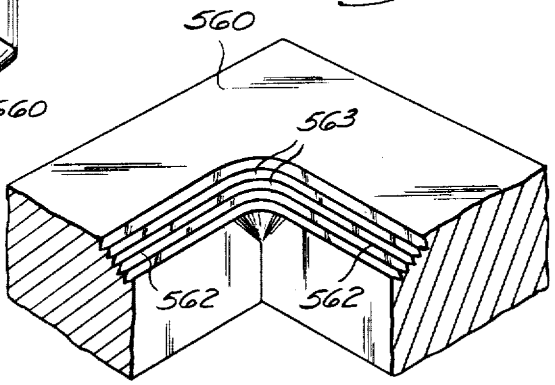
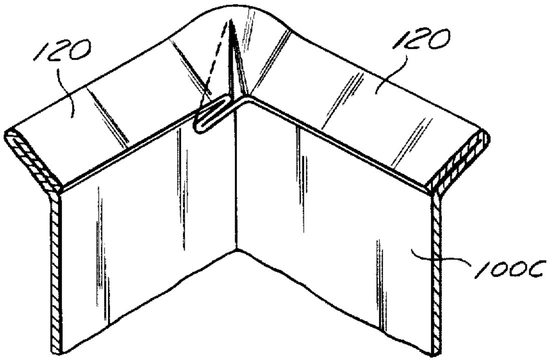
Fig. 51
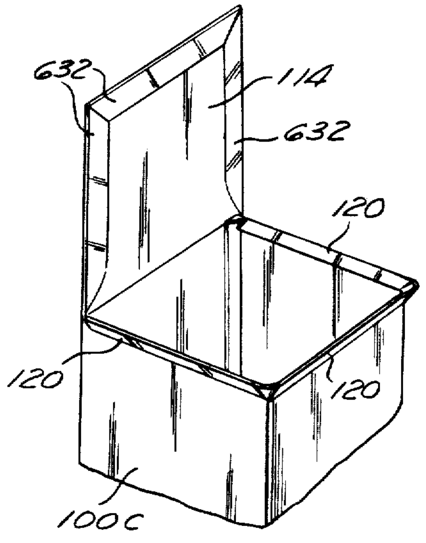
Fig. 51a

Fig. 52A
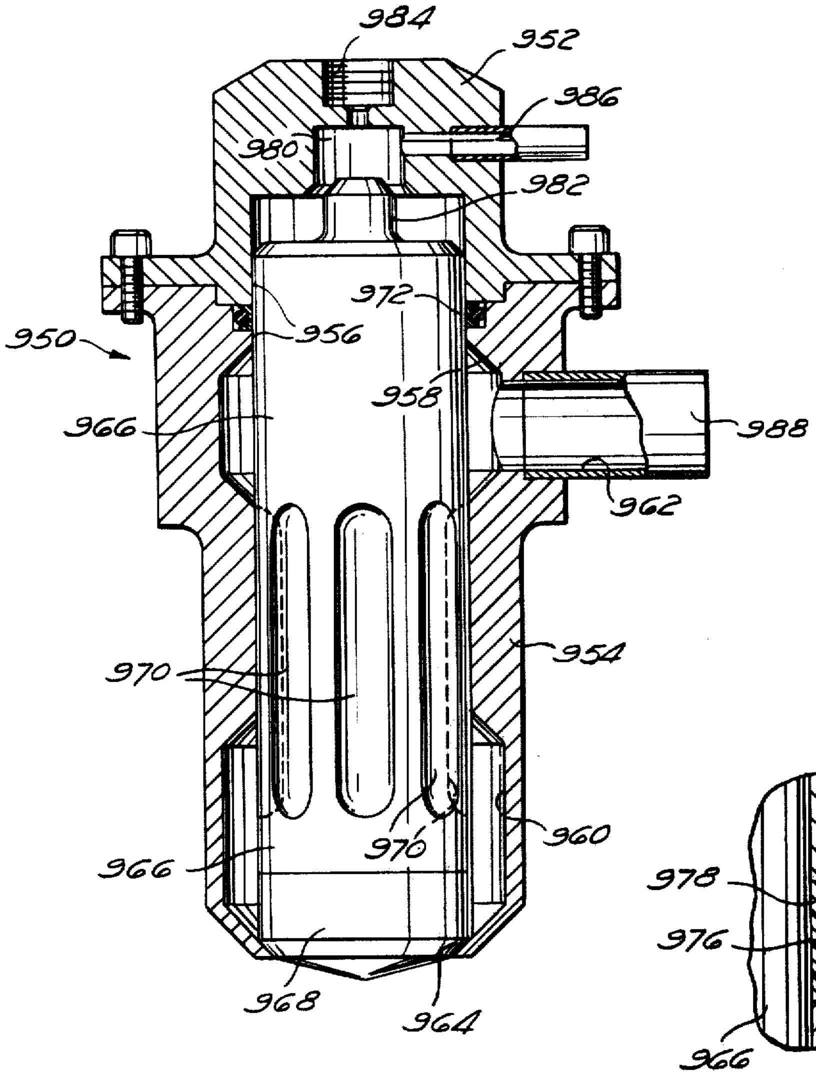
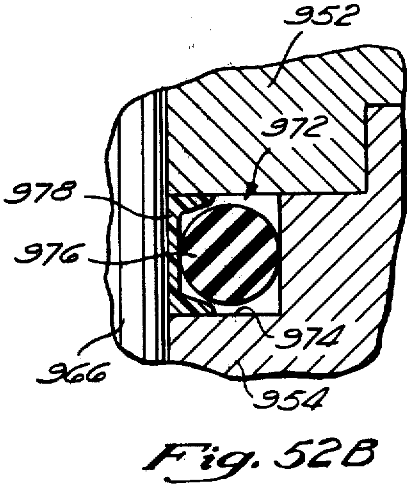
Fig. 52B

Fig. 52C
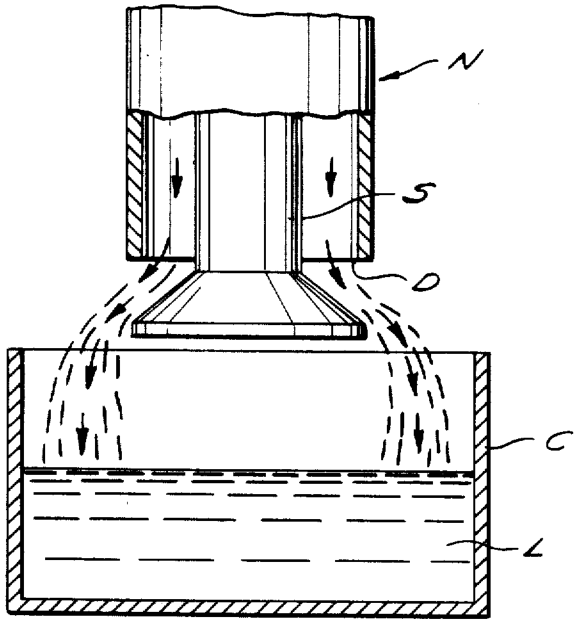
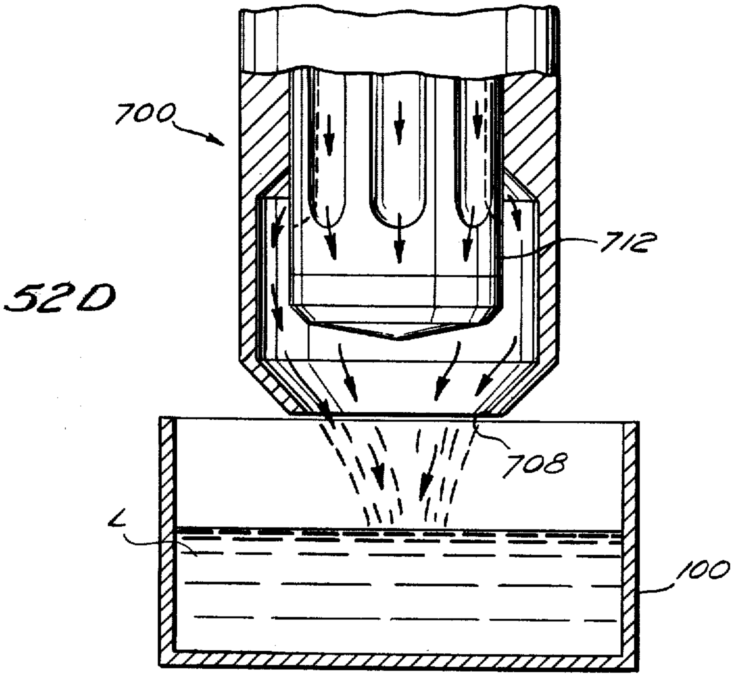
Fig. 52D

Fig. 59
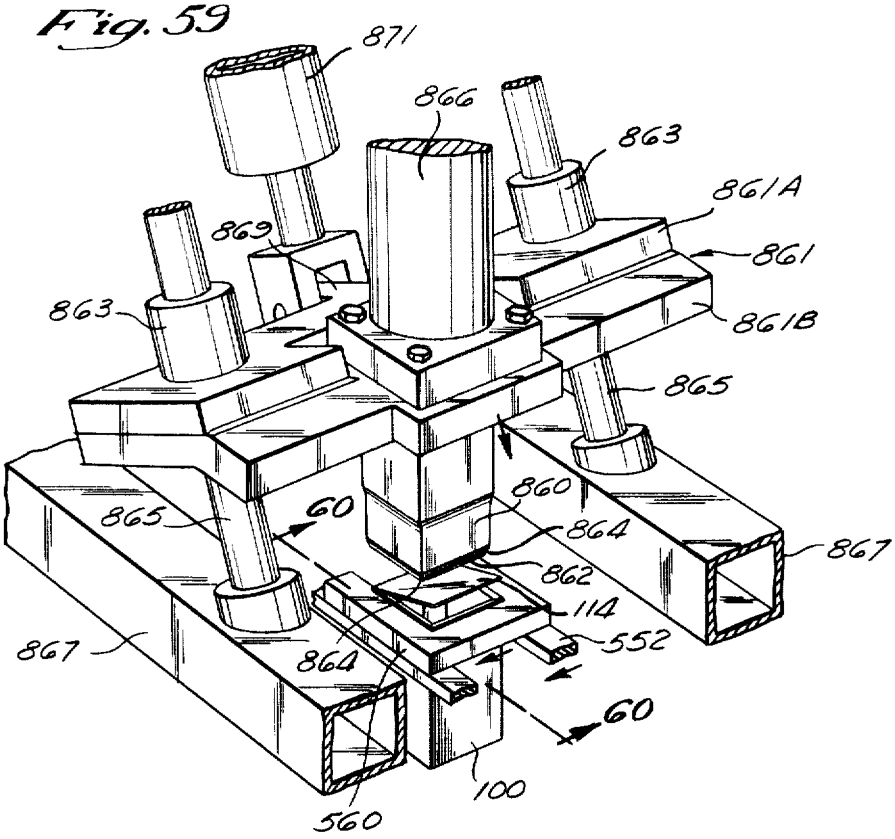
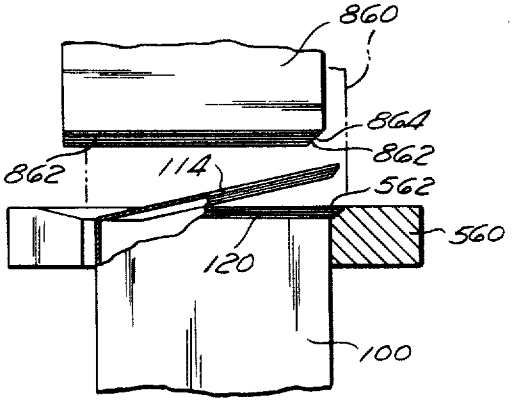
Fig. 60
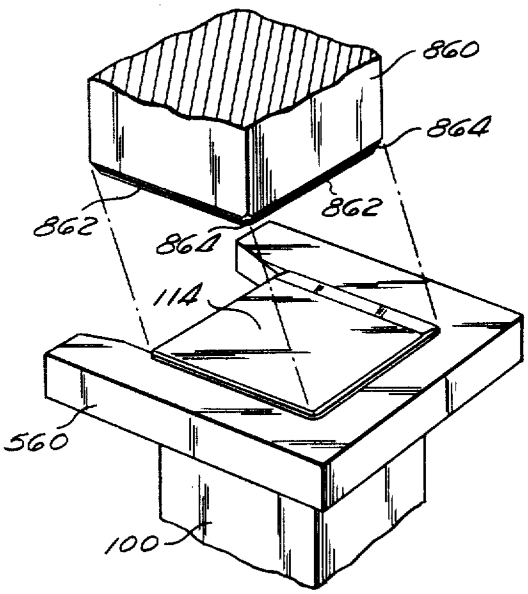
Fig. 58

APPARATUS FOR HANDLING A TUBULAR CARTON BLANK

BACKGROUND OF THE INVENTION

U.S. Pat. No. 3,800,677 granted Apr. 2, 1974 to Charles W. Jones and Dwight L. Stetler discloses apparatus for forming, and U.S. Pat. No. 3,775,943 granted Dec. 4, 1973 to Charles W. Jones discloses apparatus for filling and sealing straw-bearing cartons. The apparatus and method of the present invention, to be described hereinafter, are intended to form, fill, and seal similar cartons. The carton formed by the apparatus and method of the present invention is the type disclosed in U.S. Pat. No. 3,749,300 granted July 31, 1973 to Charles W. Jones as well as the improvements thereon as shown in U.S. Pat. No. 4,011,984 granted to Matovich, Jr. issued Mar. 15, 1977, and U.S. patent application, Ser. No. 911,990, filed June 2, 1978 by Josef J. Buschor, which application is a Continuation-In-Part of U.S. patent application, Ser. No. 822,500, filed Aug. 8, 1977.

Basically, the carton disclosed in each of these patents and applications comprises a rectangular cross-section container formed from a one-piece, substantially T-shaped blank of polyethylene coated paperboard. The carton may be provided on one of its sides with an access flap to the inside of which is attached a straw element. The liquid contents of the carton may be consumed by lifting the access flap, thereby rotating the straw to expose one end of the straw element from which the contents of the carton may be drawn into the mouth, and lowering the other end of the straw into a corner of the carton.

In the formation of the carton by the apparatus shown in U.S. Pat. No. 3,800,667, both ends of the carton blank are sealed prior to the filling operation. As disclosed in U.S. Pat. No. 3,775,943, the access flap is lifted and the carton filled therethrough, after which the aperture is sealed by the application of a length of tape. U.S. Pat. No. 4,037,370 discloses apparatus for closing and sealing the carton wherein the carton is filled from the top of the container and subsequently a cover member is pressed flat down upon the open end of the filled carton and sealed thereto by the melting and cooling of the polyethylene coating on the top of the open-ended carton. Although these prior art methods and apparatus for forming the carton have proven useful in their limited application, they have presented certain cost, space, and production and reliability problems.

In particular, the prior art apparatus for forming the carton has required an extremely large and elongated structure wherein an individual carton blank was formed, filled, and sealed by progression through a series of work stations oriented in an extended production line manner. This large and elongated structure required a considerable amount of space within a plant facility to be devoted to the apparatus, which detracted from the overall efficiency of the device and permitted the installation of the apparatus in only large production facilities.

Further, the prior art apparatus typically facilitated the formation, filling, and sealing of the carton in a serial manner along the production line (i.e., one carton being formed at a time) which, due to the time required for filling and sealing of the carton, limited production output and necessarily increased production costs.

Additionally, due to the elongate nature of the apparatus for forming the carton and the intricate mechanical mechanisms and extended transport mechanisms utilized therein, one or more skilled technicians were required to constantly monitor and fine tune the apparatus during operation. Further, the prior art apparatus was incapable of providing a simple and convenient method of accommodating differing sized containers for different production runs. As such, the versatility of the prior art apparatus was severely limited.

SUMMARY OF THE PRESENT INVENTION

The apparatus and method of forming a carton blank which is the subject of the present invention is a significant improvement over the apparatus and methods disclosed in the hereinbefore-identified patents and patent applications and significantly eliminates the deficiencies associated with the prior art. The present invention provides a compact apparatus for forming a carton wherein a substantially T-shaped carton blank is provided with a straw element and tape seal, creased into a square, tubular configuration about a forming mandrel, sealed along its side and one end by an ultrasonic welding process, pre-formed along its open end by a series of dies, filled with a desired liquid by a two-stage filling process, and subsequently sealed along its open end and automatically ejected from the apparatus.

The significant reduction in space and compact nature of the apparatus of the present invention is made possible by the transverse orientation of the mechanism for applying and sealing the straw element to the carton blank with the remainder of the apparatus of the machine. This transverse orientation allows the carton blanks to be serially provided with the straw element and tape seal and subsequently travel in a plurality (in the preferred embodiment four at a time) through parallel sealing and filling stations. Since the majority of the production time is consumed in the sealing and filling operations, this plural transport of the cartons through the remainder of the apparatus significantly increases production output of the apparatus, without unnecessarily duplicating the preliminary stages which are capable of high speed operation. As such, the apparatus of the present invention may be effectively utilized in smaller plant facilities and provide a high production output which heretofore could not be accomplished by the prior art apparatus, without unnecessary cost increases.

Additionally, the present invention, due to its compact size, significantly reduces the complexities of the transport mechanisms as well as the length of transport of the carton blanks through the apparatus. This reduction of the transport mechanisms substantially reduces the possibility of misalignment of the carton blanks traveling through the apparatus and, as such, provides greater consistency in production output. Additionally, the present invention, in the preferred embodiment, is provided with a central hydraulic drive system which powers the major transport systems with the individual work stations along the apparatus being pneumatically operated to yield greater reliability for the apparatus.

In the preferred embodiment, the apparatus and method of the present invention provide a novel tape and straw seal mechanism which bonds and seals a straw element and tape length over the aperture formed in one side of the carton blank while the unfolded, T-shaped carton blank is positioned upon a rotating drum. Further, the apparatus and method of the present invention facilitate the end and side sealing of the carton blank upon a rotating crossbar at a single work station without the necessity of transferring the carton blank along plural mandrels for each of the individual end and side sealing operations.

Additionally, the present invention provides a novel yoke or mandrel conveyor transport which positively supports and orients the carton blank as it travels through the pre-form apparatus, filling station, end closure station, and ejector mechanism. Further, a unique positive displacement pump and nozzle assembly utilizing an internally reciprocating spool to provide positive filling and shut-off is disclosed.

DESCRIPTION OF THE DRAWINGS

These and other features of the present invention will become more apparent upon reference to the drawings wherein:

FIG. 6 is an enlarged perspective view of the carton blank feeder mechanism, heat seal and alignment drum, straw inserter mechanism, and tape applicator of the present invention;

FIG. 7 is an elevation view, partially broken away, of the carton blank feeder mechanism and heat seal and alignment drum of FIG. 6, depicting the cam and pneumatic drive mechanism for the heater plate;

FIG. 8 is an enlarged partial perspective view of the straw inserter mechanism of the present invention;

FIG. 8A is an enlarged cross-sectional view taken about lines 8A—8A of FIG. 8 illustrating the method in which the individual straw elements are transferred from the straw singulator into the straw feeder mechanism;

FIG. 8B is an enlarged perspective view of the straw singulator of the present invention illustrating the internal biasing roller disposed therein;

FIG. 9 is a sectional view of the straw inserter mechanism taken about lines 9—9 of FIG. 8 illustrating the spacial relationship between the straw singulator, straw transport channel, and the rotating drum;

FIG. 10 is an enlarged cross-sectional view taken about lines 10—10 of FIG. 9 illustrating the detailed operation of the straw inserter mechanism depositing a straw onto the periphery of the heat seal and alignment drum;

FIG. 11 is an enlarged perspective view of the tape dispenser apparatus of the present invention illustrating the plural rotating cutter members and their relative orientation with the heat seal and alignment drum;

FIG. 12 is a perspective view of the lower rotating cutter member of FIG. 11 illustrating the detailed construction thereof;

FIG. 13 is an elevation view of the rotating cutter members of FIG. 11 in a position for initially contacting the length of tape;

FIG. 14 is an elevation view of the rotating cutter members of FIG. 11 in a position for shearing or cutting of the tape length;

FIG. 15 is a partial perspective view of the heater plate of the heat seal and alignment drum illustrating the detailed construction of the undersurface thereof;

FIG. 16 is a perspective view of the stripper wheel mechanism and carton pivot mechanism of the present invention;

FIG. 17 is an enlarged elevation view of the stripper wheel mechanism of FIG. 16 illustrating the detailed operation thereof;

FIG. 18 is a perspective view of the carton pivot mechanism of FIG. 16 illustrating the chain loop transport mechanism;

FIG. 19 is a partial elevation view of the stripper wheel mechanism and carton pivot mechanism of the present invention showing the initial transfer of the carton blank thereon;

FIG. 19A is a partial elevation view identical to FIG. 19 but showing the final position of the carton blank after transfer from the stripper wheel mechanism;

FIG. 23 is a perspective view of the wrapping and creasing mechanism of the present invention illustrating the detailed construction thereof;

FIG. 24 is a perspective view of the wrapping and creasing mechanism of FIG. 23 disposed about the forming mandrel;

FIG. 25 is a cross-sectional view of the wrapping and creasing mechanism of the present invention illustrating its initial orientation with the forming mandrel as an individual carton blank enters therein;

FIG. 26 is a cross-sectional view of the wrapping and creasing mechanism depicting the initial creasing step of the carton blank about the forming mandrel;

FIG. 27 is a cross-sectional view of the wrapping and creasing mechanism illustrating the final creasing step of the carton blank about the forming mandrel;

FIG. 28 is a perspective view of the wrapping and creasing mechanism and forming mandrel of the present invention depicting the mechanism for transferring the carton blank to the crossbar mandrel of FIG. 30;

FIG. 28A is an enlarged cross-sectional view of the upper corner detail of both the forming mandrel of FIG. 28 and the individual crossbar mandrels of FIG. 30;

FIG. 29 is a perspective view of the carton blank of the present invention showing its configuration upon being transferred to the crossbar mandrel of FIG. 30;

FIG. 30 is a perspective view of the crossbar mandrel of the present invention having a carton blank disposed thereon and illustrating the spacial relationship between the end folding apparatus, side sealing anvil, and end sealing anvil;

FIG. 31 is a perspective view of one end of the crossbar mandrel showing the detailed construction of the forming die rigidly mounted thereto;

FIG. 32 is a partial perspective view of the carton blank of the present invention showing its configuration upon completion of its travel through the end folding apparatus of FIG. 30;

FIG. 32A is a schematic illustration of the initial step in the operation of the end folding apparatus of the present invention;

FIG. 32B is a schematic illustration of the subsequent step in the operation of the folding apparatus of FIG. 32A;

FIG. 32C is a schematic illustration of the final step in the operation of the folding apparatus of FIG. 32A depicting the sealing tab folded tightly over the end of the crossbar mandrel;

FIG. 33 is a perspective view of the crossbar mandrel of the present invention having three carton blanks disposed thereon, illustrating the operation of the end folding apparatus and the end sealing apparatus;

FIG. 34 is a perspective view of the carton blank of the present invention, disposed upon the crossbar mandrel, illustrating the manner in which the end closure panel is folded over the end of the crossbar mandrel;

FIG. 38 is a perspective view of the carton blank rotator mechanism transferring an individual carton blank from the fixture into the conveyor transport of FIG. 39;

FIG. 40 is a perspective view of the conveyor transport and side loader mechanism of FIG. 39 illustrating the operation thereof;

FIG. 40A is a perspective view of the side loader mechanism of FIG. 39 having the conveyor transport removed for illustration;

FIG. 41 is a cross-sectional view of the pre-form apparatus of Work Station V taken about lines 41—41 of FIG. 1 schematically depicting the three pre-form dies and their relative orientation with the carton blank and the conveyor transport;

FIG. 42 is a perspective view of the carton blank of the present invention showing its configuration upon completion of the first pre-form die operation of FIG. 41;

FIG. 43 is a perspective view of the first pre-form die being positioned over the carton blank of the present invention;

FIG. 44 is a cross-sectional view of the first pre-form die and its orientation with the carton blank of the present invention taken about lines 44—44 of FIG. 43;

FIG. 49 is a perspective view of the third pre-form die of FIG. 41;

FIG. 50 is a partial perspective view of the anvil of the conveyor transport illustrating the beveled top edge and relieved corner thereon;

FIG. 51 is a partial perspective view of the carton blank of the present invention illustrating the configuration of the sealing tab after the interaction of the die of FIG. 49 with the anvil of FIG. 50;

FIG. 51A is a perspective view of the carton blank upon completion of the third pre-form stage operation;

FIG. 52A is an alternative embodiment filler nozzle wherein flow metering is facilitated exclusively by an internal reciprocating spool;

FIG. 52B is an enlarged fragmentary view of the stationary cap seal utilized in the filler nozzle of FIG. 52A;

FIG. 52C is a schematic view of a typical prior art nozzle design showing the liquid flow pattern exiting therefrom;

FIG. 52D is a schematic view of the internal reciprocating spool nozzle design of FIGS. 52 and 52A depicting the liquid flow pattern exiting therefrom;

FIG. 58 is a perspective view of the sealing die of Work Station VII illustrating the manner in which the open end of the container is sealed to form a liquid-tight carton;

FIG. 59 is a perspective view of the support structure and drive mechanism for the sealing die of FIG. 58;

FIG. 60 is a cross-sectional view taken about lines 60—60 of FIG. 59;

DETAILED DESCRIPTION OF THE PREFERRED EMBODIMENT

Overall System Description

Figures 1, 1A:
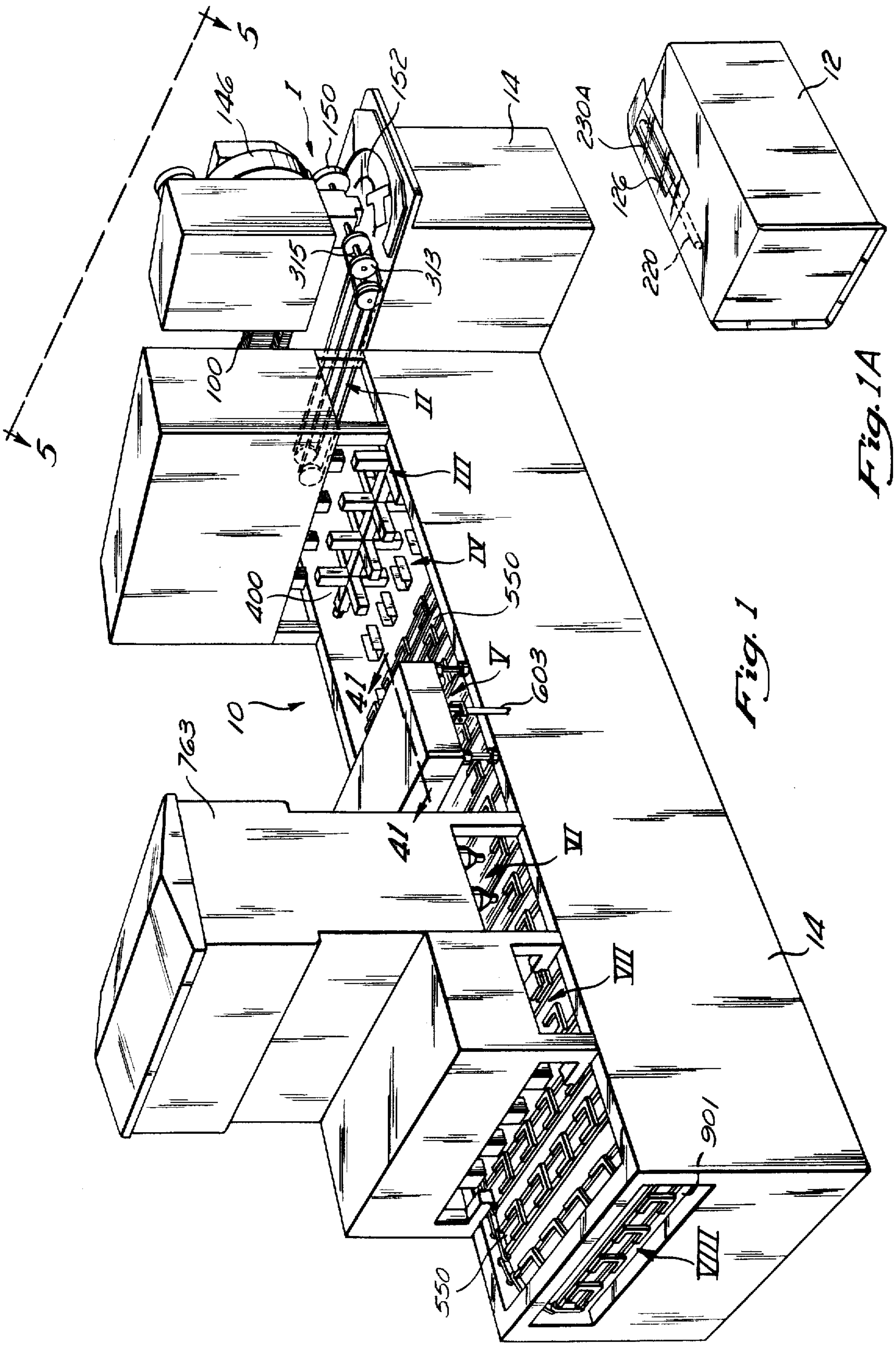
FIG. 1 is a perspective view of the apparatus of the present invention illustrating the spacial relationship between the plural Work Stations (I–VIII) and the direction of travel of the carton blank as it is transported through the apparatus.
FIG. 1A is a perspective view of the carton formed by the apparatus and method of the present invention.

Referring to FIG. 1 there is shown the apparatus 10 of the present invention which forms a particular type of container for liquids 12 (shown in FIG. 1A) known generally as a Flip and Sip container (a trademark of Nolex Corporation, the assignee of the present invention) and fully disclosed in U.S. Pat. No. 3,749,300, granted July 31, 1973, to Charles W. Jones, the disclosure of which is expressly incorporated herein by reference. As shown in FIG. 1, the apparatus 10 of the present invention includes a base or frame 14 which supports a plurality of component systems, each of these systems working in conjunction with each other to produce the sealed container 12 (shown in FIG. 1A) filled with a liquid substance.

For illustration purposes and to show the spacial relationship between the component systems of the present invention, the apparatus 10 has been segregated into a series of Work Stations designated generally by the Numerals I through VIII. By progression through these Work Stations I through VIII, a carton blank 100 initially loaded onto the apparatus 10 at Work Station I is formed into a desired configuration, filled and sealed through a series of operations and is ejected from the apparatus 10 at Work Station VIII.

Figure 2:
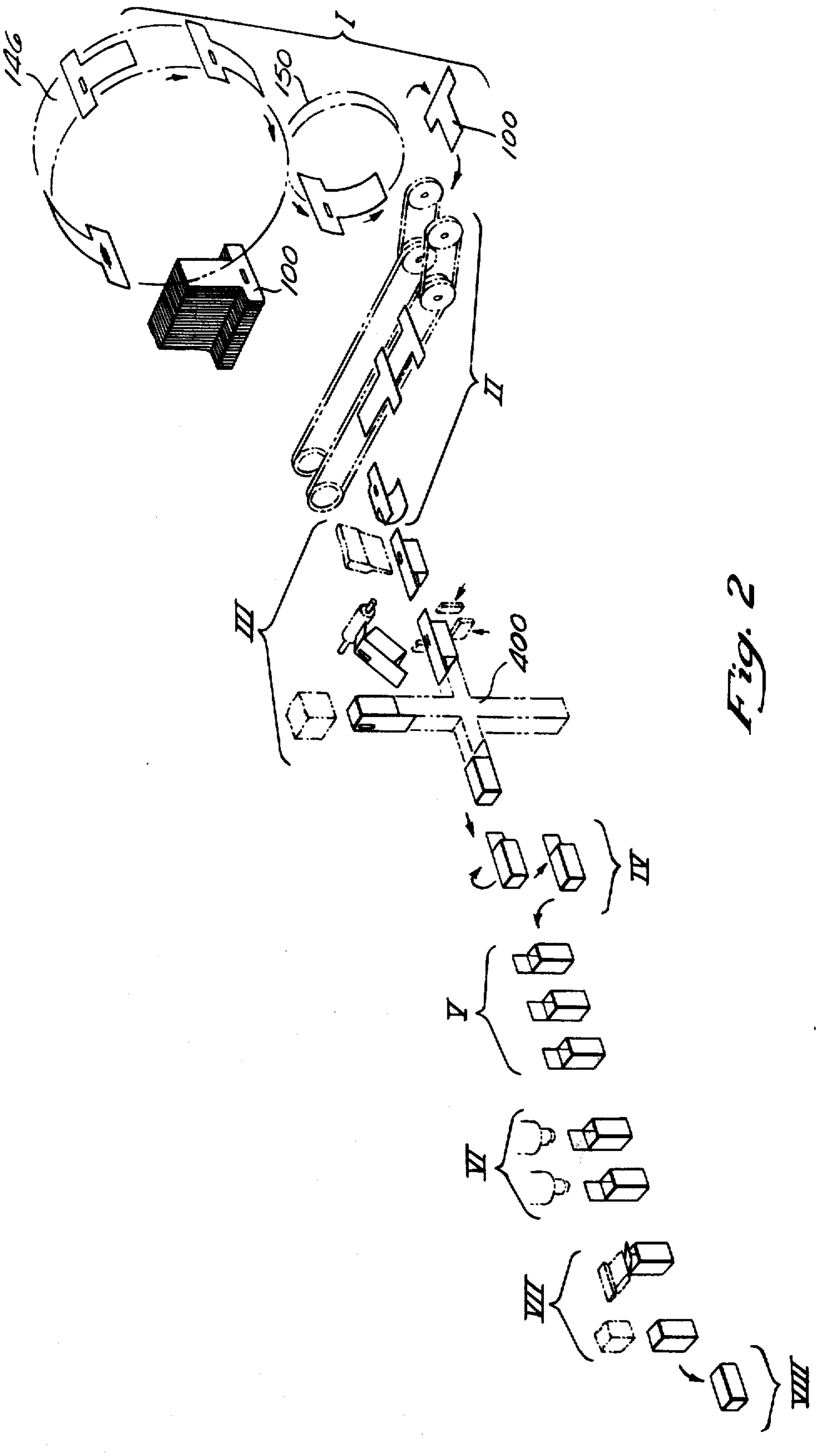
FIG. 2 is a schematic representation of the processes occurring at each of the Work Stations (I–VIII) and the orientation of the carton blank as it travels through the apparatus of FIG. 1.

Referring now to FIGS. 1 and 2, a brief overview and a schematic representation of the processes occurring at each of the Work Stations Numerals I through VIII is illustrated. Note that these figures complement one another, FIG. 2 showing the carton schematically as it processes through Work Stations I through VIII of FIG. 1.

At Work Station I (the Straw and Sealing Tape Applicator Station) the carton blanks 100 are loaded upon the apparatus 10 and individually transferred to a rotating drum 146. As the blanks 100 rotate with the drum 146, straw elements (not shown) and tape lengths (not shown) are permanently sealed across apertures 126 formed on the carton blanks 100. Subsequently, each carton blank 100 is removed from the rotating drum 146 by a stripper wheel apparatus 150 which delivers the carton blank 100 to a rotator or pivot mechanism 152 for subsequent entry into the Work Station II.

At Work Station II (Carton Blank Wrapping and Folding Station), the carton blank 100 is transported transversely across the apparatus 10 and singularly wrapped and creased into a square, open tube configuration around a forming mandrel (not shown). Subsequently, the carton blank 100 travels to Work Station III (the Seam and End Bonding Station) by being transferred onto a rotating crossbar mandrel 400. Through a series of operations occurring at Work Station III, the carton side seam is welded, and one end of the carton blank 100 is closed and bonded together to form a liquid-tight seal.

At Work Station IV (Carton Rotator and Conveyor Transport Station), the carton blank 100 is removed from the crossbar mandrel 400, rotated 90° about its longitudinal axis, and inserted upon a conveyor transport 550 on which the carton blank will remain until being ejected from the apparatus 10. While disposed upon this conveyor 550, the carton blank, supported in a vertical orientation, travels to Work Station V (the End Closure Pre-Form Station) wherein, through a series of three discrete operations, the open end of the carton blank 100 is permanently creased into a configuration suitable for the subsequent end sealing operation.

Having the open end of the carton blank 100 properly creased, the carton blank 100 continues its transport along the conveyor 550 to Work Station VI (Filler Station) wherein the carton is filled with a desired liquid. As represented schematically in FIG. 2, the filling of the carton blank 100 is accomplished in a two-stage operation by a pre-fill nozzle which supplies the majority of the liquid, and a topper nozzle which accurately fills the carton blank to the desired level with only the latter being adjusted for the two sizes of cartons produced on the apparatus.

Subsequently, the carton blank 100, filled with liquid, travels to Work Station VII (the End Sealing Station) wherein the open end of the carton blank 100 is welded to the square tubular side walls of the container 100. With the liquid sealed within the carton blank 100, the carton 100 travels to Work Station VIII (the Carton Ejector Station) wherein an ejector mechanism (not shown) removes the carton 100 from the conveyor transport 550 and ejects the same from the end of the apparatus 10.

As will become more apparent from the following disclosure, the apparatus and method of the present invention provide a high volume production apparatus (approximately 240 cartons per minute) and additionally provide significant space, reliability, and consistency improvements over prior art carton forming apparatus.

CARTON BLANK

Figure 3:
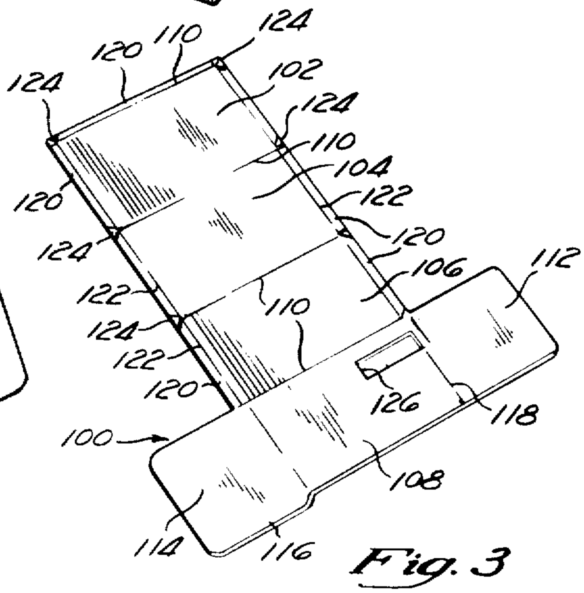
FIG. 3 is a plan view of the carton blank of the present invention utilized to form the liquid-tight carton of FIG. 1A.

Referring now to FIG. 3, there is shown a carton blank 100 having a generally T-shaped configuration from which the sealed and liquid-tight carton 12 (shown in FIG. 1A) of the present invention may be formed. The particular configuration of the carton blank 100 is fully disclosed in a copending U.S. patent application Ser. No. 911,990, filed June 2, 1978, by Josef J. Buschor, a continuation-in-part of U.S. patent application Ser. No. 822,500, filed Aug. 8, 1977, for a Paperboard Carton, the disclosure of which is expressly incorporated herein by reference.

Basically, the carton blank is formed having an elongate central section and a pair of end panels integrally attached adjacent one end thereof. During the forming of the carton, the central section is creased into a square tubular configuration and sealed along one of its edges to form the side walls of the carton with the pair of end panels being subsequently folded over and sealed onto the square tube (in a particular manner to be described below) to provide the end walls of the carton. As will become more apparent, the particular carton blank configuration yields a flat top container which reduces the amount of paper stock used in the container and increases handling and crating processes.

The blank 100 is preferably formed of a paperboard stock having a thickness of approximately fifteen thousandths of an inch and is coated at least on the outside surface thereof (which may be assumed to be the surface seen in FIG. 3), and desirably on the inside surface as well, with a substance that will render the paper impervious to liquids intended to be contained within the carton. The coating substance preferably possesses thermal-responsive adhesive properties such that liquid-tight sealing of the components of the blank 100 may be accomplished without the separate application of conventional adhesive substances at the time of blank forming and processing. A thin polyethylene film having an approximate thickness of ½ to 1½ mils has been found to include these above properties and is well suited for use in the present invention, especially when the container 12 is used for potable beverages, such as milk.

As may be seen, the blank 100 includes an elongate central section preferably composed of four equal-sized segments 102, 104, 106, and 108, which are separated or delineated by indentation or scoring lines 110. As will be explained in more detail below, these carton segments 102 through 108 will be folded along the scoring lines 110 to form the side walls of a square tubular configuration for the carton 12 of the present invention.

Formed integral with the carton segment 108 are two end closure panels 112 and 114 which, in the preferred embodiment, are formed in a generally square configuration, due to the equal width of the carton segments 102–108. These end panels 112 and 114 are similar in configuration, except that the end panel 114 includes a pair of sealing flaps 116 extending outboard of the segment 108 along opposite edges thereof. Additionally, end panel 112 is delinated or separated from the carton segment 108 by a score line 118. It will be recognized that various size cartons may be formed by differing the lengths of the carton segments 102 through 108. It is a unique feature of the present invention that cartons of two different lengths (relating to ½ pint and ¼ quart capacity) may be folded, sealed and filled with only minor adjustments to the apparatus 10.

The carton segments 102, 104, and 106 are each additionally provided with a pair of sealing tabs 120 formed along their free edges by scoring lines 122. At the intersection of the scoring lines 110 and 122, the sealing tabs 120 preferably include a scored V-shaped notch 124 which, as will become more apparent below, aid in the subsequent liquid-tight sealing of the end panels 112 and 114 to the carton segments 102–108.

Figure 4:
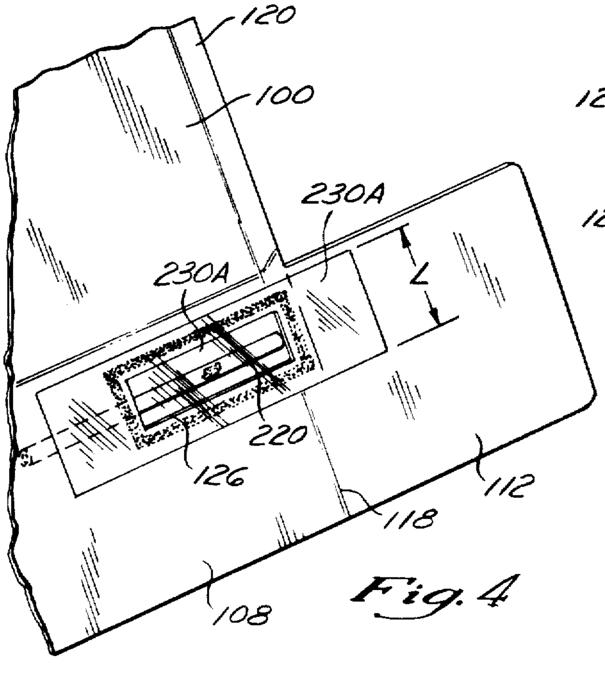
FIG. 4 is an enlarged perspective view of a portion of the carton blank of FIG. 3 illustrating the location of the tape seal and straw element thereon.

The carton blank 100 further includes an elongate aperture 126 formed adjacent the score line 118 and extending partially through the length of the carton segment 108. As shown in FIG. 4, and as will be explained in more detail infra, this aperture 126 provides access to the straw element 220 and is overlayed by a length of sealing tape 230A which provides a liquid-tight seal for the carton 100.

Work Station I—Straw and Sealing Tape Applicator

Figure 5:
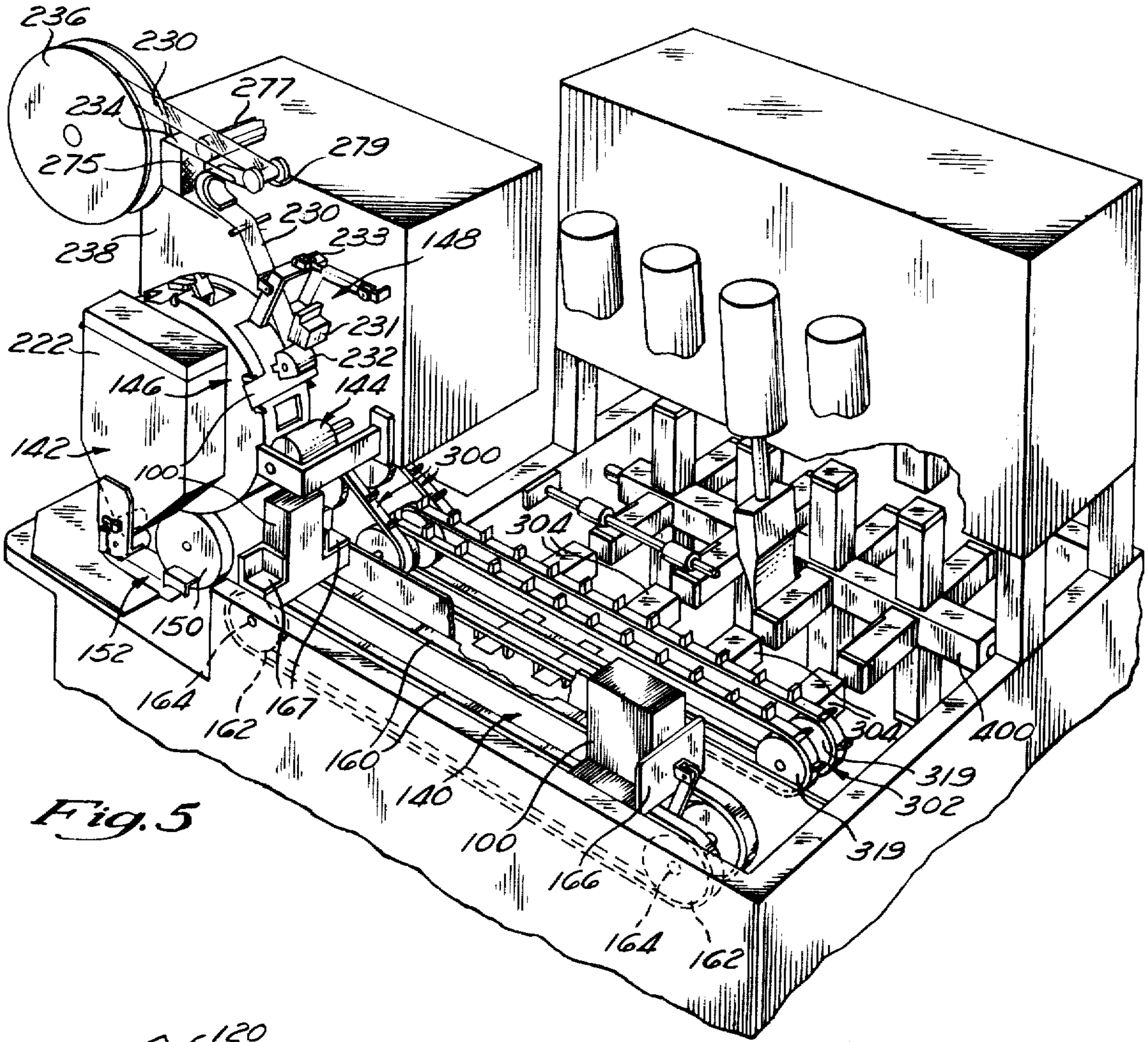
FIG. 5 is an enlarged perspective view of the rear end of the apparatus of the present invention taken about lines 5—5 of FIG. 1.

Referring now to FIG. 5, the component systems comprising Work Station I (Straw and Sealing Tape Applicator) of the apparatus of the present invention for forming liquid-containing cartons 12 may be described. Work Station I includes, as major sub-systems, a conveyor loader 140, a straw inserter 142, a carton blank feeder mechanism 144, a heat seal and alignment drum 146, a tape dispenser 148, a stripper wheel 150, and a carton blank pivot mechanism 152.

Prior to a detailed description of each of these major component sub-systems, a brief overview of the processes occurring at Work Station I will aid in the complete understanding of the apparatus.

Referring to FIG. 5, the carton blanks 100 are initially stacked upon the conveyor loader 140 and travel horizontally toward the rotating alignment drum 146. At the end of the conveyor loader 140, the carton blanks 100 are individually raised in a vertical direction and transferred to the rotating alignment drum 146 by the carton blank feeder mechanism 144. Prior to this transfer of the blank 100 onto the drum 146, the straw inserter 142 loads a straw element 220 (as shown in FIG. 6) into a small channel 226 (shown in FIG. 10) formed in the periphery of the drum 146 such that, as the blank 100 is transferred to the drum 146, the straw 220 is located directly under the small aperture 126 (FIG. 4) formed in the blank 100; i.e., the carton blank 100 (FIG. 4) overlays the straw 220.

The straw 220 and carton blank 100 carried by the drum 146 are subsequently rotated past the tape dispenser 148 where a length of polyethylene coated Mylar substrate tape 230A (FIG. 4) is positioned on the blank 100 over the aperture 126 and straw 220. As the drum 146 continues its counterclockwise rotation, a heater plate 254, located within the interior of the drum 146, cams outwardly and contacts the carton blank 100, thereby bonding the straw 220 to the tape 230 and concurrently sealing the tape 230 to the carton blank 100 over the aperture 126.

Subsequently, the blank 100 is removed from the drum 146 by stripper wheel 150 which deposits the blank 100 in a horizontal plane. The blank 100 is then delivered by the carton blank pivot mechanism 152 to Work Station II of the apparatus for subsequent wrapping and folding around a forming mandrel.

Thus, as will become more apparent from the discussion below, the carton blank 100, upon completion of its travel through Work Station I, will include a straw 220 and tape seal 230A securely sealed across the aperture 126, as shown in FIG. 4.

Referring again to FIG. 5, the detailed construction and operation of the conveyor loader 140 is illustrated. The loader 140 preferably includes a pair of elongate conveyor belts 160 typically formed of rubber having a suitable coefficient of friction to prevent surface slippage thereon. These belts 160 are stretched or held taut between two pairs of pulleys 162. Each pair of pulleys is mounted upon a shaft 164, one of which is connected to a drive mechanism (not shown) for rotating the pulleys 162 in a counterclockwise direction (as viewed in FIG. 5).

The carton blanks 100 are initially stacked in a row upon the conveyor belts 160 in an inverted, T-shaped orientation such that the edge of the end sections 112 and 114, as well as carton segment 108 (as shown in FIG. 3), contact the V-belts 160. While positioned on the conveyor belts 160, the vertical orientation of the stack is maintained by a pressure plate 166 which is spring biased in a horizontal direction to travel along the length of the conveyor belts 160 toward the drum 146. As may be easily recognized, the counterclockwise rotation of the pulley pairs 162 causes the entire stack of carton blanks 100 to move continuously with the conveyor belts toward the carton blank feeder mechanism 144.

The loader 140 additionally includes a pair of L-shaped alignment blocks 167 at one end thereof, located above one of the pulley pairs 164. The vertical distance between the lower surface of the alignment blocks 167 and the upper surface of the conveyor belts 160 is spaced to provide a slight clearance between the edges of the end panels 112 and 114 of the carton blank 100, and the space between the blocks 167 is adjusted to closely receive the sealing tabs 120 of the carton segments 106. Thus, as the carton blank stack 100 moves along the traveling conveyor belt, these alignment blocks 167 precisely register each carton blank 100 upon the conveyor loader 140 for subsequent entry into the carton blank feeder mechanism 144. Additionally, in the preferred embodiment, the outboard alignment block 167 (as viewed from FIG. 5) is movably mounted in the direction transverse to the plane of the conveyor 140 such that the space between the blocks 167 may be varied. This variable adjustment accommodates the differing lengths of the carton segments 102–108 (FIG. 3) when the apparatus 10 is modified to produce both the ½ pint and ⅓ quart capacity cartons 12.

As the carton blank stack 100 moves beneath the L-shaped alignment blocks 167, each carton blank 100 is sequentially transferred to the heat seal and alignment drum 146 by the carton blank feeder mechanism 144. As may be seen in FIG. 6, the carton blank feeder mechanism 144 includes an elevator plate 180 and a pinch roller 182 which cooperate to separate a single carton blank 100 from the stack and transfer the blank 100 onto the heat seal and alignment drum 146.

The elevator plate 180 comprises a generally flat plate having a tapered back wall 184 and a shoulder 186 formed across its width adjacent its leading edge 187. The shoulder 186 has a small step or recess 188 formed adjacent one end thereof, which is sized to receive one of the sealing flaps 116 of the carton blank 100 (as shown in FIG. 3). The depth of the shoulder 186 is machined to be slightly less than the thickness of a single carton blank 100 such that the edge of only one carton blank may contact or ride on the shoulder 186 at one time.

Attached to the lower end of the elevator plate 180 is a cammed linkage (not shown) which is connected in a conventional manner to the mechanism used for rotating the drum 146. This cammed linkage transforms the rotary motion of the drum 146 into reciprocating vertical movement of the elevator plate 180 as indicated by the arrow 187 in FIG. 6.

The carton blank feeder mechanism 144 additionally includes a pinch roller 182 which is located above the elevator plate 180 and in close juxtaposition to the rotating heat seal and alignment drum 146. The outside diameter of the pinch roller 182 is formed with a reduced diameter section 190 which extends through approximately a 180° arc. As will be explained in more detail below, this reduced diameter section 190 permits the elevator plate 180 to raise the individual carton blank 100 to a maximum height before the pinch roller 182 transfers the carton blank 100 to the rotating drum 146.

The pinch roller 182 is mounted to a shaft 192 which is connected in a conventional manner through gears to the drum 146, thereby rotating the pinch roller 182 in a clockwise direction as shown by the arrow in FIG. 6. The rotational speed of the pinch roller 182 is proportional to the rotational speed of the drum 146 such that the surface speed of the periphery of the drum 146 and the outside diameter of the pinch roller 182 are equal. The rotation of the pinch roller 182 is synchronized with the reciprocating motion of the elevator plate 180 such that the reduced diameter section 190 of the pinch roller 182 is adjacent the periphery of the drum 146 as the carton blank 100 is raised by the elevator plate 180. As will be explained below, this synchronized movement between the pinch roller 182 and the elevator plate 180 pre-registers the carton blank 100 upon the rotating drum 146.

Referring now to FIG. 7, the detailed operation and interrelationship between the conveyor loader 140, the carton blank feeder mechanism 144, and the heat seal and alignment drum 146 may be described. As the carton stack 100 moves along the conveyor loader 140 past the alignment blocks 167, the elevator plate 180 reciprocates downward, whereby the lower edge of the shoulder 186 travels below the lower edge of the leading carton blank 100 indicated by the numeral 200.

In this position, the travel of the conveyor loader 140 causes the leading individual carton blank 100A to be pushed off the conveyor loader 140 and onto the shoulder 186 of the elevator plate 180. Since the width of the shoulder 186 is slightly less than the thickness of the carton blank 100A, and the elevator plate reciprocates closely against the back surface of the alignment block 167, only a single carton blank 100A is removed from the stack 100 and elevated toward the pinch roller 182. Thus, as the single blank 100A is raised, it slides against the next adjacent blank, which is held stationary by the alignment blocks 167.

As shown in FIG. 7, the elevator plate 180 raises the individual carton blank 100A between the rotating drum 146 and the pinch roller 182 to a height wherein the leading edge of the carton blank 100A is slightly above the tangency point between the drum 146 and pinch roller 182. As previously mentioned and clearly shown in FIG. 7, during this upward travel of the carton blank 100A and elevator plate 180, the reduced diameter section 190 of the pinch roller 182 faces the periphery of the drum 146 and is spaced therefrom to provide a small gap 202 into which the leading edge of the carton blank 100A may be received.

Thus, as may be recognized, this gap 202 allows the carton blank 100A to ride between the rotating drum 146 and rotating pinch roller 182, and remain stationary therebetween until the carton blank 100A is contacted by the leading edge 204 of the larger diameter portion of the pinch roller 182. The applicant has discovered that by allowing the carton blank 100 to remain momentarily stationary in this raised position, the carton blank is pre-registered to within 1/32 of an inch of its proper location on the rotating drum 146.

With the carton blank 100A raised to the position illustrated in FIG. 7, the continued clockwise rotation of the pinch roller 182 causes the leading edge 204 of its larger diameter portion to contact the surface of the carton blank 100A. Upon contact therewith, the gap 202 is significantly narrowed, such that the carton blank 100A is pinched and propelled upward between the periphery of the drum 146 and pinch roller 182. Since the relative surface speeds of the rotating drum 146 and pinch roller 182 are equal, the carton blank 100A is raised uniformly upward without slippage and removed from the elevator plate 180.

To facilitate the transfer of the carton blank 100A to the periphery of the drum 146, the peripheral surface of the drum 146 is provided with a series of vacuum orifices 147 (shown in FIG. 11) preferably arranged in a patterned array within the area covered by the carton blank 100A and connected by a conventional valving and conduit system (not shown) communicating with a remotely located vacuum source (not shown). These apertures 147 act upon the inside surface of the carton blank 100A to effectively maintain the carton blank 100A pressed against the periphery of the drum 146. As may be recognized, since the outside diameter of the drum 146 is much greater than the thickness of the carton blank 100A, the slight curvature of the carton blank 100A upon the drum 146 is insufficient to cause creasing or permanent distortion of the carton blank 100A.

To insure the final proper alignment and registration of the carton blank 100A upon the drum 146, a pair of registration tabs 206 are provided along both outside edges of the drum 146. The peripheral spacing between the tabs 206 is adjusted to be slightly greater than the width of the end sections 114 and 112, respectively, of the carton blank 100A (as shown in FIG. 3). Further, the inside edge of each of the registration tabs 206 is preferably provided with a chamfer which aids in the insertion of the end closure panels 114 and 112 after transfer of the carton blank 100A from the carton blank feeder mechanism 144 to the drum 146.

Thus, as the carton blank 100A is pinched between the roller 182 and drum 146 and applied against the periphery of the drum 146, these registration tabs 206 receive the end closure panels 114 and 112, respectively, of the carton blank 100A at a point adjacent the gap 202. Upon entry of the end closure panels 114 and 112 into the registration tabs 206, any minor variances in the location of the carton blank 100 upon the drum 146 will be eliminated by the tight fit of the end panels 114 and 112 within the registration tabs 206 which cause the carton blank to float along the periphery of the drum 146 into its proper position. Subsequently, vacuum is applied to the vacuum orifices 147 (shown in FIG. 11) to maintain the carton blank 100 in its aligned position upon the periphery of the drum 146.

Thus, from the above, it may be recognized that the carton blank feeder mechanism 144 effectively transfers the carton blank 100 from the conveyor loader 140 to an accurately aligned position on the heat sealing and alignment drum 146.

As previously mentioned, prior to the transfer of the carton blank 100 onto the rotating drum 146, a plastic straw element 220 (preferably formed of polyethylene) must be placed upon the periphery of the drum 146, and in the preferred embodiment is accomplished by a straw inserter mechanism 142.

Referring jointly to FIGS. 5 and 8, the straw inserter 142 is rigidly mounted adjacent the outer surface of the drum 146 and maintained in a stationary position while the drum 146 rotates in a counterclockwise direction. The straw inserter 142 is preferably composed of a straw storage hopper 222, a separator or singulator 223, and a feeder or transport mechanism 224. A plurality of straw elements 220 are stored within the hopper 222 and are oriented such that the length of each straw element 220 is parallel to the axis of rotation of the drum 146. At its lower end, the hopper 222 includes an elongate opening 221 (shown in FIG. 8A) the width of which is slightly greater than the outside diameter of the straw element 220. As will be explained in more detail below, this opening 221 permits a single straw element 220 to be transferred from the singulator 223 to the transport or feeder mechanism 224.

As shown in FIGS. 8 and 8A, the singulator 223 is formed in a cylindrical drum configuration, having an outer shell 201 which includes a plurality of semi-circular grooves 225 symmetrically spaced along its outer periphery. The width of the grooves 225 is preferably formed slightly greater than the diameter of the straw element 220 such that a single straw element 220 may be carried therein.

Disposed within the interior of the shell 201 and positioned adjacent its lower edge (as shown in FIG. 8A) are a pair of roller members 209 which are each mounted for rotation about a shaft 211. The shafts 211 in FIG. 8A are vertically spaced from the axis of the outer shell 201 and extend outboard of the simulator 223 being supported at one end by a pivot arm 203 in FIG. 8B. The roller members 209 are free to rotate about the shaft 211 (in a direction indicated by the arrow in FIG. 8A) while the shaft 211 is spring loaded as by way of springs 205 in a downward direction to continuously bias the roller members 209 adjacent the lower end of the shell 201. In the preferred embodiment, the inside diameter of the shell 201 includes a pair of annular recesses 227B shown in FIG. 8A which extend part-way into the grooves 225 forming plural apertures 207. These recesses 227B provide a race or path which aligns the roller members 209 with the shell 201 while the apertures 207 permits the rollers to enter substantially within the interior of the grooves 225.

As shown in FIG. 8A, by this particular arrangement, the roller members 209 each selectively contact the portion of each straw element 220 residing directly above the apertures 207 formed by the annular recesses 227B thereby causing the straw element 220 to be axially pre-stressed into an oval configuration adjacent the lower end of the hopper 222. As will be explained in more detail below, this pre-stressing of the straw element 220 is utilized to provide a self-propelling means for transferring the straw element 220 into the straw feeder or transport mechanism 224.

Referring to FIG. 8, it may be seen that the singulator 223 is mounted as by way of a center web (not shown) upon a shaft 227 which is journaled to the walls of the hopper 222 for movement in a clockwise direction as indicated by the arrow in FIG. 8. The shaft 227 mounts a ratchet mechanism 229 adjacent one end thereof which is activitated by a hydraulic or pneumatic actuator 231. This hydraulic or pneumatic actuator 231 is connected to an external pressure source (not shown) and is regulated by a valve (not shown) to periodically rotate the shaft 227 and thus the singulator 223 through an angle equal to the spacing between adjacent grooves 225 formed along its periphery. As will be recognized, during this periodic rotation, a single straw element 220 travels toward the opening 221 formed in the bottom of a hopper 222 for deposition into the feeder mechanism 224.

Disposed beneath and positioned tangent to the singulator 223 is a feeder mechanism 224 which rotates on a shaft 233*a* shown in FIG. 9 connected in a conventional geared manner to the drive mechanism (not shown) of the rotating heat seal and alignment drum 146. The feeder mechanism 224 preferably includes an enlarged cylindrical end section 235 having a groove 237 formed axially along its periphery. Disposed within the groove 237 shown in FIG. 8A and reciprocable throughout the length thereof, is an ejector pin 253 which is connected to a mechanical linkage (not shown) contained within the cylindrical head 235 and synchronized with the rotation of the heat seal and alignment drum 146. As will be explained in more detail below, the ejector pin 253 transfers an individual straw element 220 toward the periphery of the drum 146 during operation.

Referring to FIG. 9, an elongate riser 239 is rigidly attached to the shaft 233*a* and extends from the end of the cylinder 235 facing the drum 146 to a position substantially beneath the periphery of the heat seal and alignment drum 146. The top surface of the riser 239 is provided with a channel 241 having a square tubular configuration, the interior cross-sectional area of which is slightly greater than that of a single straw element 220. As shown in FIGS. 8 and 9, this channel member 241 is aligned with the groove 237 formed in the cylindrical end portion 235 such that a straw element 220 may be transferred axially throughout the length of the groove 237 and channel member 241. In the preferred embodiment, the channel member 241 has a sufficient length to accommodate three straw elements 220.

The extreme inward end of the riser 239 and channel member 241 is provided with a pair of access slots 243 which extend radially inward toward the shaft 233*a* to a depth slightly below the lower surface of the channel member 241. Further, the top portion of the channel member 241 is removed adjacent these slots 243 which, as will be recognized below, facilitates the removal of the straw element from the channel member 241. As best shown in FIGS. 9 and 10, these slots 243 are aligned with a pair of camming fingers 245 which are rigidly attached to the frame (not shown) of apparatus 10 and juxtapose the periphery of the heat seal and alignment drum 146. These camming fingers 245 contact the lower surface of the straw element 220 contained within the channel member 241, causing the straw element 220 to be transferred to the periphery of the rotating drum 146 as the feeder mechanism 224 rotates in a clockwise direction as indicated by the arrow in FIG. 8.

The periphery of the heat seal and alignment drum 146 includes an elongate groove or channel 226 which extends partially across the periphery of the hub 146 (as indicated by the dotted line in FIG. 9). The depth of this groove 226 is slightly less than the diameter of the straw element 220 such that, upon insertion of the straw element 220 into the aperture 226, a small portion of the diameter of the straw element 220 protrudes above the periphery of the drum 146.

In the preferred embodiment, the groove 226 is formed in an insert member 247 which is attached to and resides within the interior of the periphery of the heat seal and alignment drum 146. As shown, a raised portion 251 of the insert member is flush mounted to the drum 146 and forms a portion of the outer periphery of the rotating drum 146. Additionally, to maintain the straw element 220 within the groove 226 until the carton blank 100 is applied to the drum 146 (in a manner previously described), a shroud 249 (FIG. 10) is provided which is minimally spaced from the outer periphery of the drum 146 and extends between the upper end of the camming fingers 245 to just below the gap formed between the drum 146 and pinch roller 182 (FIG. 7).

In operation, as the heat seal and alignment drum 146 rotates in a counterclockwise direction (as indicated by the arrow in FIG. 8), the singulator 223 is rotated through a short distance (in a direction indicated by the arrow thereon), by the actuation of the hydraulic or pneumatic cylinder 231. This rotation of the singulator 223 causes a single straw element 220A, initially located at approximately a five o'clock position upon the singulator 223 (as indicated in FIG. 8A), to travel toward the opening 221 of the hopper 222 to an approximate six o'clock position. During this rotational travel, the portion of the straw element 220A residing immediately above the apertures 207 formed by the annular recesses 227B, contacts the periphery of the roller members 209 and is tightly pressed or squeezed against the lower wall of the hopper 222 by the springs 205. This squeezing causes the straw element 220A to deform into a pre-stressed oval configuration represented by the numeral 220B in FIG. 8A.

In synchronism, with the rotation of the singulator 223, the feeder mechanism 224 continuously rotates in a clockwise direction (as indicated by the arrow in FIG. 8A) so that the groove 237 formed on the cylinder 235 of the feeder mechanism 224 aligns or registers with the opening 221 of the hopper 222 and the groove 225B of the singulator 223. This alignment, which, due to the continuous rotation of the feeder mechanism 224, is maintained for only an instant of time, causes the single straw element 220B to exit the groove 225B of the singulator 223 (in a direction indicated by the phantom lined arrow in FIG. 8A) and enter the groove 237 formed in the feeder mechanism 224.

Due to the downward biasing force of the springs 205 as well as the pre-stressed oval configuration of the straw element 220B, and the high memory properties of the polyethylene straw element material, it will be recognized that the transfer between the grooves 225B and 237 occurs almost instantaneously, with the straw element 220B in effect being self-propelled or shot from the singulator 223 into the groove 237.

Subsequent to this transfer of the straw element 220B, the feeder mechanism 224 continues its rotation about the shaft 233 in a clockwise direction as indicated by the arrow in FIG. 8, so that, due to the groove 237 being formed slightly greater than the diameter of the straw element 220B, the straw element 220B may return to its initial unstressed cylindrical configuration. During this rotation, a shroud substantially surrounding the periphery of the cylindrical portion 235 of the feeder mechanism 224, maintains the straw element 220 within the groove 237.

As the groove 237 and straw element 220 rotate to approximately the nine o'clock position, as viewed in FIG. 8, the ejector pin 253 rapidly travels throughout the length of the groove 237, thereby causing the straw element 220 contained therein to enter into the channel member 241. The channel member 241 which, as previously mentioned, is formed to accommodate three straw elements, has been preloaded with two straw elements 220 during the previous two reciprocations of the ejector pin 253. Therefore, this transfer of the straw element 220 from the groove 237, advances the outer-most straw element to reside adjacent the extreme end of the channel 241.

Subsequently, the continued rotation of the feeder mechanism 224 causes the leading edge of the camming fingers 245 to enter into the slots 243 formed in the riser 239 (as shown in FIG. 10), and contact the lower surface of the straw element 220. Upon contact with the fingers 245, due to the continued rotation of the feeder mechanism 224, the straw 220 cams along the concave upper surface of the camming fingers 245 and travels vertically upward toward the periphery of the drum 146.

The rotation of the drum 146 and the feeder mechanism 224 are synchronized such that, as the feeder mechanism 224 rotates past the camming fingers 245, the groove 226 formed along the periphery of the drum 146 is aligned with the channel 241. Thus, continued rotation of the feeder mechanism 224 causes the straw element 220 contained within the channel 241 to enter into the groove 226 formed along the periphery of the drum 146. Once inserted in the channel 226, the straw element 220 is maintained therein by the shroud 249 (as shown in FIG. 10) which is minimally spaced from the outer periphery of the drum 146 and extends from the upper end of the camming fingers 245 to just below the gap formed between the drum 146 and pinch roller 182.

After the actuation of the feeder pin 253, during which the single straw element 220 is transferred into the channel member 241, the feeder pin 253 rapidly reciprocates back to its initial position as shown in FIG. 8 so that the channel 237 is free to receive an additional straw element 220 from the singulator 223, and repeat the cycle previously described. Thus, from the above, it will be recognized that the straw inserter 142 of the present invention provides a simple yet effective mechanism for transferring a series of single straw elements 220 from the hopper 222 onto the periphery of the drum 146.

Subsequent to the insertion of the straw element 220 into the channel 226, the drum 146 continues its counterclockwise rotation to the location where the carton blank 100 is transferred onto the hub 146 by the carton blank feeder mechanism 144 in the manner previously described. The location of the channel 226 on the periphery of the drum 146 is designed such that, when the carton blank 100 is transferred onto the drum 146, the channel 226 and straw element 220 is disposed beneath the aperture 126 of the carton element 100 as shown in FIG. 4. Thus, by the operation of the straw inserter 142 and the carton blank feeder mechanism 144, the carton blank 100 and straw element 220 are transferred onto the drum 146 in a proper relative orientation for the subsequent tape length heat bonding and sealing operation.

Continued rotation of the drum 146 causes the straw element 220 and carton blank 100 to pass under the tape dispenser unit 148 wherein a length of tape 230A is deposited over the aperture 126 of the carton blank 100 (as shown in FIG. 4).

Referring to FIG. 5, the tape dispenser mechanism 148 includes the following components: a length of tape 230, a pair of tape capstans 231 and 232, a tape guide 233, a back pressure chamber 234, and a supply spool 236. The supply spool 236 is rotatably mounted to the housing 238 and stores the length of tape 230 which, in the preferred embodiment, is formed of a polyethylene coated Mylar material. As shown, from the supply spool 236, the tape 230 is threaded through the tape guide 233 and disposed between the two tape capstans 231 and 232. In operation, the capstans 231 and 232 simultaneously contact the tape length 230, whereby the tape length 230 is cut and transferred to the carton blank 100 disposed upon the rotating heat seal and alignment drum 146.

Referring now to FIG. 11, the detailed construction and operation of the tape dispenser 148 may be described. As will be recognized, for purposes of illustration, the supply spool 236 and the vacuum chamber 234 have been removed from the apparatus in this figure. As shown, the tape capstans 231 and 232 are each mounted on a drive shaft 235 and 237, respectively, which are connected, as by a gear train, to the drum 146 to rotate in opposed directions (as indicated by the arrows in FIG. 11) in synchronism with the rotating heat seal and alignment drum 146.

The upper tape capstan 231 includes a substantially L-shaped housing 239 having a radially extending leg 241. The capstan 235 additionally includes a central cavity 243 into which is mounted a pressure plate 245 having a convex surface and a knife edge assembly 247.

The pressure plate 245 is preferably formed having a concave outer surface which includes a series of serrations or a knurl finish theron. As better shown in FIG. 13, the pressure plate 245 is mounted within the cavity 243 adjacent the leg 241 of the housing 239 and is retained in position by a spring 246 compressed between the pressure plate 245 and housing 239. This spring 246 biases the pressure plate 245 in a radially outward direction, yet permits inward movement of the pressure plate 245 in response to compression forces exerted on the top surface of the pressure plate 245.

A knife edge assembly 247 additionally resides within the cavity 243 and includes an L-shaped mounting member 251 onto which a blade 253 is securely mounted. As shown in FIG. 13, the L-shaped mounting member 251 is pivotally attached to the housing 239 by a self-aligning pin 249 which aligns the blade 253 with the other capstan 232 during rotation to ensure that the tape 230 is sheared completely across its width. Further, the mounting member 251 and blade 253 are biased in a counterclockwise direction against the housing 239 by a pair of springs 255. As such, the blade 253 is constantly urged against the pressure plate 245 and aligned with the other capstan 232 as the pressure plate reciprocates radially inward and outward within the cavity 243.

Referring to FIG. 12, it may be seen that the lower tape capstan 232 has a generally semi-circular configuration and includes a boss or land 257 which extends radially outward therefrom. As with the pressure plate 245 of the upper tape capstan 231, the top surface of the land 257 is formed in a convex configuration, the radius of which is complementary to that of the pressure plate 245 of the upper tape capstan 231. In addition, the land 257 includes a knife edge 254 adjacent one side thereof which aligns with the blade 253 of the upper capstan 231 during operation to shear the tape length 230 in a manner to be described below. The top surface of the land 257 includes a plurality of apertures 259 extending across the length thereof which are connected to an externally located vacuum source (not shown). As will become more apparent from the following description, the vacuum at these apertures 259 holds the tape length 230 against the land 257 for subsequent deposition upon the periphery of the drum 146.

As shown in FIG. 11, the tape capstans 231 and 232 are preferably positioned in a substantially vertical orientation and are spaced from one another such that, during their opposed rotation, the convex surfaces of the pressure plate 245 and land 257 tangentially contact one another. Additionally, the lower tape capstan 232 is mounted in close juxtaposition to the rotating drum 146 such that the outer surface of the land section 257 is minimally spaced from the periphery of the rotating drum 146 during rotation.

The tape guide 233 is composed of a picture frame-like support structure 261 having a pair of tapered, mating plates 263 and 265 which are rigidly mounted along the bottom surface of the frame 261 and pivotally mounted adjacent the median of the frame 261, respectively. The support frame 261 is additionally pivotally attached intermediate its length to a bracket 269 which is rigidly connected to the frame or housing 238.

A hydraulic or pneumatic operator 271 attached to the upper end of the frame 261 is provided to adjust the orientation of the plate members 263 and 265 relative the tape capstans 231 and 232. As will be recognized, by energizing the operator 271, the support frame pivots in a counterclockwise direction to position the plates 263,265 proximal the two tape capstans 231 and 232 as illustrated in FIG. 13.

The lower surface of the upper plate member 265 is formed having a shoulder 267 which extends throughout its width. This shoulder 267 forms, in effect, a one-way wedge which permits the upper plate 265 to pivot about its upper pivot axis toward the tape capstans 231 and 232, yet prevents any pivotal movement of the top plate member 265 in the opposite direction therefrom. Further, the top plate member 265 is constantly urged in the direction away from the capstans 231 and 232 by a spring 273 which extends from the rear surface of the top plate member 265 to the rigid support bracket 269. With the tape length 230 threaded between the plate members 265 and 263, the downward pivotal movement of the plate 265 is constrained by the lower plate 265 so that the tape length 230 is permitted to travel only in the direction toward the tape capstans 231 and 232, as indicated by the arrow in FIG. 11.

During the initial start-up procedure of the apparatus 10, the hydraulic actuator 271 is energized, thereby pivoting the plate members 263 and 265 closely adjacent the tape capstans 231 and 232 to the position indicated in FIG. 13. As shown, in this initial position, the tape length 230 preferably extends slightly beyond the ends of the plate members 265 and 263 and resides along a plane tangent between the tape capstans 231 and 232.

As the tape capstans 231 and 232 rotate in their opposed directions as indicated by the arrows in FIG. 13, the leading edges of the land 257 and the pressure plate 245 simultaneously contact opposite sides of the tape length 230, thereby tightly pinching the tape length 230 against the knurled top surface of the pressure plate 245.

The continued rotation of the tape capstans 231 and 232 causes the tape length 230 to be advanced from the tape guide 233 across the width of the concave surface of the land 257. During this rotation, the pinching pressure exerted by the land 257 against the top surface of the pressure plate 245 causes the pressure plate 245 to reciprocate in a radially inward direction, overcoming the opposing force exerted by the biasing spring 246. During this operation, the tape length 230 is advanced from the tape guide 233 while the pressure plate 245 reciprocates within the cavity 243 of the rotating member 231.

As shown in FIG. 14, with the continued opposed rotation of the tape capstans 231 and 232, the pressure plate 245 reciprocates radially inward beyond the top edge of the blade 253. Additionally, during this rotation, a pair of tabs 248 which protrude radially outward from the distal edge of the blade 253 contact the trailing edge of the knife edge 254 causing the blade 253 to pivot slightly backwards against the spring 255. This slight backwards pivoting aligns the cutting blade 253 with the knife edge 254 so that the blade 253 shears the tape length 230 adjacent the trailing edge of the land section 257 of the lower tape capstan 232. The sheared length of tape 230A (as shown in FIG. 14) is subsequently maintained on the outer surface of the land 257 of the lower tape capstan 232 during continued rotation of the tape capstans 231 and 232 by the vacuum applied through the vacuum apertures 259 (shown in FIG. 12).

The vacuum is maintained during the continued rotation of the capstan 232 until approximately the seven o'clock position (as viewed from FIG. 14), at which point the tape length is proximal the periphery of the drum 146 (shown in FIG. 11). In this seven o'clock position, the vacuum to the vacuum ports 259 of the lower tape capstan 232 is discontinued, so that the vacuum ports 147 located on the periphery of the heat seal and alignment drum 146 and acting through the aperture 126 of the carton blank 100 pull the tape length 230A from the surface of the land section 257 tightly against the periphery of the drum 146.

Referring to FIG. 4, the approximate size and orientation of the tape length 230A upon the carton blank 100 may be seen. As shown, the tape length 230A is formed having a length L which is sufficient to extend across the width of the aperture 126. Additionally, the width of the tape length 230 is sized to extend beyond the ends of the aperture 126 onto the carton segment 108 and the end closure panel 112. As will be explained in more detail below, this extension of the tape length 230*a* over the aperture 126 is necessary to facilitate the heat sealing and bonding process which subsequently occurs upon the rotating drum 146.

The rotational speed and relative orientation of the tape capstans 231 and 232 must be precisely synchronized with the rotation of the heat seal and alignment drum 146 to insure that the tape length 230A is deposited over the aperture 126 of the carton blank 100 upon the periphery of the rotating drum 146. Further, it will be recognized that it is imperative that the vacuum to the ports 259 located upon the land 257 of the lower tape capstan 232 be discontinued at the proper position to allow the tape length 230A to be transferred onto the periphery of the drum 146.

In the preferred embodiment, the applicant has found that by directly gearing the shafts 235 and 237 of the tape capstans 231 and 232, respectively, to the drive mechanism of the rotating drum 146 and additionally utilizing a slider plate valve (not shown) connected to the vacuum ports 259 to regulate the application of vacuum dependent upon the rotational orientation of the capstan 232, the precision and repetition necessary to facilitate proper operation of the tape dispenser 148 may be obtained.

Further, the applicant has discovered that, to maintain the proper orientation of the tape length 230 entering the tape guide 233 and to prevent an excess amount of tape 230 from being dispensed from the tape guide 233, it is desirable to power advance the tape length 230 from the supply spool 236 to the tape guide 233. In the preferred embodiment, this power tape advance is accomplished by a motor drive (not shown) on the spool 236 which is controlled by a pair of pressure sensitive switches (not shown) positioned at different locations within a vacuum chamber 234 (FIG. 5). As shown, the vacuum chamber 234 is preferably formed in a rectangular box-like configuration having a sealed and opened end, respectively. A vacuum duct 277 communicates with the vacuum chamber 234 adjacent the sealed end and is connected to an external vacuum source (not shown). Disposed midway between the sealed and open ends of the vacuum chamber 234 is a wire screen or mesh 275 which permits the vacuum to act therethrough yet prevents the tape length 230 from entering into the duct 277. The pair of vacuum switches (not shown) are disposed adjacent the open end of the chamber 234 and are horizontally spaced from one another and the mesh 275.

As shown, the tape length 230 is wrapped around a spool 279 and inserted into the open end of the vacuum chamber 234 in a looped configuration. The vacuum, acting through the duct 277, pulls the tape loop toward the wire screen 275, causing the vacuum to act upon the side of the tape length 230 facing the screen 275. Thus, it will be recognized that the pressure switches (not shown) are exposed to vacuum or atmosphere depending upon the location of the tape loop within the chamber 234. In the preferred embodiment, this alternative exposure to the vacuum or atmospheric pressure is used to control the motor drive (not shown) of the spool 236 with the motor being actuated when the switch furthest from the screen 275 is under vacuum and deactivated when the switch closest to the screen 275 is under atmospheric pressure. Thus, the amount of tape length 230 available to advancement through the tape guide 230 is automatically regulated to prevent the tape length 230 from being over-advanced during the tape dispensing cycle.

Additionally, it will be recognized that, due to the shearing of the tape length 230A occurring at a point substantially spaced from the end of the plate members 263 and 265 (as shown in FIG. 14), a short amount of tape 230B extends beyond the plate members 265 and 263 upon each shearing operation. After shearing, the tape end 230B is thus in proper position for the repetition of the tape advancing, shearing, and depositing cycle. Thus, from the above, it will be recognized that, after passing beneath the tape dispenser unit 148 of the present invention, a length of tape 230A is cut and placed over the aperture 126 and maintained upon the carton blank 100 disposed upon the periphery of the rotating heat seal and alignment drum 146.

The next process performed in Station 1 is the heat sealing and bonding process wherein the straw element 220 is tack bonded to the tape length 230A and the tape length 230A is concurrently sealed to the carton blank 100 over the aperture 126. In the preferred embodiment, this heat sealing and bonding procedure is accomplished on the rotating drum 146 by a novel heater plate apparatus which is stored in a retracted position within the interior of the drum 146 and intermittently cams outwardly through the periphery of the drum 146 to contact the carton blank 100.

As shown in FIGS. 6 and 7, the drum 146 includes four square-shaped apertures 250 which are spaced symmetrically around the periphery of the drum 146 (i.e., at 90° intervals). The leading edge 252 of each of the apertures 250 is located adjacent the rear alignment tab 206 such that the aperture 250 is closely positioned near the panel segment 108 when the carton blank 100 is maintained on the drum 146. Cooperating with the aperature 250 is a heater plate 254 pivotally connected to a cam follower 256 shown in FIG. 7 which rides within a cam 255 (illustrated schematically in FIG. 7) and is rigidly mounted within the interior of the drum 146. A hydraulic or pneumatic actuator 257 is additionally mounted to the cam follower 256 adjacent one end and extends to the heater plate 254 at a point located above the heater plate-cam follower pivot. As will become more apparent below, during rotation of the drum 146, the cam follower 256 rides within the stationary cam 255 thereby extending and retracting the heater plate 254 through the aperture 250. Upon extension therethrough; the hydraulic actuator 257 is energized and extended through a short distance causing the lower surface of the heater plate 259 to be pressed firmly down against the periphery of the drum 146.

The heater plate 254 preferably includes a resistive heating element (not shown) which electrically heats the plate 254 to a temperature suitable for rapidly tacking the polyethylene straw element 220 to the tape 230A as well as bonding the polyethylene coating on the Mylar tape length 230A to the carton blank 100. As shown in FIG. 15, the bottom surface 259 of the heater plate 254 includes a raised boss 261 formed in a rectangular picture frame-like configuration and a tab member 263 surmounted within the interior thereof, both of which are preferably formed having a smooth face. The outside dimensions of the boss 261 are sized slightly greater than the dimensions of the aperture 126 of the carton blank 100 such that when the heater plate 254 is pressed down upon the carton blank 100 disposed upon the periphery of the drum 146, the boss 261 and tab 263 contact the perimeter of the tape length 230A and a localized area of tape length located above the straw element 220, respectively, as indicated by the stippled lines in FIG. 4.

Referring to FIG. 7, the cycle of the heater plate 254 which occurs during each revolution of the drum 146 is illustrated. As the individual carton blank 100A is transferred to the periphery of the drum 146, in the manner previously described, the heater plate 254A (indicated in phantom lines) is stored within the interior of the drum 146 so that it does not interfere with the carton blank transfer process. As the drum rotates from a three o'clock position toward the twelve o'clock position, a cam follower 256 riding within the cam 255 extends the heater plate 254B radially outward through an aperture 250 and then slightly forward in a counterclockwise direction. While in this extended position, a pneumatic actuator 257 is energized in a direction indicated by the arrow in FIG. 7, thereby firmly pressing the bottom surface 259 of the heater plate 254B against the carton blank 100. In the preferred embodiment, the outward reciprocation of the heater plate 254B and direct contact against the carton blank 100 occurs rapidly and is completed at approximately the one o'clock position in FIG. 7. As previously mentioned, the heater plate 254 only contacts the carton blank 100 in the localized area of the tape length 230A, straw element 220, and aperture 126 (as indicated by the stippled lines in FIG. 4) such that the polyethylene substance coating the remainder of the blank 100 is not heated or damaged during this process.

The heater plate 254B remains in contact with the carton blank 100 for approximately ½ revolution of the drum 146 or until the heater plate 254C rotates past the nine o'clock position as shown in FIG. 7. During this period, the heater plate 254B, being at an elevated temperature due to a resistive heating element therein (not shown), causes the tape length 230A to be bonded to a portion of the straw element 220 and concurrently be sealed to be the outer surface of the carton blank 100.

It will be recognized that the temperature of the heater plate 254 must be maintained at a constant value which is sufficient to rapidly bond and seal the polyethylene straw element 220 to the polyethylene coated tape length 230*a* and carton blank 100, yet be low enough to prevent vaporization of the polyethylene material or the melting of the Mylar substrate of the tape length 230*a*. Further, due to the polyethylene straw element being substantially thicker than the polyethylene coating on the tape length 230*a* or carton blank 100, and the insulation effects of the cardboard carton blank 100, the temperature of the heater plate as well as the period of time that the heater plate 254 contacts the elements, must be carefully controlled to ensure a satisfactory seal and bond.

Additionally, the applicant has found that, due to the different thermal expansion rates of the Mylar and polyethylene materials, the tape length 230A, if preheated, will wrinkle during the bonding process. As such, the heater plates 254 must firmly press the tape length 230A against the carton blank 100 and additionally rapidly seal and bond the elements together.

Thus, it will be recognized that, through the reciprocating heater plate 254 and raised boss 261 and tab member 263 of the present invention, a rapid, direct heat and pressure bonding of the tape length 230A, straw element 220, and carton blank 100 may be accomplished (in the preferred embodiment occurring in a time span of approximately ½ of a second) which could not readily be accomplished by the application of a remotely located heating member or preheating of the tape length. Additionally, it should be noted that, although in the preferred embodiment the heater 254 utilizes a resistive heater element, alternative heating and bonding processes which could be adapted to the reciprocating heater plate 254 (such as ultrasonic welding) may be utilized effectively.

As the drum 146 continues to rotate past the nine o'clock position, the cam follower 256 and heater plate 254C begin their retraction cycle, removing the heater plate 254D from the carton blank 100 and retracting it beneath the aperture 250. As shown, this retraction cycle is complete when the drum 146 rotates to approximately the six o'clock position. Thus, after completion of one revolution of the drum 146 (which in the preferred embodiment occurs in one second), the heater plate 254 bonds the straw element 220 to the tape length 230A and concurrently provides a liquid-tight seal across the aperture 126 as shown in FIG. 4.

Although, for illustration purposes, the operation of only a single heater plate 254 has been described, it will be recognized that four heater plates 254 are provided on the drum 146 which cooperate with four apertures 250, such that four carton blanks 100 are heat sealed and bonded during a single rotation of the drum 146. Further, it should be noted that since the polyethylene coating is utilized on only one side of the tape length 230A and the Mylar substrate has a substantially higher melting point than polyethylene, the tape length 230A does not stick or adhere to the lower surface of the heater plate 259 when the heater plate 254 is retracted from the carton blank 100.

After the heat sealing and bonding process has occurred, the carton blank 100 is removed from the rotating drum 146 and transferred to the carton blank pivot mechanism 152 by the stripper wheel assembly 150. Referring to FIG. 16, the stripper wheel assembly 150 includes a disc element 262 which is securely mounted to a rotating shaft 264. In the preferred embodiment, this shaft 264 rotates at a speed precisely two times that of the drum 146 (i.e., 2 revolutions per second) such that two carton blanks 100 may be removed from the drum 146 during each revolution of the disc 262. The outer periphery 265 of the disc element 262 is located in close proximity to the periphery of the drum 146 (better shown in FIG. 17) and is separated from the drum 146 by a small space or gap 266. As will be explained in more detail below, this space 266 permits the carton blank 100 to be removed from the drum 146 and ride or be carried upon the disc 262.

Located generally on one side of the disc 262 and mounted stationary to the housing (not shown) is a stripper plate or shroud 268 having a concave inner surface 270 which is spaced concentrically around the periphery of the disc element 262. This concave surface 270 provides a deflector surface for the carton blank 100 and causes the carton blank 100 to conform to the shape of the disc 262.

The disc element 262 is additionally provided with two pairs of "L"-shaped transfer ears 272 located on both surfaces of the disc 262 and spaced 180° apart from each other. These ears 272 extend outward from the surface of the disc 262 in a direction parallel to the shaft 264 such that they may span across the width of the periphery of the drum 146. Each ear 272 is additionally provided with a pair of tabs 274 having chamfered inner edges 276 which engage or grip the end closure panels 112 and 114 of the carton blank 100 (FIG. 3) during the transfer of the carton blank 100 from the drum 146 to the disc 262.

The operation of the stripper wheel mechanism 150 may be easily understood by referring to FIGS. 16 and 17. The drum 146 and disc 262 are illustrated rotating in opposed directions as indicated by the arrows in FIG. 16. As the rotating drum 146 with the carton element 100 thereon approaches the stripper wheel mechanism 150 (i.e., the six o'clock position), the vacuum supply (not shown) to the vacuum ports 147 (shown in FIG. 11) is discontinued in the near vicinity of stripper wheel mechanism 150. This discontinuance of the vacuum from the ports 147 allows the leading edge of the carton blank 100 to lift from the surface of the drum 146 or spring in a downward direction into the space 266 (as shown in FIG. 17).

In this position, continued rotation of the drum 146 along with the rotation of the disc element 262 pushes the carton blank 100 into the passageway formed between the stripper plate or shroud 268 and the periphery of the disc 262. During this motion, the carton blank 100 contacts the concave surface 270 of the plate 268 and bends into an arcuate configuration. As the drum 146 and disc 262 continue their opposed synchronized rotation, the tabs 206 of the drum 146 and the ears 272 of the tabs 274 of the disc 262, confront each other in a tangential relationship, so that the tabs 206 and tabs 274 are in a generally parallel configuration as shown in FIG. 17.

In this position, the carton blank 100 releases from the registry tabs 206 as well as from the periphery of the drum 146 and is aligned by the tab 274 of the ears 272. As may be recognized, since the tabs 206 and 274 each include chamfered inside edges, transfer of the carton element 100 between the tabs 206 and 274 occurs smoothly without bending or deforming the carton blank 100.

Following this transfer of the carton blank 100 between the tabs 206 and 274, continued travel of the carton blank 100 is provided exclusively by the rotation of the disc 262 with the edges of the end panels 112 and 114 contacting the tabs 274 in a similar manner to that previously described in reference to the rotating drum 146 and with the stripper plate or shroud 268 loosely holding the carton blank 100 against the disc 262. Subsequently, as the disc 262 rotates through approximately a 180° arc, the carton blank 100 exits the stripper wheel mechanism 150 adjacent the lower end of the stripper plate 268 and is disengaged from the tabs 274 of the ear pairs 272. Thus, the carton blank 100 is deposited with the straw element 220 facing in a downward direction, upon the horizontal pivot mechanism 152 as shown in FIG. 16.

Once the carton blank 100 is disengaged from the ears 272, the disc 262 is free to continue its clockwise rotation without imparting any further motion to the carton blank 100 and travels toward the twelve o'clock position to another carton blank 100 on the drum 146. Thus, as may be recognized, during each 180° rotation, the stripper wheel mechanism 150 transfers a carton blank 100 from the rotating drum 146 by stripping or peeling the carton blank 100 off the periphery of the drum 146 and depositing it in a horizontal plane for subsequent transfer to Work Station II.

Subsequent to its removal from the heat seal and alignment drum 146 and prior to total disengagement from the stripper mechanism 150, the carton blank 100 is transferred to the carton blank pivot mechanism 152 which feeds the carton blank 100 into Work Station II (the Mandrel Wrapping and Folding Apparatus). As shown in FIGS. 16 and 18, the pivot mechanism 152 preferably includes a continuous chain drive loop 280 which extends between two sprockets 284 and is formed of a plurality of straight link segments 282 flexibly interconnected at each end. These chain segments 282 and their flexible interconnections allow the chain loop 280 to follow a substantially semi-circular path as it travels in the direction indicated by the arrows in FIG. 18.

A pair of support plates 271 and 273, preferably formed of Teflon (a registered trademark of E. I. DuPont De Nemours) possessing a concave and convex edge configuration, respectively, are rigidly mounted inboard and outboard of the chain loop 280 and form a guide channel which maintains the semi-circular orientation of the chain loop 280. In the preferred embodiment, these support plates 271 and 273 extend slightly vertically above the chain loop 280, thereby forming a support surface upon which the three leading carton blank segments 102 through 106 of the carton blank 100 may rest upon during transport (as shown in FIGS. 19 and 19A). Although not shown for purposes of illustration, it will be recognized that a similar pair of plate members is disposed adjacent the lower portion of the chain loop 280 to guide the chain loop 280 on its return travel.

The chain loop 280 is provided with five pairs of L-shaped channel members 287 (note only two pairs are shown in FIG. 18 for illustration purposes) which extend in a substantially perpendicular orientation thereto, and ride upon the top surface of the plate members 271 and 273. As shown, the channel member pairs 287 are equidistantly spaced from one another along the length of the chain loop 280, and oriented to consecutively receive a carton blank 100 from the stripper mechanism 150 in a manner described below. The height of the vertical leg 291 of these channel member pairs 287 is substantially less than the width of the horizontal leg 293, and includes a registry tab 295 adjacent both ends thereof. These tabs 295 are formed in a manner similar to the registry tabs 274 of the stripper wheel mechanism 150 and are designed to register the carton blank 100 along the edges of the end closure panels 112 and 114 in a manner previously described. The space between adjacent channel members of each of the channel member pairs 287 is sized to be slightly greater than the width of the end closure panels 112 and 114 of the carton blank 100 (as shown in FIG. 3), such that the carton blank 100 may be received therein.

As shown in FIG. 18, the chain loop 280 engages a pair of sprockets 284 which are rigidly mounted adjacent opposite ends of a split drive shaft 283. This shaft 283 engages a differential gear train (not shown) mounted within a differential housing 285 which is driven from the main drive system (not shown) of the rotating drum 146 and rotates the sprockets 284 in opposed directions as indicated by the arrows in FIG. 18. The rotational speed of the shaft 283 and thus the surface speed of the chain loop 280 is synchronized with the rotation of the disc 262 of the stripper wheel mechanism 150, such that, as the carton blank 100 is deposited in a horizontal orientation by the stripper mechanism 150 (as previously described), one of the channel member pairs 287 of the chain loop 280 is aligned beneath the axis of the disc 262 of the stripper wheel mechanism 150 (as shown in FIG. 19).

As the carton blank 100, carried by the alignment tabs 274 of the disc 262, approaches the six o'clock position, the L-shaped channel member pair 287 disposed on the chain loop 280 simultaneously extends around the sprockets 284 to assume the position shown in FIG. 19. In this position, the carton blank segments 102 through 106 of the carton blank 100 rest upon the support plates 271 and 273 while the frontal edges of the end closure panels 112 and 114 of the carton blank 100 contact the inside surface of the registry tabs 295 of the leading channel member 287. The continued relative movement of the disc 262 and the chain loop 280 causes the registry tab 295 of the trailing channel member 287 to contact the rear edge of the end closure panels 112 and 114, whereby the carton blank 100 is completely disengaged from the tabs 274 of the disc 262 with the end closure panels 112 and 114 as well as the trailing carton segment 108 residing exclusively within the pair of channel members 287 of the chain loop 280 (as shown in FIG. 19A).

Once disposed within the channel pairs 287, the carton blank 100 is transported in a semi-circular direction by the continued travel of the chain loop 280 (as indicated by the arrow in FIG. 18), and deposited adjacent the other sprocket 284 for insertion into the pre-feeder conveyor 300 (indicated by the phantom lines in FIG. 18). It will be recognized that, as the channel member pairs 287 approach the other sprocket 284, the leading carton blank segments 102 through 106 extend horizontally beyond the axis of the shaft 273 and are entered between the pre-feeder conveyor 300 and an inclined plate 309 disposed therebeneath (as shown in FIG. 18). The continued travel of the chain loop 280 causes the channel member pair 287 to extend downward over the sprocket 284, whereby the end closure panels 112 and 114 of the carton blank 100 are disengaged from the registry tabs 295 and the channel member pairs 287 travel back to their initial position along the lower portion of the chain loop 280. Subsequently, the pre-feeder conveyor 300 engages the end closure panels 112 and 114 of the carton blank 100 in a manner to be described below, thereby transferring the carton blank 100 to the carton blank wrapping and creasing mechanism at Work Station II.

It will be noted that during the operation of the carton blank pivot mechanism 152, consecutive carton blanks 100 are being received from the stripper mechanism 150 between the channel pairs 287 at one end of the chain loop 280, while simultaneously one of the previously entered carton blanks 100 is being transported toward the pre-feeder conveyor 300. Similarly, as a channel pair 287 having a carton blank thereon is traveling toward the conveyor 300, another channel pair 287 is moving back toward the stripper mechanism 150 along the lower path of the chain loop 280 to subsequently receive another carton blank 100 from the stripper mechanism 150. Thus, from the above description, it may be easily recognized that, by travel of the carton blank 100 through Work Station I, a straw element and sealing tape is bonded and sealed to the carton blank 100 and the carton blank 100 is positioned upon the pre-feeder conveyor 300 for subsequent entry into Work Station II.

Work Station II—Carton Blank Wrapping and Folding

Referring again to FIG. 5, the component systems comprising Work Station II (Carton Wrapping and Folding Apparatus) of the present invention may be described. Work Station II includes a pre-feeder conveyor 300, a shingling conveyor transport 302, forming mandrels 304, and a plurality of wrapping and creasing mechanisms 360 (not shown in FIG. 5) which are disposed adjacent each forming mandrel 304 and positioned beneath the shingling conveyor transport 302.

Basically, at Work Station II, the individual carton blanks 100 are transported from the pivot mechanism 152 of Work Station I, and registered for entry into the shingling or stacking conveyor transport 302 by the pre-feeder conveyor 300. Prior to the entry of the carton blanks 100 into the shingling conveyor transport 302, the carton blanks 100 are arranged in groups of four with each carton blank 100, within the foursome, partially underlayed or shingled beneath each other by the pre-feeder conveyor such that the leading edge of each trailing carton blank underlays the trailing edge of the previously entered carton blank 100 (illustrated in FIG. 21). Additionally, as will become more apparent below, the leading carton blank 100 of each foursome group is overlapped upon the preceding foursome group so that the leading edge of the leading carton blank overlaps the trailing edge of the last carton blank in the preceding group.

Disposed in this shingled orientation, the carton blanks 100 are transported as a foursome group across the top surface of the forming mandrels 304 by the shingling conveyor 302. The blanks 100 are then collated and each loosely wrapped around an individual mandrel 304 and separated from the conveyor transport 302. Subsequently, each of four carton blanks 100 is simultaneously formed into a square tubular configuration around and conforming to the shape of the forming mandrels 304 by the wrapping and creasing mechanism 360.

After having their side wall sections permanently creased to form a square tubular configuration, all four of the carton blanks 100 are pushed off or ejected from the forming mandrels 304, and transferred to Work Station III (Seam and End Closure Bonding Apparatus). Thus, as will become more apparent from the disclosure below, upon completion of their travel through Work Station II, the carton blanks 100 are formed into a square tubular configuration as shown in FIG. 29, with the straw element 220 and tape length 230A sealed thereon.

Figure 20:
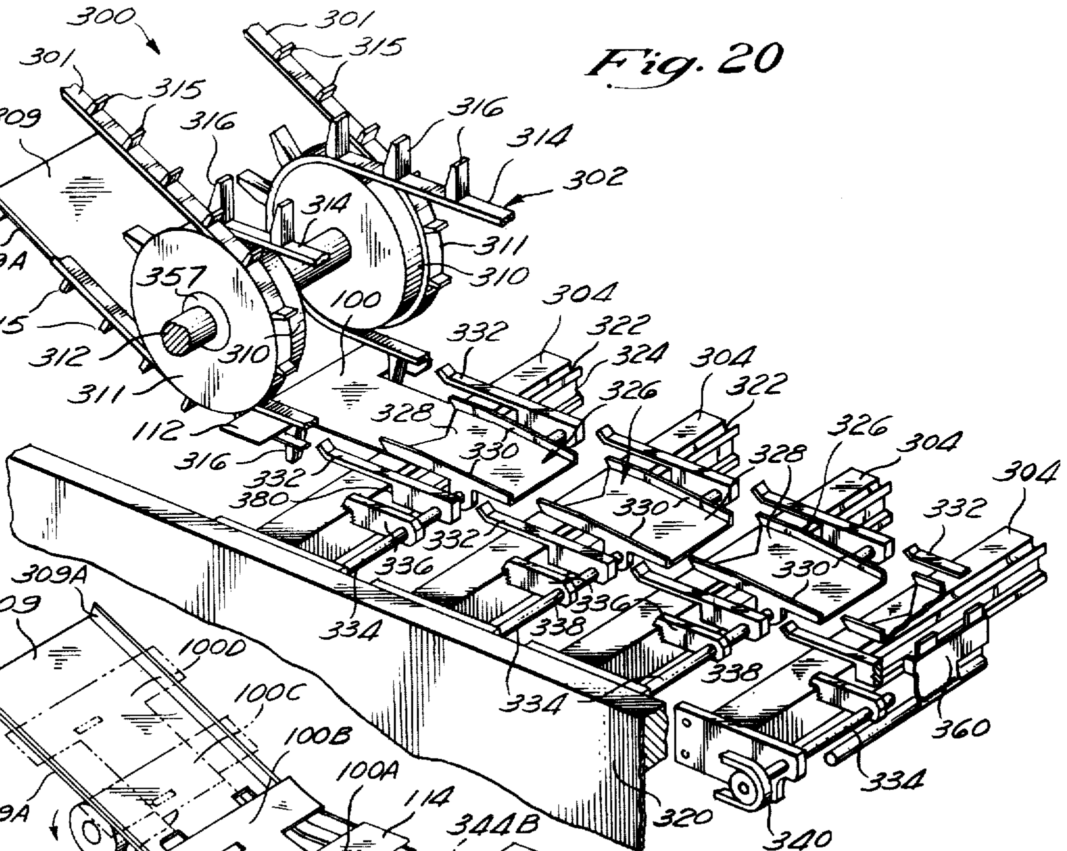
FIG. 20 is a perspective view of the pre-feeder conveyor and shingling conveyor transport of the present invention depicting their relative orientation with the forming mandrels and wrapping and creasing mechanisms.

Referring now to FIGS. 20 through 28, the detailed construction and operation of the apparatus comprising Work Station II (Carton Blank Wrapping and Folding Apparatus) will be disclosed. As shown in FIG. 20, the shingling conveyor transport 302 and pre-feeder conveyor 300 both include a conveyor belt, 314 and 301, respectively, which are mounted at one end in a conventional manner by two pulley pairs 310 and 311. Both of the pulley pairs 310 and 311 are carried by a common shaft 312 with the pulley pairs 310 being rigidly mounted to the shaft 312 and the pulley pair 311 being rotatably mounted upon the shaft 312 by a suitable bearing 357.

As shown in FIGS. 1 and 16, the belts 301 of the pre-feeder conveyor 300 are held taut between the pulleys 311 and an additional pair of pulleys 313 which are rigidly mounted to a shaft 317, connected, as by a gear transmission (not shown), to the main drive system (not shown) of the heat seal and alignment drum 146. Similarly, as shown in FIG. 5, the conveyor belts 314 of the conveyor transport 302 extend to an additional pair of pulleys 319. As will be recognized, by such an arrangement, the pre-feeder conveyor 300 is driven by the shaft 317 (shown in FIG. 16) while the shingling conveyor transport 302 is driven by the shaft 312.

In the preferred embodiment, the travel of both the pre-feeder conveyor 300 and shingling conveyor transport 302 are synchronous, with the speed of the pre-feeder conveyor 300 being faster than that of the shingling conveyor 302. As will be explained in more detail below, this speed differential permits the carton blanks 100 entering the pre-feeder conveyor 300 to be arranged in groups of four, and shingled or underlayed beneath each other prior to their engagement with the stacking conveyor transport 302.

Each of the belts 314 and 301 of the conveyor transport 302 and the pre-feeder conveyor 300 are additionally provided with plural pairs of registry tabs 316 and 315, respectively, which extend normal to the surface of the belts 314 and 301, and are spaced at predetermined intervals along the entire length of both belts. As previously described in relation to the tabs 206 and 274 of the rotating drum 146 and disc element 262, respectively, the space between adjacent tabs 316 and 315 of each tab pair is sized to receive the end closure panels 112 and 114 of the carton blanks 100 (shown in FIG. 3). Further, as shown, the tabs 316 on the conveyor transport 302 are formed substantially longer than the tabs 315 on the pre-feeder conveyor. As will become more apparent below, this extended length of the tabs 316 permits the conveyor transport 302 to engage the carton blanks 100 upon the pre-feeder conveyor 300 in a manner which compensates for the speed differential between the conveyors 300 and 302.

As best shown in FIG. 20, the pre-feeder conveyor 300 is preferably oriented at an angular inclination to the shingling conveyor 302 and is disposed slightly above an inclined plate member 309 which extends between the carton blank pivot mechanism 152 (shown in FIG. 16) and the shingling conveyor transport 302 (as shown in FIG. 20). This inclined plate member 309 is pivotally mounted adjacent its upper end and communicates with a cam drive 321 which rotates to intermittently raise and lower the plate member 309 about its pivot. The plate member 309, in addition, preferably includes a pair of side members 309A which extend vertically upward from the main planar surface of the member 309. As will be explained in more detail below, this plate member 309 provides a lower support for the carton blank 100 traveling along the pre-feeder conveyor 300 and additionally permits the carton blanks to be arranged into groups of four and partially underlapped beneath each other prior to their entry into the shingling conveyor transport 302.

Disposed beneath the plane of the conveyor belts 314 and equidistantly spaced along the length of the conveyor transport 302, are four forming mandrels 304 which are rigidly attached to the housing 320 at one end thereof. As shown, these mandrels 304 are preferably formed having a generally square cross-section and include a concave channel 322 and a pair of recesses 324 formed along their top and two side surfaces, respectively, which extend partially throughout their length (better shown in FIG. 24). The concave channel 322 receives the straw element 220 attached to the carton blank 100 during the folding process, whereas the recess 324 facilitates the ejection or transfer of the carton blank 100 from the mandrel 304.

Cooperating with each mandrel 304 and mounted adjacent one side thereof, is a separator plate apparatus designated generally by numeral 326 which forms a portion of the wrapping and creasing mechanism 360. As shown in FIG. 20, the separator plate apparatus 326 includes a slider plate 328 having raised side walls 330, and a pair of rigid elongate stops 332, all of which are mounted to a shaft 334. The shaft 334 is supported adjacent one end thereof by a support arm 336 having a bearing aperture 338 therethrough which allows the shaft 334 to be rotated therein. All four of the shafts 334 are additionally connected at one end thereof to a common drive mechanism 340 which may typically include a linkage drive such that all of the shafts 330 can be rotated simultaneously.

Figure 21:
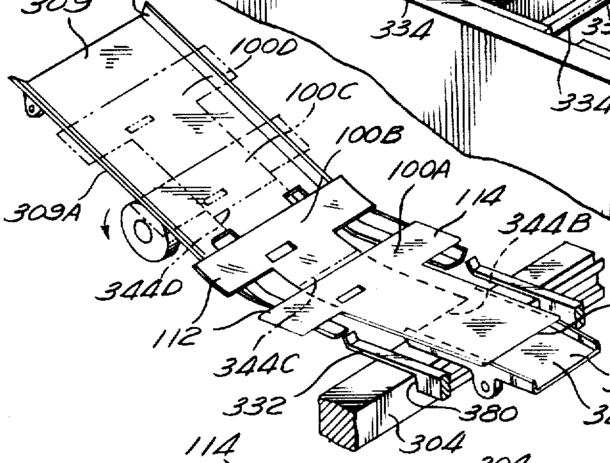
FIG. 21 is a perspective view showing the position of a carton blank of the present invention as it enters the shingling conveyor transport of FIG. 20 and illustrating the manner in which the carton blanks are stacked one beneath the other.

During the operation of Work Station II, each of the carton blanks 100 (shown in FIG. 16) is transported from the carton pivot mechanism 152 of Work Station I by the pre-feeder conveyor 300 which receives the end closure panels 112 and 114 of each of the carton blanks 100 between its registry tabs 315 in a manner previously described. During this transfer, the carton blanks 100 are transported between the lower conveyor loop of the pre-feeder conveyor 300 and the top surface of the inclined plate member 309 (as shown in FIG. 20) and travel toward the shaft 312 of the shingling conveyor transport 302. As best shown in FIG. 21, during this transport, the end closure panels 112 and 114 ride along the top surface of the raised side panels **309*a* of the plate member 309. As such, the trailing edge of each carton blank 100 is slightly elevated by the side walls 309A while the leading edge of the carton blank 100 resides directly against the main planar surface of the plate member 309**.

As illustrated in FIG. 21, this differing elevation of the carton blanks 100 upon the inclined plate 309, allows consecutive carton blanks 100A, 100B, 100C, and 100D of each foursome to be group oriented along the plate member 309 such that the leading edge of the following carton blanks 100B, 100C, and 100D (indicated by the phantom lines referenced by numerals 344B, 344C, and 344D, respectively) lies beneath the trailing edge of the preceding carton blanks 100A, 100B, and 100C. As such, consecutive carton blanks 100 are underlayed or shingled along the inclined plate member 309 for subsequent entry into the shingling conveyor transport 302.

This shingling along the inclined member 309 permits consecutive carton blanks 100A, 100B, 100C, and 100D to be wrapped around an individual forming mandrel 304, even though the mandrels 304 are spaced closer to one another than the length of the blanks 100. Further, this arrangement permits the compact arrangement of the mandrels 304 and the succeeding equipment stages, and is an important factor in permitting the present apparatus to occupy very limited floor space.

In addition to the shingling procedure, the inclined plate member 309 (as previously mentioned) arranges the incoming carton blanks 100 into groups of four for subsequent travel across the four forming mandrels 304. In the preferred embodiment, this grouping procedure is provided by the upward pivoting (in a counterclockwise direction as viewed in FIG. 21) of the plate member 309 caused by the rotation of the cam 321.

In operation, as every fourth carton blank 100 travels down the inclined plate member 309 toward the conveyor transport 302, the lobe of the cam 321 causes the plate member to pivot upward. This upward pivoting of the plate member 309 causes the leading edge 344 of every fourth carton blank 100 to be disposed above the trailing edge of the preceding carton blank (i.e., overlapped upon the other foursome group) upon the inclined plate member 309. Subsequently, the cam 321 continues its rotation, so that the plate member 309 is again disposed in its lower, normal operating position.

As such, the next three entering carton blanks 100 are underlayed in the manner previously described, wherein the frontal edge 344 of each carton blank 100 lies beneath the trailing edge of the preceding carton blank upon the plate member 309. As will be explained in more detail infra, this particular foursome grouping of the carton blanks 100 permits the first four carton blanks 100A through 100D to be creased into a square tubular configuration about the forming mandrels 304 while a second group of four carton blanks 100 are simultaneously transported by the shingling transport conveyor 302 toward the individual forming mandrels 304. Hence, the creasing and forming cycles of the apparatus are superimposed with the transport and collating cycles of the apparatus, as will become more apparent infra.

During the shingling procedure upon the inclined plate member 309, the registry tabs 316 of the shingling conveyor transport 302 begin receiving the end closure panels 112 and 114 of the consecutive carton blanks 100A through 100D. Due to the pre-feeder conveyor 300 transporting the carton blanks 100 at a speed faster than travel of the conveyor transport 302, it is necessary to avoid accumulation and clogging of the carton blanks 100 upon the inclined plate 309. Thus, the conveyor transport 302 must remove the consecutive carton blanks 100A through 100D from the inclined plate member 309 at a speed greater than the actual traveling speed of the conveyor transport 302. In the preferred embodiment, this increased removal speed on the inclined plate member 309 is provided by the increased length and radial spacing of the registry tabs 316 of the conveyor transport 302 engaging the end panels 112 and 114 of the carton blanks 100.

As will be recognized, by engaging the carton blanks 100A through 100D at a point adjacent the extreme outer radial end of the registry tabs 316, the effective diameter of the pulley pairs 310 is increased and thus the surface speed of travel about the pulleys 310 is increased. In the preferred embodiment, the length of the tabs 316 (and thus their radial spacing) is formed such that, upon engagement with the carton blanks 100A through 100D, the effective diameter of the pulleys 310 in conjunction with the rotation of the shaft 312 exceeds the speed of travel of the pre-feeder conveyor 300. Thus, by such an arrangement, consecutive carton blanks 100A through 100D are rapidly stripped from the pre-feeder conveyor 300 at a speed equal to the speed of the pre-feeder conveyor 300 and subsequently transported horizontally at a slower speed by the transport conveyor 302 toward the forming mandrels 304.

Since the width across the raised edges 330 of the slider plate 328 is slightly less than the length of the carton segments 102 through 108, of the carton blank 100 (shown in FIG. 3) during this transport by the shingling conveyor 302 toward the forming mandrels, the undersurface of the carton blanks 100 rest upon and are supported by the raised edges 330 of the slider plates 328. As such, consecutive carton blanks 100A, 100B, 100C, and 100D upon the conveyor 302 may travel unrestricted across all four of the forming mandrels 304.

As the leading edges 344 of each consecutive carton blank 100A, 100B, 100C, and 100D, carried by the conveyor 302 (FIG. 21), approach their respective forming mandrels 304, the drive mechanism 340 of the wrapping and creasing mechanism 360 is momentarily activated, causing each shaft 334 to rotate through a short arc in a clockwise direction. This short arcuate rotation causes the rigid stops 332 and the slider plates 328 to pivot about the shafts 334 and raise vertically upward along their leading edges. The carton blanks lying directly above the slider plates 328 (such as 100A shown in FIG. 21) during activation will be slightly lifted, while the leading edge 344B of the following carton blank (such as 100B shown in FIG. 21) is deflected downward by the plate 328 to travel beneath the slider plate 328. As will be recognized, the fifth carton blank which was previously overlayed upon the previous carton blank 100D by the pivoting of the inclined plate member 309, will additionally be slightly lifted during this pivoting of slider plate 328 such that the fifth carton blank 100 will not enter the creasing mechanism 360 at this time.

After entry of the leading edge 344 beneath the slider plate 328, the drive mechanism 340 is deactivated such that the slider plate 328 and the rigid stops 332 pivot back to their lowered position (i.e., the position indicated in FIG. 20). Thus, the activation and deactivation of the separator plate apparatus 326 effectively separates or collates the individual carton blanks 100A, 100B, 100C, and 100D adjacent each forming mandrel 304. Further, since the slider plates 328 are returned to their initial planar orientation, the subsequent group of four carton blanks 100 may be transported in the same manner by the shingling conveyor 302 toward the respective forming mandrels 304.

Figure 22:
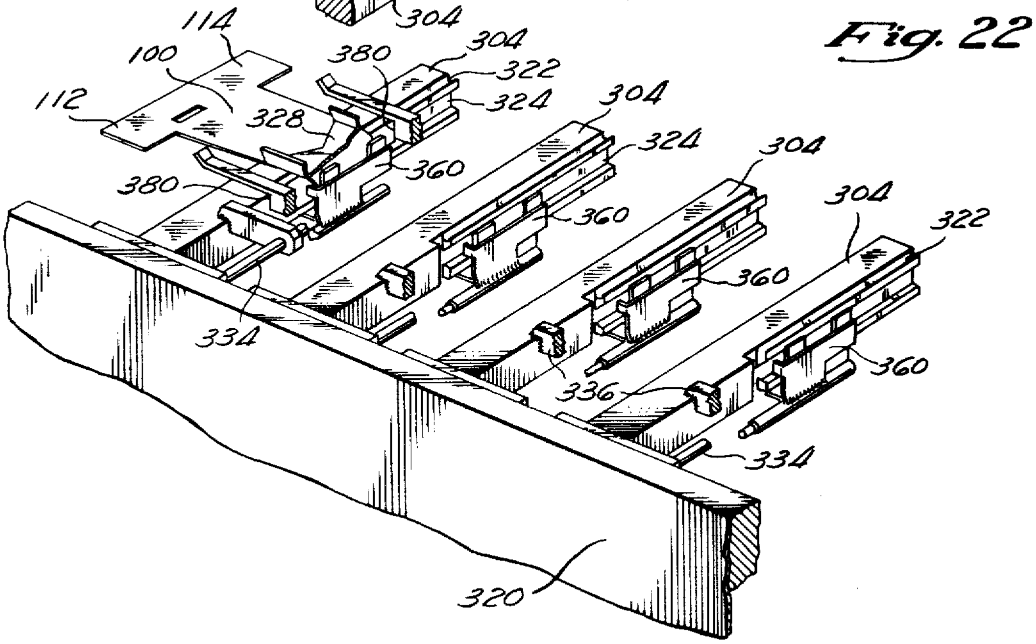
FIG. 22 is a perspective view showing the position of an individual carton blank as it enters the wrapping and creasing mechanism, the blank being disposed about the forming mandrel.

Subsequent to the activation and deactivation of the separator plate apparatus 326, the end closure panels 112 and 114 of the carton blank 100 are still engaged with the conveyor transport 302 such that each of the carton blanks 100A, 100B, 100C, 100D continue their horizontal travel beneath the slider plates 328 whereby the leading edge 344 of the carton blank 100 contacts the creasing mechanism 360 as shown in FIGS. 22 and 23.

The creasing mechanism 360 includes a hinged member 362 having a reciprocating vertical wall 364 and an L-shaped pivoting, clamping jaw 366. As clearly shown in FIGS. 23 and 24, the vertical wall 364 is rigidly mounted to an elongate sleeve member 368 which is clamped at one end into a support rail 372. The sleeve member 368 supports a rotatable shaft 370 which extends beyond both ends thereof and includes an end cap 374 which is securely mounted to the shaft 370.

The L-shaped clamping jaw 366 is rigidly connected to this end cap 374 such that, as the shaft 370 is rotated in a clockwise direction, the jaw member 366 rotates toward the vertical wall 364. As will become more apparent, this rotation of the jaw member 366 toward the vertical wall 364 imparts a permanent crease or fold to the carton blank 100, thereby forming the carton blank 100 into a square tube configuration. The inside surfaces of the vertical wall 364 and the L-shaped clamping jaw 366 are each provided with a pair of spring plates 378 preferably formed from Teflon (a registered trademark of E. I. DuPont de Numour) which effectively presses the carton blank 100 against the mandrel 304 during the folding process. Additionally, a deflector finger 279 is provided which is rigidly attached to the vertical wall 364 and extends in an angular segmented arcuate manner between the spring plates 378 of the vertical clamping jaws 364 and 366, respectively.

As shown in FIG. 22, the creasing mechanism 360 is positioned below the separator plate apparatus 326 and disposed adjacent the side and bottom surfaces of the forming mandrel 304. In this position, the creasing mechanism 360 forms a barrier to deflect the horizontal travel of the carton blank 100 below the slider plate 328 and is free to operate without interference from the separator plate apparatus 326 and shingling conveyor transport 302.

The operation of the creasing mechanism 360 is illustrated in FIGS. 22-27. As previously mentioned, during actuation of the separator plate apparatus 326, the leading edge of the carton blank 100 passes beneath the slider plate 328. After further movement caused by the conveyor belts 314, the leading edge 344 of the blank 100 contacts the deflector finger 279 disposed on the inside surface of the vertical wall 364 of the creasing mechanism 360 (better shown in FIG. 23). This contact with the deflector finger 279 deflects the leading edge 344 of the carton blank 100 in a downward direction, and with the continued horizontal transport of the carton blank 100 by the shingling conveyor transport 302, causes the elongate section of the carton blank 100 (formed by the segments 102-108) to cam against the finger 279 to loosely wrap around the forming mandrel 304, as shown in FIG. 25.

During this same horizontal transport, the leading edge of the end closure panels 112 and 114 of the carton blank 100 approach the forming mandrel 304, and contact the base of the elongate stops 332 of the separator plate apparatus 326 shown in FIG. 21. Since the ends of the stop 332 are bent in an upward inclination, the end closure panels 112 and 114 slide beneath the lower surface of the stops 332, but above the top surface of the forming mandrel 304. Continued horizontal travel of the carton blank 100 by the shingling conveyor transport 302 causes the leading edge of the end closure panels 112 and 114 to contact or abut the shoulder 380 at the base of the stops 332. This direct abutment with the shoulder 380 effectively stops the horizontal travel of the carton blank 100 on the shingling conveyor transport 302 and registers the carton blank 100 on the mandrel 304 such that the end closure panels 112 and 114 and the carton segment 108 (as shown in FIG. 3) lie exclusively on the top surface of the mandrel 304 and the straw element 220 is disposed within the concave channel 322.

It will be recognized that during the entry of the carton blank 100 into the creasing mechanism 360 beneath the stop 332, the carton blank 100 is continuously being pulled in a downward direction from the conveyor transport 302 by the stop 332. This pulling causes the end closure panels 112 and 114 during the wrapping process to slowly slide down the length of the registry tabs 316 away from the belts 314 so that the panels 112,114 engage the tabs adjacent their lower end. Referring to FIG. 20, the frontal edge of the tabs 316 is preferably formed having a beveled or angular configuration which permit the carton blank 100 to readily be disengaged from the conveyor transport 302 upon confronting a substantial resistance to movement. As such, upon abutment with the shoulder 380, the increased resistance to the horizontal travel of the carton element 100 along the conveyor transport 302 causes the registry tabs 316 to completely disengage from the end panels 112 and 114 and slide harmlessly over the trailing edge of the carton blank 100. In this manner, the carton blank 100 is maintained upon the forming mandrel 304 and is disengaged from the conveyor transport 302 without damaging or permanently creasing the end closure panels 112 and 114 of the carton blank 100.

Upon disengagement of the carton blank 100 from the conveyor transport 302, the creasing mechanism 360 is activated to begin the carton folding or creasing process. The progression of operations performed by the creasing mechanism 360 is illustrated schematically in FIGS. 25 through 27.

In its initial position (FIG. 25), the creasing mechanism 360 partially surrounds the forming mandrel 304, and carries the carton blank 100 adjacent the deflector finger 279 along its inside surfaces. As shown in FIGS. 25 through 27, each of the forming mandrels 304 is preferably formed having a slightly inclined top surface and includes a small blocking member 381 extending a short distance above its top surface and rigidly mounted adjacent one side. As will be recognized due to this short protrusion above the top surface of the mandrel 304, the carton blank 100 is free to slide over the blocking member 381 during the above-described wrapping process and reside slightly beyond the blocking member 381 as depicted in FIGS. 25 through 27. As such, the trailing edge of the carton blank 100 lays flat upon the slightly inclined top surface of the forming mandrel 304 and is prevented from movement laterally away from the creasing mechanism 360 by the blocking member 381.

Subsequently, the entire creasing mechanism 360 is reciprocated toward and abutted against the side surface of the forming mandrel 304 (shown in FIG. 26) by the transverse movement of the rail 372 as indicated by the arrow in FIG. 23. By this movement, a corner 382 (shown in FIG. 26) is permanently formed or creased into the carton blank 100 along the upper surface of the mandrel 304 with the stop member 381 preventing the carton blank 100 from sliding across the top of the mandrel 304. The formation of this corner 382 is aided by the indentation or scoring line 110 registered along the edge of the mandrels 304 and formed on the carton blank 100 (as shown in FIG. 3) which significantly reduces the resistance to folding.

With the vertical wall 364 of the creasing mechanism 360 remaining in its abutted relationship with the mandrel 304 (as shown in FIG. 26), the L-shaped jaw member 366 is rotated in a clockwise direction whereby the spring plate 378 urges the remaining segments (102-106) of the carton blank 100 against the forming mandrel 302 (shown in FIG. 27).

In the preferred embodiment, the movement of the L-shaped jaw member 366 is accomplished by the rapid rotation of the shaft 370 through a short arc. Upon closing, the jaw member 366 permanently creases the carton blank 100 adjacent the lower edges of the carton blank 100 (as shown in FIG. 27) thereby forming corners 384 and 386. As previously mentioned in relation to the corner 382, the formation of these edges 384 and 386 occurs at the scoring lines 110 formed along the carton blank 100.

Since the spring clips 378 contact the carton blank 100 adjacent the corners of the forming mandrel 304, during closure of the jaw member 366, the carton member 100 is moderately stretched against the flats of the mandrel 304 to eliminate the possibility of sagging of the carton blank intermediate of the edges 384 and 386. Further, during closing of the jaw member 366, the deflector fingers 279 extend through the open slot 281 (shown in FIG. 23) formed in the jaw member 366 to extend beneath the jaw member 366 as shown in FIG. 27. As such, the carton blank 100 is tightly creased about the mandrel without any interference from the deflector finger 279. Thus, as may be recognized, by the dual movement of the creasing mechanism 360, first toward the mandrel 304, and then upward against the bottom and side surface of the mandrel 304, the carton blank 100 is folded into a square tubular configuration.

After the creasing mechanism 360 has folded the carton blank 100 around the mandrel 304, the carton blank 100 must be removed from the forming mandrel 304 and inserted upon the crossbar mandrel 400 (as shown in FIG. 30) which forms part of Work Station III (Seam and End Bonding Station). However, prior to this transfer of the carton blank 100 into Work Station III, the sealing tab 120 (as shown in FIG. 27) which extends above the top surface of the mandrel 304 must be folded over and permanently creased upon the top surface of the mandrel 304. Additionally, this sealing tab 120 must be folded over in a manner so as to be positioned beneath the lower surface of the carton segment 108 (i.e., the carton segment 108 overlays the sealing tab 120).

In the preferred embodiment, this folding of the sealing tab 120 is accomplished in a simple yet effective manner and occurs during the transfer of the carton blank 100 from the forming mandrel 304 to Work Station III. Referring to FIG. 24, the apparatus for bending or folding over the sealing tab 120 and for transferring the carton blank 100 from the forming mandrel 304 to Work Station III is shown. For purposes of illustration, it will be noted that, in FIG. 24, the carton blank 100 has been removed from between the forming mandrel 304 and the creasing mechanism 360. As shown, the vertical wall 364 and one of the legs of the L-shaped jaw 366 of the creasing mechanism 360 include a tab 388 at one end thereof, which extends inwardly toward the side surfaces of the forming mandrel 304. As may be recognized, these tabs 388 ride within the recess channels 324 formed along both side surfaces of the mandrel 304 whereby the creasing mechanism 360 may slide forward along the length of the mandrel 304.

Disposed adjacent one end of the forming mandrel 304 and closely positioned to the top surface thereof is a folding block 389 which is rigidly mounted to the housing (not shown). The front edge of the block 390 is provided with an enlarged radius 399 and is inwardly tapered to provide an entry camming surface, whereas the side wall 392 is beveled so that only a reduced thickness of the block 389 extends across the width at the top surface of the forming mandrel 304. As will be explained in more detail below, positioned in such a manner the block 389 directly contacts the sealing tab 120, but only slightly lifts the carton segment 108 during transfer of the carton segment 100 from the forming mandrel 304 to Work Station III.

The sealing tab folding operation and the transfer of the carton blank 100 from the mandrel 304 to Work Station III may now be described. With the creasing mechanism 360 maintained in its closed position and the carton blank 100 formed into a substantially square tubular configuration as shown in FIG. 27, the tabs 388 of the creasing mechanism 360 contact the rear edge of the carton blank 100. The entire creasing mechanism 360 then reciprocates forward or slides along the length of the forming mandrel 304 toward Work Station III. In the preferred embodiment, this sliding movement is accomplished by the travel of the rail 372 in a direction indicated by the arrow in FIG. 23. However, other embodiments wherein only the jaw members 364 and 366 travel along the mandrel 304 may be utilized.

As this sliding movement is initiated, the carton blank 100 passes beneath the stops 332 (as shown in FIG. 20) and is thereby released from the biasing force of the stops 332 which previously held the end closure panels 114 and 112 and the carton segment 108 against the inclined top surface of the mandrel 304.

Due to the subtly inclined top surface of the mandrel 304 as well as the moderate memory properties of the carton blank 100, during this sliding movement and upon release from the stops 332, the end closure panels 114 and 112 and the carton segment 108 tend to slightly spring upward off the top surface of the mandrel 304 to lie in an inclined orientation. This inclined orientation aids in the transfer process and additionally in the sealing tab fold-over process by allowing the end closure panels 114 and 112 and the carton segment 108 to slide past the folding block 389 while the sealing tab 120 is forced beneath the block 389. Thus, during the forward travel of the carton blank 100 along the mandrel 304, the end panels 114 and 112 and the carton segment 108 harmlessly ride against the upper beveled edge 392 of the block 389 and pass beyond the block 389. However, the sealing tab 120 directly abuts the camming edge 390 of the block 389 and is thereby bent in a downward direction toward the top surface of the mandrel 304.

As best shown in FIG. 28A, the upper left corner of the mandrels 304 (as well as the mandrels 402 of the crossbar mandrel 400 of FIG. 30) are provided with a small notch 383, the depth of which is sized slightly greater than the thickness of carton blank 100. The notch 383 preferably extend partially across the top surface of the mandrels 304 through a length slightly greater than the width of the sealing tab 120. As such, the notch or pocket 383 is adapted to receive the sealing tab 120 during the fold-over process.

It will be recognized that the fold-over process of the tab 120 is aided by the spring plate 378 which maintains the carton blank 100 tightly against the side surface of the mandrel 304 and the scoring line 110 (as shown in FIG. 3) which weakens the carton blank 100 at a point adjacent the edge of the forming mandrel 304. As such, during the transfer of the carton blank 100 onto the crossbar mandrel 400 (of Work Station III), the sealing tab 120 is bent over and forced between the bottom surface of the block 389 and the top surface of the forming mandrel 304 to reside within the notch 383 (as shown in FIG. 28A).

Referring to FIG. 28, the completion of the transfer of the carton blank 100 from the forming mandrel 304 onto the crossbar mandrel 400 (of Work Station III) is illustrated. As may be seen, the forming mandrel 304 and the crossbar mandrel 400 are aligned in an end-for-end orientation such that, as the carton blank 100 is pushed off the end of the forming mandrel 304, it is inserted onto the crossbar mandrel 400. Additionally, both the mandrels 304 and individual mandrels 402 of the crossbar mandrel 400 include a concave channel 322 and 422 which receives the straw element 220 during the forming and transfer processes, respectively.

Upon completion of the transfer of the carton blank 100 to the crossbar mandrel 400 (of Work Station III), the sealing tab 120 (indicated in phantom lines) contacts the top surface of the crossbar mandrel 400 and lies beneath the carton segment 108 of the carton blank 100. Thus, from the above description, it will be recognized that, upon completion of its travel through Work Station II, the carton blank 100 is permanently creased or folded into a square tubular configuration, having its sealing tab 120 placed beneath the lower surface of the caaton segment 108 as shown in FIG. 29, and additionally has been transferred to the crossbar mandrel 400 of Work Station III.

Following this transfer of the carton blanks 100 to the crossbar mandrel 400, the rail 372 reciprocates back to its initial position and the creasing mechanism 360 returns to its initial position adjacent the forming mandrels 304 (as indicated in FIG. 22) and is disposed to receive the subsequent group of four carton blanks 100 which were simultaneously being transported by the stacking conveyor 302 during the creasing process.

For illustration purposes, the description as to the operations occurring at Work Station II has been presented in relation to a single carton blank 100 being formed around a single mandrel 304. However, it will be recognized that the same procedure described for the single carton blank 100 occurs simultaneously at the other three forming mandrels 304. Additionally, it will be recognized that, although in the preferred embodiment, four mandrels are utilized at this station, fewer or additional forming mandrels 304 with their respective folding and creasing mechanisms 360 may be utilized and the pivoting of the plate member modified to group the carton blanks accordingly, without departing from the spirit of this invention.

Work Station III—Seam and End Bonding Apparatus

Subsequent to the previously described transfer of the carton blank 100 from the forming mandrel 304, the carton blank 100 is subjected to a series of operations which occur at Work Station III wherein the carton blank 100 is permanently sealed along one edge to maintain the square tubular configuration and one of the end closure panels 112 is bonded to the carton blank 100 to provide a liquid-tight seal. In the preferred embodiment, all of the processes occurring at Work Station III are performed on the crossbar mandrel 400 (as shown in FIG. 30) thereby eliminating the complex transfer systems associated in the prior art devices.

Referring to FIG. 30, at Work Station III the carton blank 100 is initially sealed by the side sealing apparatus 430 along the previously overlapped edge at the junction 120,108, formed during the wrapping process in Work Station II described above. Subsequently, the carton blank 100 is moved radially outward along the individual mandrel 402 of the crossbar mandrel 400 such that the sealing tabs 120 formed along the edge of the carton blank 100 extend partially beyond the end of the mandrel 402. In this position, the sealing tabs 120 are contacted by a folding apparatus 440 which folds the sealing tabs 120 tightly against the end of the mandrel 402.

Subsequently, the crossbar mandrel 400, with the carton blank 100 thereon, is rotated upward through a 90° arc. During this rotation, the end closure panel 112 contacts a roller 446 which bends the end closure panel 112 over the end of the individual mandrel 402 . At the end of the 90° rotation, the individual mandrel 402 extends in a vertical orientation wherein an ultrasonic sealing die or horn 450 is pressed over the end of the carton blank 100 and mandrel 402 to seal the end closure panel 112 to the sealing tabs 120.

After the sealing of the end of the carton blank 100, the crossbar mandrel 400 rotates through an additional 90° arc to align the carton blank 100 for removal from the individual mandrel 402 and entry into Work Station IV (the Carton Rotating Apparatus). Thus, through the processes occurring at Work Station III the carton blank 100 is provided with a liquid-tight seal along its side and one end thereof.

Referring again to FIG. 30, the detailed construction and operation of the component systems of Work Station III is illustrated. As shown, the crossbar mandrel 400 includes four individual mandrels 402 which are each preferably welded at one end to a mounting plate 404. These mounting plates 404 are attached across the flats of a square arbor 408 by a plurality of fasteners 406.

The free end of each individual mandrel 402 is provided with a die 412 secured to the mandrel 402 by a pair of socket head machine screws 414. As shown in FIG. 31, the edges of the die 412 are formed having a raised land section 416 which includes four recessed pockets 418 formed on respective corners. As will be explained below, the raised lands 416 provide a hardened surface area which aids in the subsequent end bonding process, whereas the recesses 418 relieve the stresses formed in the corner areas of the carton blank 100 and additionally allow the excess carton material which overlaps at the carton corners to be maintained beneath the outer surface of the lands 416 during bonding. The die 412 additionally includes a concave channel 420 which extends across one edge thereof and is aligned with a similar channel 422 which extends partially throughout the length of each of the crossbar mandrels 402 to receive the straw 220.

A stop 410 is mounted proximal one edge of the crossbar mandrel 400 and is connected to a mechanical linkage 411 which selectively reciprocates in a direction indicated by the arrow in FIG. 30. The stop 410 is biased tightly against one edge of the individual mandrel 402 by a spring 413 and is formed having a shoulder 415 intermediate its length. As will be described below, this stop registers the carton blank 100 on the individual mandrels 402 and additionally, when actuated, moves the carton blank 100 radially outward along the length of the individual mandrel 402 for contact with the folding apparatus 440. The lower edge (not shown) of the stop 415 is preferably rounded, so that, as the arbor 408 rotates, the stop 415 may cam into spring-biased contact with each of the mandrels 402.

Aligned with and located vertically above one edge of the mandrel 402 is a side sealing apparatus 430 of the present invention which welds the carton segment 108 to the sealing tab 120, thereby permanently maintaining the square tubular configuration of the carton blank 100. As shown, the side sealing apparatus 430 includes an ultrasonic sealing horn 432 having an elongate section which terminates having an end 434 formed to grab or cam the extreme edge of the carton blank 100. As shown in FIG. 28A, in the preferred embodiment, the end 434 is formed having a substantially planar portion 434A and a curvilinear portion 434B which protrudes downward below the portion 434A to extend over the corner of the carton blank 100. At the intersection between the portions 434A and 434B, a sharp edge 434C is formed which, as will become more apparent below, forms a camming means which pulls the carton segment 108 toward the corner of the mandrel 402.

The sealing horn 432 is mounted to the piston 436 of a pneumatic cylinder 438 which selectively extends and retracts the sealing horn 432 to contact the mandrel 402. The pneumatic cylinder 438 is secured to the housing (not shown) and is located inboard and at an angle with the mandrel 402, such that, when retracted (as shown in FIG. 33) the individual mandrel 402 of the crossbar mandrel 400 is free to rotate upward through a 90° arc. In addition, the sealing horn 432 is mounted by means (not shown) to permit slight freedom of movement in a direction parallel to the length of the horn 432 but restricted from movement in a plane perpendicular to the length of the horn 432. As such, the horn 432 is self-aligning with the mandrel 402 to effectuate a proper bond or seal during operation.

Disposed adjacent one end of the mandrel 402 and mounted proximal thereto, is the folding apparatus 440 which permanently bends the sealing tabs 120 formed along the ends of the carton blank 100 against the lands 416 of the die 412. The apparatus 440 preferably includes a T-shaped jaw 442 disposed beneath the lower surface of the mandrel 402 and a pair of side jaws 444 which are mounted adjacent both sides of the mandrel 402. Each of these jaws is connected to an appropriate linkage (not shown), typically being cam actuated, such that the T-shaped jaw 442 reciprocates in a vertical direction, whereas the side jaws 444 reciprocate in a horizontal direction as indicated by the respective arrows of FIG. 30.

Spring loaded and disposed vertically above the individual mandrel 402 and in a common plane therewith is a roller assembly 446 illustrated schematically in FIG. 30. Basically, the roller 446 includes a relieved cylinder 448 having a reduced diameter section 449. The width of the section 449 is preferably sized to equal the width of the end closure panel 112 with the angular transition 451 between the reduced diameter section 449 and the main diameter of the roller 448 sized to tightly abut the sides of the carton blank 100. As shown, the roller 446 is rotatably mounted to a shaft 450 connected as by way of springs (not shown) to the housing (not shown).

The roller 446 is accurately positioned radially outward from the mandrel 402 such that, as the individual mandrel 402 rotates upward through a 90° arc, the reduced diameter section 449 of the cylinder 448 contacts and rolls across the end closure panel 112 of the carton blank 100 at a point tangent to the raised lands 416 of the die 412. As may be easily recognized, by contacting the end closure panel 112 during the rotation of the mandrel 402, the roller apparatus 446 folds the end closure panel 112 over the end of the die 402.

With the structure defined, the operation of the component systems of Work Station III may be described. As shown in FIG. 30, the carton blank 100 is transferred to the individual mandrel 402 at the nine o'clock position of the crossbar mandrel 400 in a manner previously described with one edge of the blank 100 contacting the shoulder 415 of the stop 410. The stop 410 is initially spaced from the end of the die 412 an appropriate distance selected so that, upon abutment with the shoulder 415, the entire length of each of the carton segments 102 through 108 lies slightly radially inward of the land sections 416.

While in this position, the pneumatic cylinder operator 438 is energized, causing the sealing horn 432 to extend in a downward direction and contact the carton blank 100 adjacent one edge of the mandrel 402. While in this extended position, the end 434 of the sealing horn 432 extends partially on both sides of the edge and firmly presses the carton section 108 against the sealing tab 120. Due to the end 434 having the particular configuration shown in FIG. 28A, upon contacting the carton blank 100, the carton section 108 is grabbed and pulled tightly toward the corner of mandrel 402 by the sharp edge 234C and curved protrusion 434B thereby forming a tight corner. The horn 432 is then energized by well known driving apparatus, and the sealing tab 120 is bonded to the carton segment 108 by an ultrasonic welding process which is well known in the art, however, alternative methods of forming the bond, such as heat sealing, may be utilized. Thus, by this ultrasonic welding process, a liquid-tight seal is formed along the edge of the carton blank 100 which permanently maintains the square tubular configuration of the carton blank 100.

Subsequent to this ultrasonic welding process, the pneumatic cylinder 438 is de-activated to retract the sealing horn 432 into a stored position as indicated in FIG. 33. Since, as previously described, the pneumatic cylinder operator 438 is mounted inboard and at an angle with the plane of the crossbar mandrel 400, upon retraction, the crossbar mandrel 400 is clear to rotate in a clockwise direction as indicated in FIG. 33. Prior to this rotation of the crossbar mandrel 400, however, the sealing tabs 120 located adjacent the outer end of the individual mandrel 402 must be folded over the end of the die 412.

In the preferred embodiment, this folding procedure is accomplished quickly and easily by the folding apparatus 440. With the sealing horn 432 retracted from the edge of the carton blank 100, the carton blank 100 is maintained on the mandrel 402 only by frictional forces and, therefore, may be easily positioned along the length of the mandrel 402. To expose the sealing tabs 120 beyond the end of the die 412, for the subsequent folding operation, the stop 410 driven by the linkage 411 moves radially outward from its initial position (as shown by the phantom lines in FIG. 33), thereby pushing the carton blank 100 partially off the end of the mandrel 402. Upon movement through this short distance, the scoring lines 122 formed adjacent the edges of the carton segments 102 through 106 of the carton blank 100 (as shown in FIG. 3) are aligned with the outside edge of the lands 416 of the die 412. As previously mentioned, these scoring lines 122 weaken the carton blank material, thereby insuring that the fold will occur at the desired position along the carton blank 100.

The sequence of operations performed by the folding apparatus 440 is illustrated schematically in FIGS. 32A through 32C. With the sealing tabs 120 extending over the edge of the lands 416, the T-shaped jaw 442 of the folding apparatus 440 reciprocates in an upward vertical direction to a height slightly above the lower surface of the mandrel 402 (as shown in FIG. 32A). During this movement, the jaw 442 contacts the sealing tab 120 along its top edge and crimps the tab 120 tightly against the land section 416 of the die 412.

Subsequently, the side jaws 444 are activated and move partially inward from their initial position shown in FIG. 32A to the position shown in FIG. 32B, wherein their leading edge extends to the vertical plane of the side edges of the die 412. During this partial inward movement, the edge of each of the side jaws 444 contacts the lower corners of the sealing tabs 120, causing the lower corners to be tightly creased between the T-shaped jaw 442 and the side jaw 444. Due to the T-shaped jaw 442 remaining in its extended position above the lower edge of the mandrel 402, the sealing tab 120 is prevented from springing away from the die 412 thereby insuring an accurate corner folding of the sealing tab 120.

Subsequently, the T-shaped jaw 442 reciprocates slightly downward to a position wherein its relieved corners 442A are aligned with the lower corners of the die 412 and the side jaws 444 reciprocate fully inward across the frontal plane of the die 412 as shown in FIG. 32C. As previously described in relation to the T-shaped jaw 442, upon their full inward travel, the side jaws 444 contact the sealing tabs 120 of the carton blank 100 and thereby tightly crimp or fold the sealing tabs 120 over the lands 416 of the die 412. Thereafter, the side jaws 444 are similarly reciprocated back to their original position as shown in FIG. 30. As best shown in FIGS. 32A, 32B, and 32C, the right side jaw member 444 is formed slightly shorter in length than the left side jaw member 444. The applicant has found this length differential is desirable to eliminate the possibility of the sealing tab 120 tearing in the vicinity of the upper corner due to its integral intersection (shown in FIG. 3) with the end panel 112. As such, during the sealing tab fold-over process, the portion of the sealing tab in the upper right-hand corner is not tightly creased against the face of the die 412 but rather is only urged against the die 412 for subsequent creasing by the roller apparatus 446.

Thus, upon completion of the movement of the T-shaped jaw 442 and the side jaws 444, the sealing tabs 120 are folded over the end of the die 412 and are oriented within the square tubular configuration of the carton blank 100 as shown in FIG. 32. Additionally, it will be recognized that, due to the V-shaped scoring notches 124 formed on the carton blank 100 (shown in FIG. 5), the corners of the sealing tabs 120 will consistently be folded flush with the carton segments 102–108 (any excess material lying within the square cross-section of the carton blank 100), thereby being properly positioned for the end closure sealing and bonding operation.

With the sealing tabs 120 folded over the end of the die 412, the crossbar mandrel 400 subsequently rotates in a clockwise direction through a 90° arc as indicated by the arrows in FIG. 33. During this rotation, the carton blank 100 passes beneath and contacts the roller apparatus 446, thereby causing the end closure panel 112 to be folded down over the end of the die 412.

Referring jointly to FIGS. 33 and 34, the detailed operation of this rolling procedure is illustrated. While the carton blank 100 is carried by the individual mandrel 402 in the nine o'clock position, the end panel 112 extends beyond the end of the die 412 with the scoring line 118 (shown in FIG. 3) being aligned with the top edge of the land section 416. As the individual mandrel 400 rotates from the nine o'clock to twelve o'clock position, the outer edges of the lands 416 pass closely beneath the cylinder 448 of the roller apparatus 446, whereby the end closure panel 112 contacts the reduced diameter section 449 of the cylinder 448. This contact forces the end closure panel 112 in a downward direction (from its initial position indicated by the phantom lines in FIG. 34) tightly against the top surface of the die 412.

The cylinder 448 presses the end closure panel 112 tightly against the land sections 416 of the die 412 and rotates across the end of the die in a direction indicated by the arrow in FIG. 34. As the cylinder 448 rolls across the end of the die 412, the angular transition 451 between the reduced diameter section 449 and the main diameter of the roller 448 tightly mates with the sides of the carton blank 100, thereby preventing the sides as well as the sealing tabs 120 of the carton blank from springing outward from the mandrel 402. Further, during this rolling process, the excess carton blank material disposed in the corners of the square tube (as previously mentioned and shown in FIG. 32) is forced within the recess pockets 418 of the die 412 (as shown in FIG. 31) such that the corners of the sealing tabs 120 are maintained within a common plane with the remainder of the sealing tab 120, contacting the land section 416 of the die 412. Thus, upon passing beneath the roller apparatus 446, one end of the carton blank 100 is folded and positioned upon the die 412 for subsequent bonding.

Upon completion of the 90° rotation of the crossbar mandrel 400, the carton blank 100 carried by the mandrel 402 is oriented in a vertical twelve o'clock position as shown in FIG. 33 and is registered or aligned beneath the sealing die or horn 450. While in this twelve o'clock position, the sealing horn 450, which had been retracted in a stored position vertically above the end of the mandrel 402 (as shown in FIG. 30) is lowered directly upon the end closure panel 112 (as shown in FIG. 33). In the preferred embodiment, this downward travel of the sealing horn 450 is provided by a pneumatic cylinder (not shown), which is mounted by means (not shown) to permit the horn 450 to move slightly in a plane parallel to the top surface of the die 412 thereby self-aligning itself with the mandrel 402. The bottom surface of the sealing horn 450 preferably includes a shallow pocket (not shown) formed having a cross-sectional area slightly greater than that of the end panel 112 so that the sealing horn 450 may extend partially down over the end of the carton blank 100 when contacting the end closure panel 112.

In this lowered or extended position, the sealing horn 450 presses firmly against the end closure panel 112, thereby eliminating any raising of the end closure panel 112 from the sealing tab 120 caused by the memory properties (previously described) of the carton blank material and eliminating a misalignment with the mandrel 402. Subsequently, ultrasonic energy is applied to the horn 450, from suitable driving means (not shown), thereby bonding the end panel 112 to the sealing tab 120, and forming a liquid-tight seal along the end of the carton blank 100. After this bonding process, the sealing horn 450 is retracted vertically to its stored position above the end of the mandrel 402 by activation of the pneumatic cylinder (not shown).

Having sealed the end closure panel 112 to the sealing tabs 120, the crossbar mandrel 400 rotates through an additional 90° arc, to position the individual mandrel 402 carrying the carton blank 100 in alignment for transfer to the carton rotator and conveyor transfer apparatus of Work Station IV.

Although for illustration purposes, a single carton element 100 was described passing through the processes of Work Station III, it will be recognized that, upon each 90° rotation of the crossbar mandrel 400, an additional carton blank 100 is transferred to the individual mandrel 402, such that three carton blanks are carried by a respective three mandrels 402 of the crossbar mandrel 400 at most times. Additionally, it will be recognized that, since in the preferred embodiment, there are four crossbar mandrels 400 attached to the arbor 408 (as shown in FIG. 5), four individual carton blanks are being formed simultaneously by the apparatus of the present invention. Each of these mandrels 400 moves intermittently through the 90° arcs described, pausing in stationary positions at the quadrant locations for the described operations.

Work Station IV—Carton Rotator and Conveyor Transfer Apparatus

Following the sealing operation performed at Work Station III, the carton blank 100 is transferred to the horizontal conveyor belt 550 which carries the carton blank 100 through the remaining Stations of the apparatus of the present invention. However, as may be recognized from FIG. 33, if the carton blank 100 were transferred in its present orientation upon the crossbar mandrel 400 directly to the conveyor 550, the other end closure panel 114 which extends beyond the length of the carton segments 102 through 108 would lie parallel to the horizontal travel of the conveyor 550, thereby obstructing the operations to be performed at Work Stations V, VI, and VII. Thus, to eliminate the obstruction problems associated with the end closure panel 114, prior to the transfer of the carton blank 100 onto the conveyor 550, the carton blank 100 is rotated 90° about its horizontal axis such that the end closure panel 114 lies in a perpendicular planar orientation with the travel of the conveyor 550.

Figure 35:
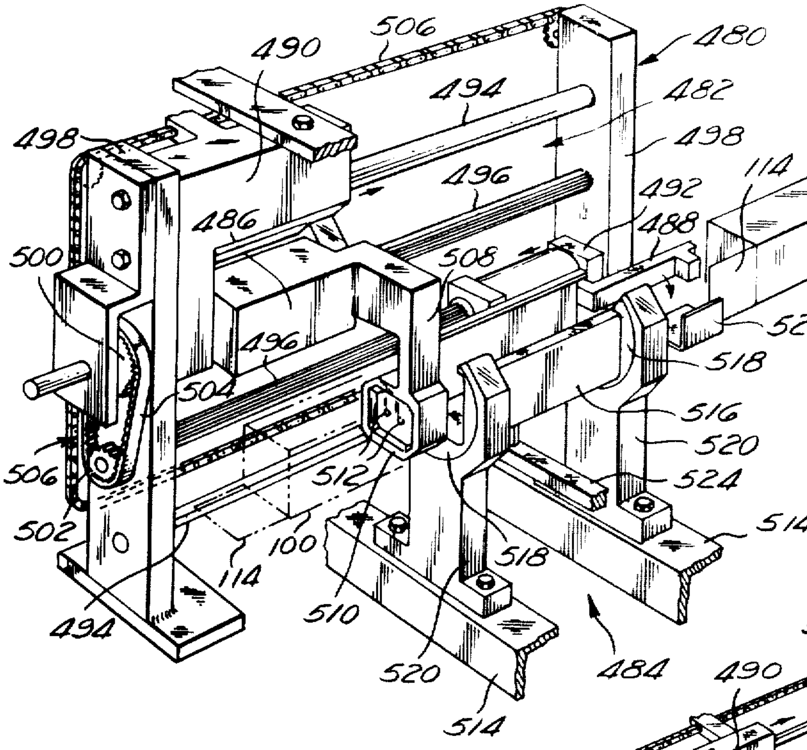
FIG. 35 is a perspective view of the carton blank rotator mechanism of Work Station IV.

Referring to FIG. 35, there is shown the carton blank rotator mechanism designated generally as 480 which transfers the carton blank 100 from the crossbar mandrel 400 (of Work Station III) to the horizontal conveyor 550 and rotates the carton blank 100 through a 90° axial arc. Although for illustration purposes only a single carton blank rotator 480 is shown, it will be recognized that, in the preferred embodiment, there are four carton blank rotators 480, each positioned adjacent the end of the respective crossbar mandrel 400.

As shown in FIG. 35, the carton blank rotator 480 includes a transfer and ejector mechanism designated generally by 482 and a rotating fixture apparatus 484 which cooperate with each other in transferring and rotating the carton blank 100 from the crossbar mandrel 400 to the conveyor loader 550.

The transfer and ejector mechanism 482 preferably includes a transfer arm 486 and an ejector arm 488 which are each rotatably mounted to a slider mount 490 and 492, respectively. The slider mounts 490 and 492 are spaced vertically apart and are each reciprocally mounted to a guide pin 494 and spline shaft 496 which extend between a pair of support columns 498. These guide pins 494 are rigidly mounted to the support columns 498, whereas the spline shafts 496 are rotatably mounted thereto, and extend through one of the support columns 498 at one end. The spline shafts 496 additionally engage the transfer and ejector arms 486 and 488, respectively, such that rotation of the shafts 496 cause a corresponding pivotal movement of both arms 486 and 488.

As shown in FIG. 35, the spline shafts 496 are both provided with gear drives 500 and 502 which are interconnected by a timing belt 504 to rotate both spline shafts 496 simultaneously. Additionally, the diameter of the gear 500 is preferably greater than the diameter of the gear 502 such that the ejector arm 488 pivots through a greater arc for any given rotation of the transfer arm 486.

Mounted on the rear surface of the support columns 498 is a chain drive 506 which is connected in a conventional manner at one end to a mechanical drive to power the chain 506 back and forth repeatedly. Each of the slider mounts 490 and 492 are securely attached to this chain drive 506 so that, as the motor (not shown) powers the chain drive 506, the slider mounts travel horizontally between the support columns 498 along the guide pins 494 and spline shafts 496. Since the slider mounts 490 and 492 are initially connected to the chain drive 506 while positioned adjacent opposite support columns 498, and since the mount 490 is connected to the top of the chain 506 loop while the mount 492 is connected to the bottom of the loop, it will be recognized that, upon movement of the chain drive 506, the slider mounts 490 and 492 travel between the columns 498 in opposed directions, i.e., as the slider mount 490 moves from left to right as indicated by the arrow in FIG. 35, the slider plate 492 moves from right to left. As will become more apparent below, this opposed movement allows the carton blank rotator 482 to begin transferring the carton blank 100 from Work Station III, while simultaneously depositing the carton blank 100 into the horizontal conveyor 550.

As shown, the transfer arm 486 includes an L-shaped extension 508 which terminates in a substantially rectangular head member 510. Both the extension 508 and head 510 are preferably formed having a hollow interior aperture (not shown) which is connected to a vacuum source (not shown). The frontal face of the head member 510 is additionally provided with a plurality of vacuum apertures 512 which extend into an interior aperture (not shown) of the head 510 and extension 508 such that the vacuum source is exposed at the ports 512 to the front surface of the head 510.

Located in a parallel plane and adjacent to the transfer ejector mechanism 482 is the rotating fixture apparatus 484 which is securely mounted to the housing 514. The fixture apparatus 484 includes a hollow rectangular fixture 516, preferably formed of a stainless steel sheet material, having an open side wall configuration. The fixture 516 is connected at its end to a pair of cylindrical bearing plates 518 which are rotatably mounted to the support posts 520. The fixture 516 additionally includes a bracket 522 mounted on its lower surface (shown in FIG. 37) which is connected to a linkage 524. As will be described below, movement of the linkage 524 causes the fixture 516 to rotate in a counterclockwise direction as viewed in FIG. 35 such that its open side is oriented with or faces the transfer and ejector mechanism 482.

Figure 36:
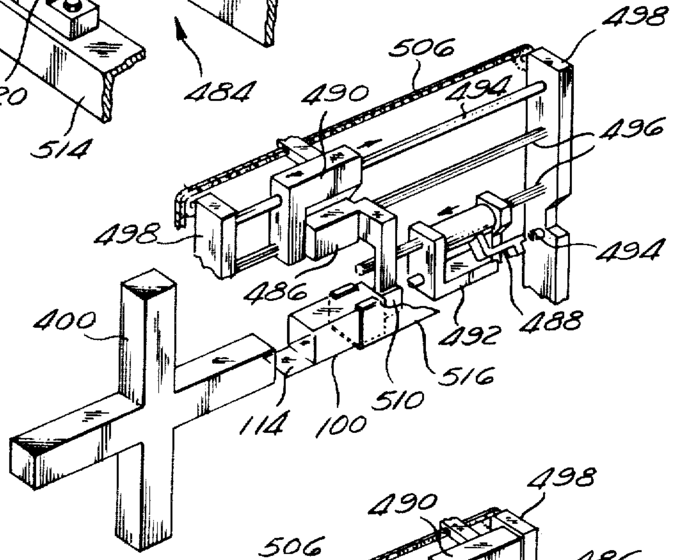
FIG. 36 is a partial perspective view of the carton blank rotator mechanism of FIG. 35 illustrating the manner in which the carton blank is transferred from the crossbar mandrel of FIG. 30 into the fixture of the carbon blank rotator mechanism.

The sequence of operation performed by the carton blank rotator 480 (Work Station IV) is illustrated in FIGS. 35-38. As shown in FIG. 36, the rotating fixture apparatus 484 (FIG. 35) is aligned with and spaced from the end of rotating crossbar mandrel 400 of Work Station III. While in this position, the transfer arm 486 is extended into its extreme forward position and vertically lowered, whereby the face of the rectangular head 510 contacts the closed end panel of the carton blank 100 (as shown by the phantom line in FIG. 35). Upon contact therewith, the vacuum source acting through the apertures 512 on the face of the head member 510, pull the carton blank 100 tightly against the face of the head member 510 such that the carton member 100 may be carried exclusively by the arm 486.

It will be recognized that the lowering of the transfer arm 486 to the position illustrated in FIG. 35 was initiated by the clockwise rotation of the upper spline shaft 496. Further, since both spline shafts 496 are connected by the timing belt 504, this clockwise rotation causes a similar lowering of the ejector arm 488 from its position shown in FIG. 35, to the position illustrated in FIG. 36. Lowered in this position, the ejector arm 488 is inboard of the support post 520 of the rotating fixture apparatus 484, and may subsequently travel in a horizontal direction across the length of the rotating fixture apparatus 484 without obstruction.

With the transfer arm 486 and the ejector arm 488 disposed adjacent opposite support posts 498 (shown in FIG. 35) the chain drive mechanism 506 is activated, causing the slider mounts 490 and 492 to travel horizontally along the guide pins 494 and the spline shafts 496 in opposed directions, as indicated by the arrows in FIG. 36.

Since the carton blank 100 is maintained against the head 510 of the transfer arm 486 by vacuum, during this horizontal movment, the carton blank 100 is removed from the crossbar mandrel 400 and drawn into the hollow, square fixture 516.

The square fixture 516 is sized to have a slightly large cross-sectional area than that of the carton blank 100 and the head 510, such that insertion within the square fixture can be accomplished easily with minimum friction. Further, it will be recognized that, during this placement of the blank 100 into the square fixture 516, the L-shaped extension 508 of the transfer arm 486 lies within the open side of the square fixture 516 and may travel throughout the length of the square fixture 516.

Figure 37:
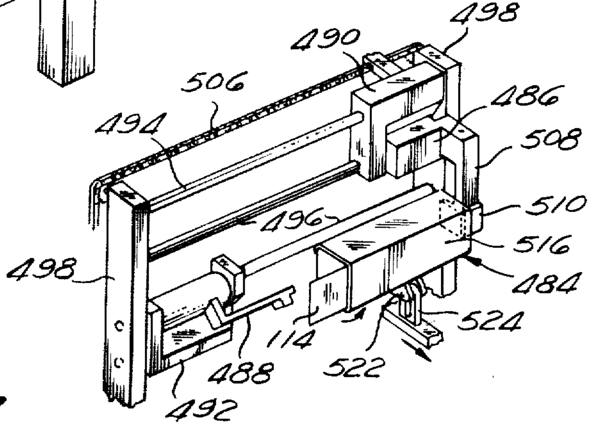
FIG. 37 is a perspective view of the carton blank rotator mechanism of FIG. 35 illustrating the 90° counterclockwise rotation of the carton blank within the fixture.

The opposed horizontal travel of the transfer arm 486 and the ejector arm 488 continues until the slider mounts 490 and 492, respectively, are adjacent the support posts 498 (as shown in FIG. 37). In this position, the carton blank 100 lies completely within the square fixture 516 and is aligned to be rotated in a counterclockwise direction through a 90° arc by the rotating fixture apparatus 484.

In the preferred embodiment, this 90° rotation is facilitated by the actuation of the linkage 524 in a direction indicated by the arrow in FIG. 37. By this movement of the linkage 524, the fixture 516 rotates about the cylindrical bearing plates 518 mounted within the support posts 520, whereby the open side of the fixture 516 (as shown in FIG. 35) faces the transfer and ejection mechanism 482 and is aligned for the subsequent transfer of the carton blank 100 into the conveyor 550.

Following this rotation of the carton blank 100 and square fixture 516, the spline shafts 496 are rotated in a counterclockwise direction, as indicated by the arrows in FIG. 38, thereby pivoting the transfer arm 486 and the ejector arm 488 vertically upward into their positions illustrated in FIG. 38. Raised in this position, the ejector arm 488 is aligned with the open side of the square fixture 516, having its tab 518 extending to abut the end of the carton blank 100 while the transfer arm 486 extends vertically above the axial plane of the fixture 516.

Subsequently, the gear drive 506 (as shown in FIG. 35) is activated in a reverse direction from its previous travel, causing the slider mount 492 and the ejector arm 488 to travel in a direction indicated by the arrow in FIG. 38, while the slider mount 490 of the transfer arm 486 simultaneously travels in an opposed direction. Thus, the tab 518 of the ejector arm 488 contacts the edge of the carton blank 100 and pushes the carton blank 100 through the length of the square fixture 516. As the carton blank 100 is pushed out from the square fixture 516, it is supported by an L-shaped bracket 520 which aligns the end of the carton blank 100 for entry into the horizontal conveyor 550.

Thus, from the above, it will be recognized that, by use of the carton blank rotator 480 of the present invention, the carton blank 100 is transferred from Work Station III to the conveyor transport 550 and is rotated through a 90° rotation such that the end closure panel 114 of the carton blank 100 id disposed in a plan perpendicular to the travel of the conveyor 550. Additionally, it will be noted that, subsequent to the completed horizontal travel of the ejector arm 488 wherein the carton blank 100 is deposited upon the conveyor 550, the transfer arm 486 has moved to an extreme forward position and may be rotated in a downward direction for a repetition of the cycle previously described. Similarly, upon transfer of the carton blank 100 into the conveyor 550, the linkage 524 is activated to return to its initial position as shown in FIG. 35, such that the open side of the square fixture 516 faces upward in a vertical direction.

Semi-Rigid Transport Conveyor

Figure 39:
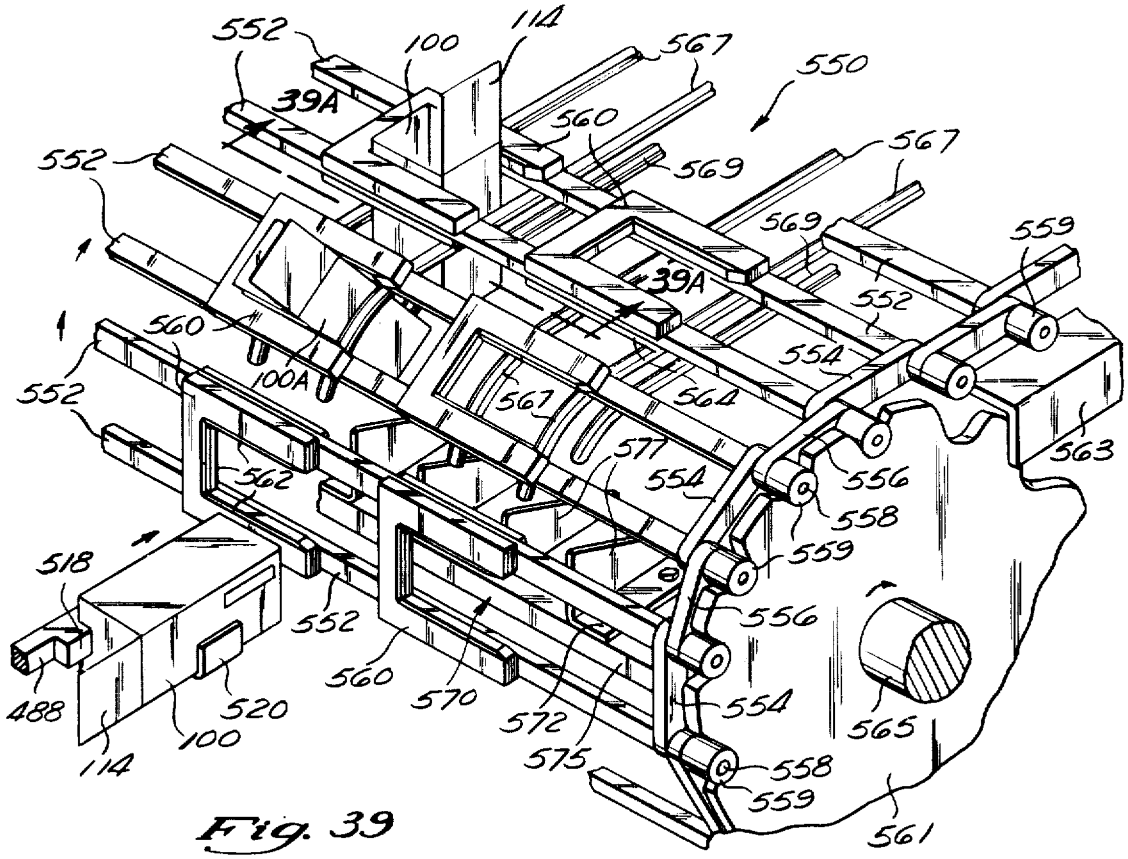
FIG. 39 is a partial perspective view of the conveyor transport of the present invention illustrating the detailed construction thereof and the orientation of the side loader mechanism located adjacent one end thereof.

Referring now to FIG. 39, the detailed construction of the conveyor 550 and the entry of the carton blank 100 therein may be described. As shown, the conveyor 550 is preferably composed of a plurality of elongate bar members 552 which are arranged in pairs and oriented in a parallel configuration with each other. Each pair of the bar members 552 is rigidly attached (preferably by a fillet weld) at both ends to a connector rod 554 which maintains the parallel orientation of each pair of bar members 552. Consecutive pairs of the bar members 552 are then formed into a continuous conveyor length by plural link members 556 which are rotatably mounted to both adjacent connector rods 544 and secured thereto by fasteners 558. Each of these fasteners additionally mounts a roller bearing 559 which meshes with a gear drive 561 and supports the conveyor 550 upon a pair of horizontal rails 563. By such construction, the conveyor 550 provides a semi-rigid structure which has sufficient strength to adequately support the carton blank 100 through the subsequent formation, filling and bonding process, yet flexible enough to form a conveyor transport.

Disposed on each pair of bar members 552 and rigidly attached thereto, are four U-shaped anvils or yokes 560 preferably formed from hardened tool steel which are constructed to tightly conform with the outside surfaces of the carton blank 100. The upper surface of anvil 560 adjacent the interior walls thereof is provided with a beveled edge 562 which is preferably formed at a 45° angle and includes an enlarged radius at each of its interior corners. As will be explained in more detail infra, this beveled edge 562 cooperates with the preform apparatus of Work Station V to prepare the carton blank 100 for the end closure process, and additionally mates with an ultrasonic horn (Work Station VII) which forms a liquid-tight seal across the open end of the carton blank 100.

To ensure the rigid mounting of the anvil 560 to the bar members 552, a support plate 564 possessing the same general shape but making an opening slightly greater than the anvil 560, is aligned with the anvil 560 and rigidly attached to the undersurface of the bar members 552. Preferably, a series of fasteners (not shown) are inserted through all three members, i.e., the support plate 564, the bar members 552 and the anvil 560 from the undersurface of the conveyor 550 such that any relative movement between these elements is eliminated.

As will be recognized, the conveyor 550 is held taut between two pairs of gear drives 561 (one of which is shown in FIG. 39) located at opposite ends of the conveyor and mounted to a shaft 565 which is connected in a conventional manner to the main hydraulic drive system (not shown). In the preferred embodiment, the gear teeth of the drive engage the conveyor 550 intermediate adjacent pairs of roller bearings 558 and drive the conveyor 550 in an intermittent, cyclic manner (indicated by the arrows in FIG. 39) such that each anvil 560 is momentarily stationary at pre-determined intervals along the length of the conveyor travel. As will become more evident below, this stationary period allows the apparatus of Work Stations V through VIII to operate on the carton blank 100.

Figure 39A:
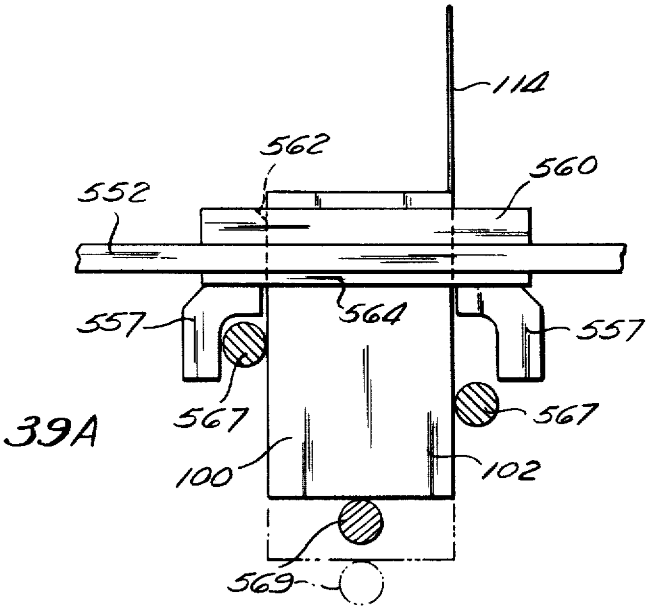
FIG. 39A is a cross-sectional view taken about lines A—A of FIG. 39.

To support the bar members 552 intermediate their ends, a plurality a pairs of rigid support tabs or ears 557 preferably formed of Delrin (a hard plastic material possessing high wear characteristics), are located beneath the conveyor 550 positioned at each of the Work Stations V through VIII. As shown in FIG. 39A, the support plates 564 rigidly connected to the undersurface of the anvils 560, rest against the ears 557, thereby preventing any downward deflection of the bar members 552 and anvil 560 during operation. In addition to the support ears 557 positioned at the Work Stations, the conveyor 550 includes a pair of rigid bars 567 which extend throughout the length of the conveyor 550. As shown in FIG. 39A, the rigid bars 567 are spaced from one another at a distance slightly greater than the width across each of the carton segments 102–108 and varied in their vertical distance from the anvils 560 such that they may maintain the carton blank 100 in a vertical orientation while being carried by the conveyor 550.

Located intermediate each pair of rigid bars 567 and disposed substantially below the plane of the conveyor 550 is a lower support bar 569 which is connected to a hydraulic actuator (not shown). As illustrated in FIG. 39A, the lower support member 569 contacts the lower end of the carton blank 100 thereby maintaining the vertical height of the carton blank 100 upon the conveyor 550. Additionally, as indicated by the phantom lines in FIG. 39A, the lower support member 569 is movable in a vertical direction by actuation of the hydraulic operator (not shown), thereby accommodating the differing sized containers (½ pint and ⅓ quart) of the present invention.

Side-Loader Mechanism

Disposed beneath the conveyor 550 and located tangentially adjacent one end thereof, is a side loader mechanism 570 which is vertically aligned with the plural carton blanks 100 as they are transferred from the carton blank rotators 480 (of Work Station IV and shown in FIG. 38). In the preferred embodiment, this side loader mechanism 570 simultaneously loads the four separate carton blanks 100 received from the carton blank rotators 480 directly upon the conveyor 550.

As better shown in FIGS. 40 and 40A, the side loader mechanism 570 preferably includes a plurality of C-shaped fixture plates 572 which are spaced from one another along a mounting beam 575 at a distance slightly greater than the distance across parallel flats of the carton blank 100. This relative spacing permits a single carton blank 100 to be received between adjacent fixtures 572 along the mounting beam 575.

As shown, the vertically extending sidewalls 577 of each fixture plate 572 are formed having a tapered top edge which in the preferred embodiment is formed with an acute angle of less than 45°. The fixtures 572 are each rigidly attached to the mounting beam 575 which is in turn connected to a linkage 573. Upon activation of the linkage 573, the beam 575 and thus the fixtures 572 move in a horizontal transverse direction toward the open end of the anvil 560. This horizontal movement of the fixtures 572 enters and accurately positions the plural carton blanks 100 within the anvil 560. As will be explained in more detail infra, the tapered top edge of the sidewalls 577 of each of the fixtures 572 permits the return transverse movement of the fixtures 572 within the interior of the conveyor 550 without contacting the carton blanks previously loaded and carried by the conveyor 550.

The detailed operation of the transfer of the carton blank 100 from the carton rotator and conveyor transfer apparatus 480 (of Work Station IV) to the conveyor 550 is illustrated in FIG. 40. In the position shown in FIG. 40, it will be recognized that the conveyor 550 is momentarily stationary in a tangential position aligned with the carton blank rotator and the transfer apparatus 480, whereby the frontal planes of the anvil 560 and the C-shaped fixture 572 are perpendicular to the travel of the ejector arm 488.

While in this position, the space between adjacent C-shaped fixtures 572 is registered and aligned with the carton blank 100 such that the blank 100 may be directly transferred from the carton blank rotator and conveyor transfer mechanism 480. As the ejector arm 488 extends toward the conveyor 550 in a manner previously described, the carton blank 100, contacting the tab 518 of the ejector arm 488, is transferred to and received between the C-shaped fixtures 572. Since the space between the C-shaped fixtures 572, as well as the distance between the bar members 552, is slightly greater than the outside dimensions of the carton blank 100, the carton blank 100 is easily received between adjacent fixtures 572 without any bending or deformation of the carton blank 100 itself.

Once received between the fixtures 572, the ejector arm 488 retracts and rotates in a downward direction (as previously described) and the carton blank 100 is carried by the mounting beam 575. Subsequently, the linkage 573 attached to the beam 575 is activated, causing the fixtures 572 and the carton blank 100 carried therebetween to move traversely toward the open end of the anvil 560.

As shown in FIG. 40, during this traverse movement toward the anvil 560, the carton blank 100, extending substantially beyond the leading edge of the fixture 572, enters into the open end of the anvil 560 with the interior surfaces of the anvil 560 contacting the flats of the carton blank 100. It will be recognized that, since the fixtures 572 are positioned beneath the conveyor 550, during the traverse movement, the leading edge of the fixture 572 will travel behing the lower suface of the anvil 560 thereby allowing the carton blank 100 to enter unobstructed into the anvil 560.

The C-shaped fixtures 572 continue their transverse travel until the leading edge 574 of the carton blank 100 contacts or abuts the interior wall of the anvil 560. As previously mentioned, since the interior dimension of the anvil 560 is sized to tightly receive the tubular configuration of the carton blank 100, the carton blank 100 is thereby slightly press-fit into the anvil 560.

Subsequently the conveyor 550 begins its intermittent travel, whereby the carton blank 100, maintained within the anvil 560, moves arcuately upward with the conveyor 550 to an approximate 45° orientation as shown by the numeral 100A in FIG. 39. By this travel of the conveyor 560, the carton blank 100 is removed from between adjacent C-shaped fixtures 572 and is carried exclusively by the anvil 560. Further, since the sidewalls 577 of the fixture 572 are formed having a tapered top edge, subsequent to the travel of the conveyor, the mounting beam 575 and C-shaped fixtures 572 may return to their initial position for repetition of an additional loading cycle, wherein another set of four carton blanks 100 may be transferred from the carton blank rotator and conveyor transfer apparatus 480 (of Work Station IV).

It will be recognized that the particular transverse movement of the carton 100 into the anvil 560 in a direction parallel to the plane of the anvil 560 allows the open end of the side panels of the blank 100 to moderately yield, allowing a close fit within the anvil 560. If the carton were inserted closed-end first, the previously welded corners would resist any yielding, and cartons would be crushed entering the anvils 560.

Further, by transferring the carton blank 100 to the conveyor in the manner previously described, the carton blank 100 is continuously supported by the two sides of the C-shaped fixture 572 as well as the mounting beam 575 during the carton blank's 100 entry into the anvil 560. The applicant has found that this support of the carton blank 100 during the entry into the anvil 560 is preferable to insure against any deformation of the square tubular configuration of the carton blank 100 caused by a slight interference fit beween the carton blank 100 and the interior walls of the anvil 560. Further, the applicant has found that this side entry process, positively positions the carton blank 100 in its desired location within the anvil 560, thereby insuring the accuracy of the subsequent processes performed on the carton blank 100 while carried by the conveyor 550.

Referring again to FIG. 39, it may be seen that, while carried by the conveyor 550, the top edge of the carton blank 100 is positioned slightly above the top surface of the anvil 560, and the end closure panel 114 is disposed in a parallel plane to the travel of the carton blank 100 on the conveyor 550. This positioning and orientation of the carton blank 100 upon the conveyor 550 facilitates the subsequent pre-forming, filling and sealing operations performed at Work Stations V through VIII, respectively.

Work Station V—End Section Pre-Form Apparatus

With the carton blank 100 positioned upon the conveyor transport 550 and carried within the opening of the anvil 560, the continued cyclic or intermittent horizontal movement of the conveyor 550 transports the carton blank 100 to Work Station V (End Section Pre-Form Station). At this station, the end closure panel 114 as well as the top edges of the open end of the carton blank 100 are creased or folded by a discrete three-phase operation into a desired configuration, suitable for the subsequent end closure bonding and sealing process, which occurs at Work Station VII. As will become more apparent below, the apparatus of Work Station V accomplishes the variety of folding and creasing operations without the benefit of interior mandrels to work against, i.e., all operations occur without the use of supporting means or forming mandrels positioned on the interior of the carton blank. This particular pre-form configuration of the carton blank 100, which is accomplished at Work Station V, is substantially described in the co-pending U.S. patent application Ser. No. 911,990, filed June 2, 1978, a continuation-in-part of Ser. No. 822,500, filed Aug. 8, 1977, the disclosure of which is expressly incorporated by reference herein. However, the apparatus for producing such a configuration is substantially modified in the present invention, and therefor is disclosed herewith.

Referring to FIG. 41, the overall construction and operation of Work Station V may be seen. Work Station V includes a pre-form apparatus designated generally by the numeral 600, which is mounted to a frame member 602 and located vertically above the conveyor 550. The pre-form apparatus 600 preferably includes a housing 604 which supports a mounting plate 606, rigidly attached thereto. Three die bases 608, 610, and 612 are securely mounted to the undersurface of the mounting plate 606 and are horizontally spaced at intervals equal to the distance between anvils 560 mounted upon the conveyor 550.

The dies 608,610 include a plurality of plate operators (shown in FIGS. 43 and 45, respectively) which, during operation of the pre-form apparatus 600, contact the carton blank 100 and cooperate with the die bases 608,610 to permanently crease the carton blank 100 into its desired configuration. These operator plates are activated by pneumatic mechanisms 614 and 616 (represented schematically in FIG. 41) which are mounted to the top surface of the mounting plate 606 and disposed within the housing 604, each having an appropriate linkage (not shown) extending through the mounting plate 606. As will be explained in more detail below, each of the die bases 608, 610, and 612 perform an operational phase of the pre-form apparatus 600 and, upon engagement with the carton blank 100, folds or creases the carton blank 100 in a particular manner, whereby, upon completion of the travel of the carton blank 100 through each of these phase operations, the carton blank 100 is permanently folded into the particular configuration indicated in FIG. 51A and illustrated in co-pending application Ser. No. 911,990, filed June 2, 1978 by Josef J. Buschor.

Further, it will be recognized that, although for illustration purposes only one series of the die bases 608, 610, and 612 are shown and described, in the preferred embodiment there are four of each of the die bases 608, 610, and 612, similarly mounted to the plate 606 and positioned so as to register with the respective four anvils 560 carried by each pair of conveyor bars 552.

As shown in FIG. 41, the housing 604 of the pre-form apparatus 600 is slidingly mounted adjacent its corners by four posts 620, which cooperate with four bushings 622 rigidly mounted to the housing 604. Each of these posts 620 extends at one end substantially into the housing 604 and is rigidly attached at the other end to the frame 602. A pair of push rods 603 (shown in FIG. 1) located outboard of the conveyor 550 are rigidly connected to the housing 604 and are engaged with the main transport drive (not shown) of the conveyor 550, to reciprocate in a vertical direction. As may be recognized, by such an arrangement, the housing 604, as well as the die bases 608, 610, and 612 carried thereon, is raised and lowered in a vertical direction indicated by the arrows in FIG. 41. In operation, these push rods 603 synchronize the travel of the pre-form apparatus 600 with the travel of the conveyor 550, thereby insuring the proper formation steps are conducted on each carton blank 100.

Although for illustration purposes, in FIG. 41, the housing 604 is illustrated disposed substantially above the level of the anvil 560, it should be recognized that, during actual operation, the housing 604 only reciprocates upward through a short distance (approximately 1 to 1½ inches) such that, while in its lowered position, the bottom surface of the die bases 608, 610, and 612 lie slightly beneath the top surface of the anvil 560, and in its elevated position, the bottom surface of the die bases 608, 610, and 612 lie slightly above the top surface of the anvil 560, but below the top edge of the end closure panel 112 of the carton blank 100. The applicant has found that this short vertical travel of the pre-form apparatus housing 604 significantly reduces the time required for actuation of the pre-form apparatus 600 and additionally substantially eliminates any registry problems associated with extended travel of the apparatus.

The sequential operation of the die bases 608, 610, and 612 of the pre-form apparatus 600 may now be described. To help illustrate the progression of operations being performed by the pre-form apparatus 600, the carton blank is designated in FIG. 41 by the numerals 100A, 100B, and 100C, representing the three separate operational phases occurring at the respective die bases 608, 610, and 612.

With the pre-form apparatus 600 reciprocated to its initial raised position, as shown in FIG. 41, the conveyor 550 carrying the carton blanks 100 thereon, intermitenly travels horizontally in the direction indicated by the arrow in FIG. 41 and positions the carton blank 100A beneath the die base 608. Since, as previously mentioned, the horizontal travel of the conveyor 550 is cyclic or intermittent in nature, upon positioning of the carton blank 550A beneath the die base 608, the conveyor 550 momentarily stops its travel, thereby facilitating the operation of the pre-form apparatus 604 upon the carton blank 100A.

While in this position, the housing 604 is lowered onto the carton blank 100A and the anvil 560 by the push rods 603, whereby the first phase operation of the pre-form apparatus 600 is performed upon the carton blank 100A. By this first operation, the carton blank 100A is accurately positioned within the anvil 560, positively seated upon the lower support member 569 and permanently creased along the free edges of the end closure panel 114 to form three beveled surfaces 632 (as shown in FIG. 42).

Referring to FIGS. 43 and 44, the detailed construction of the die base 608, and the first phase operation of the pre-form apparatus is illustrated. As shown in FIG. 43, the die base 608 is formed having a generally square cross-section sized slightly greater than the carton blank 100A, thereby extending across three edges thereof. The bottom surface of the die base 608 includes a recess 621 formed adjacent three edges thereof. This recess forms a boss 623 which is received within the interior of the carton blank 100A during operation while a shoulder 625 formed by the recess 621 contacts the upper edge of the carton blank 100A. The back surface (as viewed from FIG. 41) of the die bases 608, includes a shallow central cavity 634 (FIG. 44) having tapered angular walls formed at approximately 45° angles. Disposed outwardly from the back wall of the die base 608 is an operator plate 630 which is pivotally connected by linkages 631 and 633 to the die base 608 and pneumatic operator unit 614 (shown in FIG. 41), respectively, being movable both toward and away from the back wall of the die base 608 as illustrated by the arrow in FIG. 43. The operator plate 630 is additionally formed having a projection 636, the configuration of which is a mirror image of the concave cavity 634 formed on the back surface of the die base 608.

During the lowering of the pre-form apparatus 600 toward the conveyor 560, the operator plate 630 is initially spaced outwardly from the die base 608 (as shown in FIG. 43) such that the end closure panel 114 may be received between the interface of the operator plate 630 and die base 608. As such, the continued lowering of the apparatus 600 allows the boss 623 to enter into the interior of the carton blank 100 while the shoulder 625 formed on the bottom surface of the die base 608 contacts the top edges of the carton blank 100A and firmly presses or seats the carton blank 100A against the lower support member 569 (shown in FIG. 41). As may be recognized, this seating positively registers the carton blank 100A within the anvil 560, thereby insuring the accuracy of the subsequent creasing and folding operations being performed by the apparatus 600.

With the die base 608 lowered against the top edges of the carton blank 100A, the pneumatic operator 614 is activated causing the operator plate 630 via the linkages 633 and 631 to move toward the die base 608. In the preferred embodiment, this movement of the operator plate 630 is very rapid, thereby imparting a high velocity to the operator plate 630 such that the end closure panel 114 is creased between the cavity 634 and the extension 636. This creasing action causes the end closure panel 114 to be forced into and permanently assume the shallow, recessed, angular cornered shape of the cavity 634. Subsequently, the hydraulic operator 634 is deactivated, causing the operator plate 630 to move back to its initial position spaced from the die base 608. The housing 604 and thus the die base 608 is then raised back to its elevated position.

Thus, from the above, it will be understood that, by the operations occurring at the first phase of the pre-form apparatus 600, the carton blank 100A is properly seated in the anvil 560 and creased into a configuration illustrated in FIG. 42, having three beveled surfaces 632 forming a picture-frame-like shape along the edges of the end closure panel 114.

Subsequent to completion of the first operational phase of the pre-form apparatus 600 (i.e., the carton blank 100A being correctly seated within the anvil 560 and having its end closure panel 114 creased by the die base 608), the conveyor 550 continues its intermittent horizontal motion, causing the carton blank 100B to be positioned and registered beneath the second phase die base 610.

Figure 48:
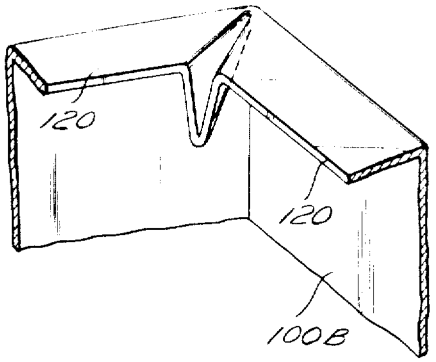
FIG. 48 is a partial perspective view of the forward corner of the carton blank of the present invention upon completion of the second pre-form stage.
Figure 46:
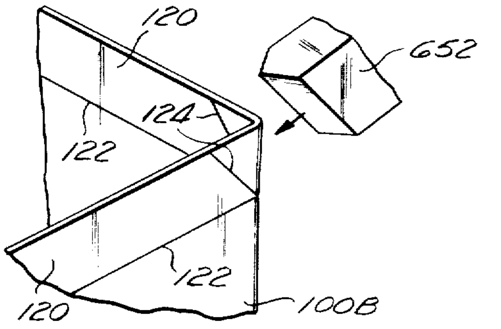
FIG. 46 is a partial perspective view of the carton blank of the present invention, illustrating the spacial relationship between creasing pins of FIG. 45 and the two forward corners thereof.
Figure 46A:
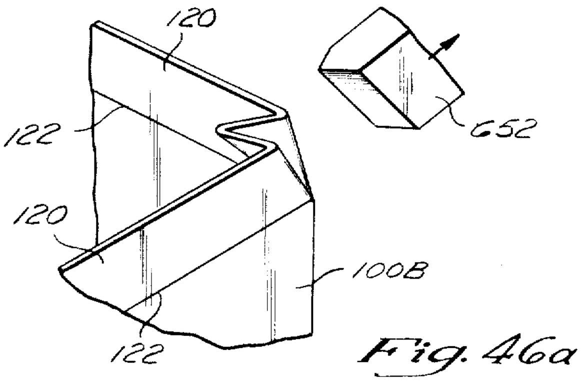
FIG. 46A is a perspective view of the carton blank of FIG. 46 illustrating the configuration of the two forward corners thereof after extension of the creasing pins.

Basically, by this second phase of pre-form apparatus 600, the two corners of the carton blank 100B located furthest from the end closure panel 114, are stress-relieved by being dimpled and pushed within the interior of the carton blank (shown in FIG. 46A). Additionally, the sealing tabs 120 formed adjacent the top three edges of the carton blank 100B are bent or folded within the interior of the carton blank 100B to be disposed in a plane normal to the end closure panel 114 (shown in FIG. 48).

Figure 45:
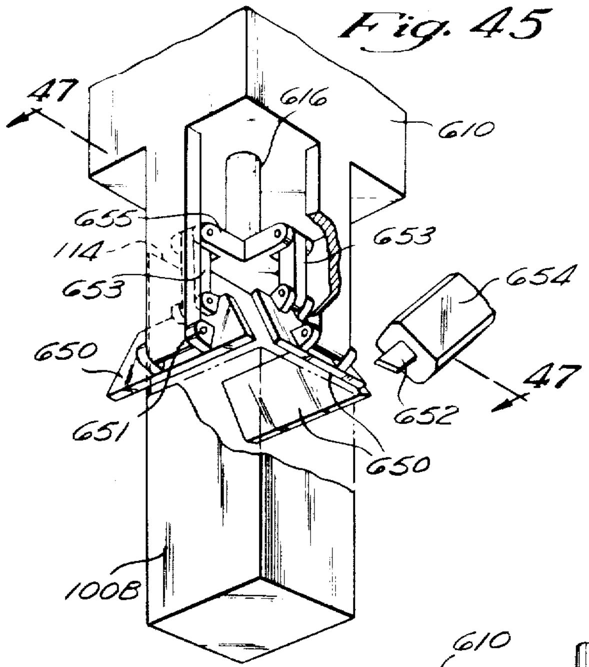
FIG. 45 is a perspective view of the second pre-form die of FIG. 41 positioned over the open end of the carton blank, depicting the detailed construction thereof.

The operations occurring on the carton blank 100B and the respective apparatus of this second phase of the pre-form apparatus 600, are illustrated in FIGS. 45–48. As shown in FIG. 45, the die base 610 preferably includes three plate operators 650 which are pivotally mounted at one end to the die base 610 by pins 651 and are connected at the other end to the respective pneumatic operator 616 by linkages 653 and cross-head 655. As will be explained in more detail below, these operator plates 650 pivot in an inward direction towards the interior of the carton blank 100 when actuated, thereby folding over the sealing tabs 120 of the carton blank 100B, which extend slightly above the surface of the anvil 560 (better shown in FIG. 47).

Disposed adjacent the two forward corners of the die base 610 (as viewed in FIG. 41) are two creasing pins 652 having their respective pneumatic RAM operators 654 securely mounted to the bottom surface of the support plate 606. As best shown in FIGS. 46 and 46A, these creasing pins are aligned diagonally with the forward corners of the carton blank 100B and angularly oriented in a downward direction such that the pins 652, upon actuation, extend slightly within the interior of the carton blank 100B.

Figure 47:
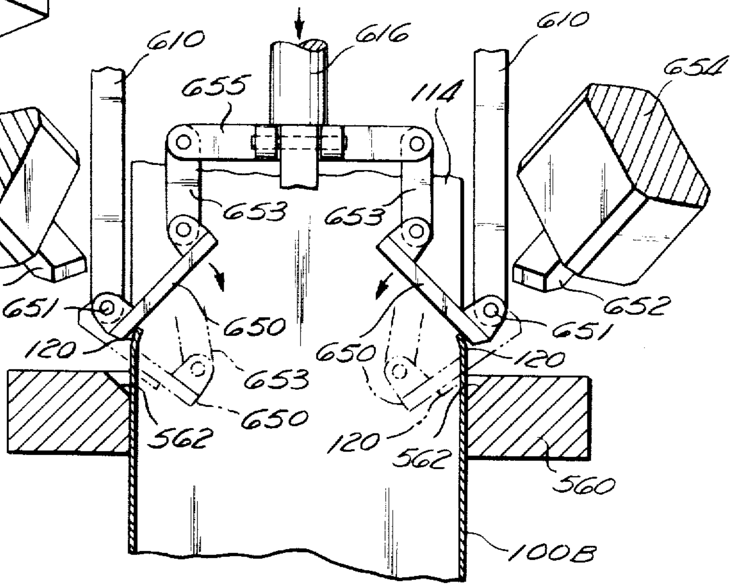
FIG. 47 is a cross-sectional view of the second pre-form die taken about lines 47—47 of FIG. 45 illustrating the movement of the operator plates thereon.

The detailed operations occurring at the second phase of the pre-form apparatus 600 may now be described. With the carton 100B aligned under the die base 610, the housing 604 carrying the die base 610 thereon is lowered (as previously described in relation to the first phase of the pre-form) onto the carton blank 100B. As shown in FIGS. 47, when the die base 610 is extended to its fully lowered position, the three operator plates 650 pivotally connected to the die base 610 reside partially outboard of the edges of the carton blank 100B and are angularly oriented such that their top edges extend within the interior of the plane of the carton blank 100B while their lower edges lie partially within the beveled edge 562 of the anvil 560. Further, disposed in this lowered position the operator plates 650 lightly touch the top edge of the sealing tabs 120 extending upon the three sides of the open carton blank 100B, thereby causing the sealing tabs 120 to flip slightly inward toward the interior of the carton blank 100B, as shown in FIG. 47. This particular slight flexing has been found to substantially increase the rigidity of the forward corners of the sealing tabs 120 and aid in the subsequent corner creasing operation performed in the second phase of the carton pre-form.

Subsequently the pneumatic RAM operators 654 of the creasing pins 562 are actuated, causing the creasing pins 562 to extend and travel in a direction indicated by the arrow in FIG. 46, thereby contacting the two forward corners of the carton blank 100B. As previously mentioned, since the sealing tabs 120 are rigidified by the operator plates 650 at their top edge, upon contact therewith, the corners of the carton blank 100B readily collapse or deform and are pushed within the interior of the carton blank 100B as well as in a slight downward direction. Due to the carton blank 100B being formed with the V-shaped scoring notches 124 (as shown in FIG. 5) located at these respective forward corners, the corners consistently collapse into a V-shaped orientation as shown in FIG. 46A. As will be recognized, this V-shaped orientation relieves any stresses in the corners of the carton blank 100B during the folding operations and effectively miters the forward corners of the carton blank 100B for the subsequent sealing tab 120 fold-over operation.

Having the corners of the carton blank 100B relieved in such a manner, the creasing pins 652 are retracted back to their stored position (shown in FIG. 46A) and the operator plates 650 are activated by their respective pneumatic mechanism 616 to contact and fold over the sealing tabs 120. This particular fold-over operation is illustrated schematically in FIG. 47, wherein the operator plates 650 are shown in their initial position placed over the carton blank 100B with the sealing tabs 120 adjacent their lower surfaces. From their initial position, the operator plates 650 are pivoted downward within the interior of the carton blank 100B in a direction indicated by the arrows to assume a position illustrated by the phantom lines in FIG. 47. As will be recognized, during this downward pivoting of the operator plates 650, the sealing tabs 120 are folded over to reside exclusively within the interior of the carton blank 100B. As in the previous sealing tab fold-over operations, the consistency and accurate location of the fold is insured by the scoring lines 122 (shown in FIG. 3) formed on the carton blank 100B, which substantially weaken the resistance to the fold at a precise location on the carton blank 100B.

As shown in FIG. 47, the operator plates 650 pivot through an arc substantially greater than 90° such that, during the folding operation, the top edge of the sealing tab 120 initially extends downward within the interior of the carton blank 100B. This extended fold-over of the sealing tab 120 compensates for the slight memory property of the carton blank material (as previously described) so that, when the operator plates 650 return to their initial position, the sealing tabs 120 will spring slightly upward, but remain in a plane normal to the exterior walls of the carton blank 100B.

As will be recognized, in the ideal situation, the lower pivot point 651 of the plate members 650 should be located at the bend point (i.e., the scoring lines 122) of the carton blank 100B thereby insuring a pure and consistent bending force being applied to the sealing tab 120. However, since all three sealing tabs 120 must be concurrently folded over, the operator plates 650 must be spaced from the scoring lines 122 and from one another to provide sufficient clearance during the pivoting procedure. The outboard pivot point 651 of the present invention provides a suitable compromise structure wherein the operator plates 650 are spaced from one another to freely pivot simultaneously without contacting each other and which the applicant has found to yield consistent results. As such, during the pivoting of the plate members 650, the sealing tabs 120 not only pivot downward, but additionally slides or cams against the lower surface of the plate members 650. This sliding motion tends to force the lower portion of the sealing tab 120 to flex outward into the beveled recess 562 of the anvil 560. However, due to the scoring lines 122 weakening the sealing tab and forming, in effect, a preferential fold line, this outward flexure is held to a minimum and does not detract from the overall effectiveness of the fold down operation.

Subsequently, the pneumatic mechanism 616 is deactivated, returning the operator plates 650 to their original position as shown in FIG. 46, and the housing 604 of the pre-formed apparatus 600 is vertically raised, thereby removing the die base 610 as well as the creasing pins 652 carried thereon from the carton blank 100B. Thus, as may be easily recognized, by the operation of the second phase of the pre-form apparatus 600, the carton blank 100B is formed into the configuration shown in FIG. 48 with the sealing tab 120 folded within the interior of the carton blank 100B, and lying in a plane normal thereto with the two forward corners forming a miter-like corner interface.

Upon completion of the second phase of the pre-form apparatus 600 operation, the conveyor 550 again begins its intermittent horizontal travel, thereby positioning the carton blank 100C beneath the die base 612 for the third operational phase of the pre-form apparatus (shown in FIG. 41). At this third phase, the top edges of the carton blank 100C are beveled outward to extend slightly beyond the sidewall sections of the carton blank 100C and the forward corners are stretched outward or expanded, to provide a suitable surface for end sealing, as shown in FIG. 51A and described in detail below. In the preferred embodiment, this procedure is accomplished effectively and easily by the die base 612 (shown in FIG. 49) being lowered firmly upon the top edge of the carton blank 100C.

Referring to FIG. 49, it may be seen that the die base 612 is formed into a generally square configuration and includes a chamfer 660 along its lower edges. In the preferred embodiment, this chamfer is formed at approximately a 45° angle to the bottom surface of the die base 612 such that it mates with the beveled surfaces 562 formed on the anvil 560 (shown in FIG. 50). As shown, the beveled surfaces 562 of the anvil 560 is provided with a series of circumferentially extending serrations 563 which (as will be explained in detail infra) form a gripping surface for the anvil 560 during the subsequent end sealing procedure of Work Station VII.

The two forward corners (as viewed from FIG. 41) of the die base 612 slightly protrude from the flats of the die base 612 and are formed into a conical configuration 662. The outside diameter of this conical protrusion 662 is a mirror image of the enlarged radii formed at the respective corners of the anvil 560 (shown in FIG. 50). Thus, the lower edges of the die base 612 are formed to tightly mate with the beveled surface 562 of the anvil 560 such that the die base 612 and anvil 560 cooperate to form a mold-like fixture.

As previously described in relation to the first two phases of the pre-form apparatus 600, in operation the die base 612 is lowered toward the conveyor 550 to contact the top edges of the carton blank 100C. Extended to its fully lowered position, the die base 612 contacts the sealing tabs 120 (previously folded over to lie within a plane normal to the flats of the carton blank 100C) and forces the sealing tabs 120 in a downward direction against the adjacent lower portion of the carton blank 100C (shown in FIG. 51).

The continued downward pressure of the die base 612 forces the carton blank 100C and its sealing tab 120 to reside between the beveled surfaces 562 of the anvil 560 and the chamfered edges 660 of the die base 612. As such, the top edges of the carton blank 100C are beveled outward and extend slightly beyond the vertical planes of the carton segments 102–108 of the carton blank 100C (as shown in FIG. 51) and the serrations 563 are pressed slightly into the lower surface of the top edges of the carton blank 100C.

It will additionally be recognized that, during this procedure, the forward corners of the carton blank 100C are stretched to conform to the conical corners 662 of the die base 612 and the enlarged radii formed in the anvil 560. Thus, the forward corners of the carton blank 100C are formed having an outer enlarged radius as clearly shown in FIG. 51A.

Subsequently, the die base 612 is raised in a vertical direction by the push rods 603 (FIG. 1) in a manner previously described, whereby the sealing tabs 120 spring upward (due to the moderate memory properties of the carton blank material) slightly.

Thus, from the above, it may be recognized that, upon completion of its travel through the pre-form apparatus 600 and its three-stage operation, the upper or open edges of the carton blank 100C are pre-formed into a configuration suitable to the subsequent end sealing and bonding operation, without the use of forming mandrels or the like being inserted within the interior of the carton blank 100 during operation. Further, by the pre-forming process, the upper edges of the carton blank 100 are formed in an upward-facing picture-frame-like structure which mates with the configuration of the end closure panel 114. Additionally, it will be recognized that each of the three phases previously described in reference to the pre-form apparatus 600, occurs simultaneously for each lowering of the pre-form apparatus 600 down upon the carton blanks 100A, 100B, and 100C.

Work Station VI—Filling Station

Following the pre-form apparatus operation, the carton blanks 100 are transported by the conveyor 550 to Work Station VI (the Filler Station). At this station, the carton blanks 100 are filled with a desired liquid by a two-stage operation wherein, at the first stage, a pre-fill nozzle supplies a slight majority (approximately 60%) of the liquid to the carton blank and, at the second stage, a topper nozzle accurately fills the carton to the precise liquid level. In the preferred embodiment, both of the nozzles, i.e., the pre-fill and topper nozzles, are constructed in the same manner, with the differences in the quantity of liquid delivered into the carton being controlled by the adjustable displacement of a metering pump positioned on each of the nozzles.

As will be recognized, to fully utilize the space reduction made possible by the rectangular configuration of the container 12 (shown in FIG. 1A), the carton blank 100 must be filled with the desired liquid to a level proximal the open end of the carton blank 100. As such, the container 12 of the present invention is highly susceptible to spillage during the filling operation. Further, since, in the preferred embodiment, the end closure bonding and sealing operation (occurring at Work Station VII) is accomplished with an ultrasonic welding process, it is desirable that, during the filling operation, liquid does not splash or foam onto the sealing tabs 120 formed at the open end of the carton blank 100.

To facilitate both of these objectives, a novel filling nozzle and metering pump apparatus is utilized which, in the preferred embodiment, are combined into a single integral unit providing a positive liquid displacement, a high volume, low velocity discharge, and an accurate discharge shut-off which significantly reduces the possibility of accidental over-fill and splashing of the liquid during filling. Further, an alternative nozzle device is disclosed which includes all of the above performance features and is specifically adapted for use with a constant volume and constant pressure pump wherein liquid metering is accomplished exclusively by an internally reciprocating spool.

Additionally, a novel pump and valve operating and timing mechanism is disclosed which synchronizes the operation of the metering pump and nozzle with respect to the motion of the carton blanks upon the conveyor and provides an automatic and manual no-fill mode which prevents fluid discharge when a carton blank 100 is not positioned under the nozzle or when desired by the operator.

Figure 52:
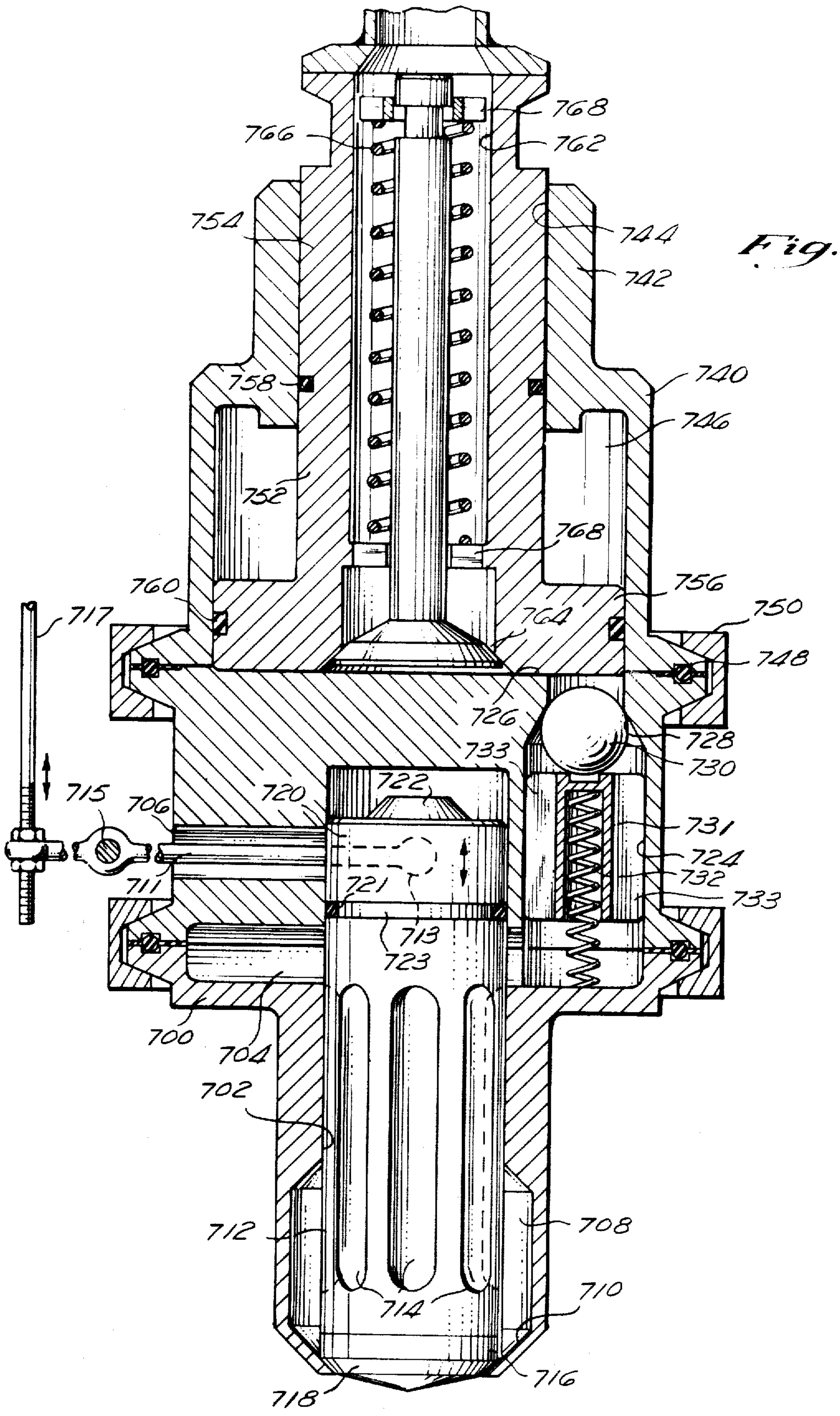
FIG. 52 is a cross-sectional view of the internal reciprocating spool nozzle and positive displacement metering pump of Work Station VI.

Referring to FIG. 52, the detailed construction of the nozzle 700 and metering pump 740 of the present invention is shown. The nozzle 700 is formed having a generally cylindrical configuration and is preferably fabricated from stainless steel such that the corrosive effects of the liquid passing therethrough are minimal. A large central aperture 702 extends substantially through the length of the nozzle 700 and communicates with an enlarged torroidal cavity 704 formed concentric therewith. Adjacent the closed end of the aperture 702 is an aperture port 706 which extends radially inward from the exterior of the nozzle 700 into the upper end of the aperture 702. The aperture 702 is enlarged at its lower end to form a discharge cavity 708 having a beveled or conical inside diameter 710. As will be explained in more detail below, this beveled diameter 710 provides a valve seat for a nozzle spool 712 and additionally directs the liquid passing through the end of the nozzle 700 inward towards its own center line.

Disposed within and slidingly received by the aperture 702 is a nozzle spool 712, preferably formed in a closed end tubular configuration, the length of which is less than the length of the aperture 702. The spool 712 includes a plurality of elongated channels 714 which extend along the outer diameter thereof and are located such that, when the lower end of the spool 712 is seated against the beveled diameter 710, the top edge of each of the channels 714 reside slightly below the lower surface of the enlarged torroidal cavity 704.

The lower end of the spool 712 is provided with a valve cap 716 including a beveled edge 718 which mates with the beveled diameter 710 formed on the end of the nozzle 700. In the preferred embodiment, this valve cap 716 is formed of DELRIN, a relatively hard plastic material, possessing a slight resiliency which, when pressed against the beveled diameter 710, provides a positive shut-off for the nozzle 700.

The upper end of the spool 712 is preferably formed having a closed end 720, the outside diameter of which is slidingly received within the aperture 702 and is provided with an O-ring seal 721 which forms a liquid-tight seal between the spool 712 and the aperture 702. As shown, the O-ring 721 is disposed within an annular recess 723 formed in the spool 712 and travels with the spool 712 during reciprocation within the aperture 702.

The upper closed end 720 is provided with an upward projection 722 having a generally conical shape which serves as a bumper for the internally moving spool 712 as it slides in an upward direction within the aperture 702. As shown, the upper end 720 preferably includes an arm linkage 711 which is rotatably mounted in a ball and socket arrangement 713 at one end, and extends horizontally through an aperture 706 formed in the upper portion of the nozzle 700. The linkage 711 is pivotally mounted intermediate its length about a pin 715 which is rigidly connected to the frame (not shown) of the apparatus 10. The opposite end of the linkage 711 is adjustably connected to a push rod 717 which communicates with a linkage drive (not shown). As will be recognized, by vertically moving the push rod 717 in the direction of the arrows in FIG. 52, the spool 712 reciprocates within the central aperture 702.

The inlet to the nozzle 700 is formed by a vertical aperture 724 which extends from the upper surface 726 of the nozzle into the enlarged torroidal cavity 704. The upper end of the inlet aperture 724 is tapered in diameter, forming a beveled shoulder 728 which, in the preferred embodiment, cooperates with a ball check valve 730. The check valve 730 is supported on its lower surface by a spider cylinder 731 having a plurality of radially extending webs 733 which slidingly engage the cylindrical walls of the aperture 724. Both the spider cylinder 731 and check valve 730 are biased against the shoulder 728 in a conventional manner by the spring 732. This ball check valve 730 permits flow into the inlet aperture 724 but prevents any reverse flow therefrom.

During operation, the spool 712 vertically reciprocates within the aperture 702 and functions both as a shut-off valve for positively sealing the discharge end of the nozzle, and a flow control valve for metering the passage of liquid through the nozzle.

The particular flow control properties of the spool 712 are made possible by the design of the channels 714. These channels 714 are designed such that the ratio of the flow cross-section of the channels 714 to the outlet flow cross-section 708 is essentially a constant value throughout the opening and closing of the nozzle 700, with the outlet flow cross-section being considerably greater than the channel flow cross-section. As such, as the liquid travels through the channels 714, it is free to flow into the larger discharge cross-sectional area 708, thereby dissipating fluid pressure and attenuating fluid velocity. Thus, the liquid exits the nozzle 700 at a substantially reduced velocity which yields laminar flow, thereby allowing the carton blank 100 to be filled without the possibility of splash-over.

Additionally, since the nozzle 700 of the present invention utilizes an internally moving spool 712, rather than an externally moving spool as utilized extensively in the prior art, upon discharge from the nozzle, the liquid is directed by the beveled diameter 710 inward, towards the center line of the nozzle. This inward directed flow allows the diameter of the nozzle discharge to be formed as large as the open end of the carton blank 100 into which the liquid is being delivered, thereby facilitating a high volume liquid flow rate. Further, the internally reciprocating spool 712 of the present invention specifically eliminates the entrapment of air under the nozzle discharge which occurs in the prior art nozzles, thereby greatly reducing foam generated during the filling process. In FIG. 52C, a conventional prior art nozzle "N" is shown, having a spool "S" outwardly reciprocable (in a direction indicated by the arrow in FIG. 52C) to valve the discharge "D". Typically, the spool "S" is normally closed by a spring biasing arrangement (not shown) which permits the outward movement of the spool "S" (i.e., opening of the nozzle) in response to incoming fluid pressure. Such an arrangement always results in a minimum discharge opening for a given liquid flow rate which yields a maximum discharge velocity. As shown, during operation, the conventional nozzle "N" discharges liquid over the end of the spool "S" creating an umbrella-like flow configuration. This umbrella configuration entraps air beneath the spool "S" and above the rising liquid level which generates substantial foam formation in the liquid "L". The generation of foam adversely effects filling accuracy and additionally promotes a splash-over during the filling operation. Additionally, although some prior art nozzles have attempted to alleviate the air entrapment problem by venting the air through a central aperture (not shown) formed axially through the spool "S", such attempts have proven incapable of providing a complete solution. In contradistinction to the conventional prior art nozzle, the internally reciprocating spool 712 of the present invention completely eliminates the air entrapment problem associated during the filling operation. As shown in FIG. 52D, during filling, the spool 712 reciprocates upward, allowing the liquid to flow through the discharge 708 in a converging flow configuration. As such, the umbrella of the prior art is eliminated with its attendant air entrapment and foam generation being eliminated. Thus, due to the high volume, low velocity flow rate through the nozzle, filling of the carton blank 100 occurs rapidly, with substantially reduced possibility of liquid splashing onto the top edge of the carton blank 100.

By reference to FIG. 52, the detailed operation of the nozzle 700 of the present invention may be easily recognized. In the preferred embodiment, the spool 712 is reciprocated vertically within the aperture 702 of the nozzle 700 by the downward reciprocation of the push rod 717 which is transmitted to the spool 712 via the linkage arm 711. During this movement, the spool is drawn upward toward the closed end of the aperture 702 until the protrusion 722 of the closed end 720 contacts the upper wall of the aperture 702. With the spool 712 raised to this elevated position, the channels 714 communicate with the enlarged cavity 704 and the lower DELRIN cap 718 is removed from the seat 710, such that the nozzle 700 is opened, and the liquid flows through the inlet aperture 724, channels 714, and discharge cavity 708 of the nozzle 700.

Alternatively, the nozzle 700 may be closed or shut off by reciprocating the push rod 717 in an upward vertical direction, whereby the spool 712 is forced in a downward direction within the aperture 702, isolating the channels 714 from the enlarged aperture 704 and simultaneously seating the DELRIN cap 718 tightly against the beveled diameter 710 of the nozzle 700. This tight sealing of the cap 718 positively shuts off flow through the nozzle 700 and eliminates any dripping of liquid from the end thereof.

Although, in the preferred embodiment, this reciprocation of the spool 712 within the aperture 702 is accomplished by the reciprocation of the push rod 717, it should be recognized that, alternatively, the upper end of the aperture 702 may include a vacuum port (not shown) which extends radially outward in the vicinity of the port 706 and is connected to an alternating vacuum-pressure supply. In this regard, a three-way solenoid operated valve (not shown) may be mounted to the vacuum port (not shown), and connected to both a constant pressure line and a constant vacuum line (not shown) which, by the operation of the solenoid, may be alternatively exposed to the vacuum port to facilitate the rapid reciprocation of the spool 712 within the aperture 702.

The amount of liquid passing through the nozzle 700 is controlled by the metering pump 740 of the present invention which is preferably rigidly mounted to the top surface of the nozzle 700. As shown in FIG. 52, the metering pump 740 includes a bell-shaped cylinder housing 742 having an aperture 744 extending throughout its length. Adjacent the lower end of the housing 742, this aperture 744 is enlarged to form a pumping chamber 746 which communicates directly with the inlet aperture 724 of the nozzle 700.

To prevent any leakage between the metering pump 740 and the nozzle 700, an O-ring 748 is provided along the periphery of the interface between the metering pump 740 and nozzle 700 and is clamped and maintained in position by a collect 750 which extends around the exterior diameter of both the metering pump 740 and nozzle 700.

Disposed within the chamber 746 is a pump piston 752 having an elongate upper section 754 and a lower head member 756. The diameters of the elongate section 754 and the head member 756 are sized slightly less than the diameters of the aperture 744 and pump chamber 746, respectively, such that the piston 752 may slide vertically within the housing 742. Additionally, both the elongate section 754 and the head member 756 are provided with O-ring seals 758 and 760, respectively, which prevent leakage of liquid between the piston diameters and the housing apertures.

An elongate aperture 762, preferably formed concentric with the piston 752 and extending throughout its length, provides a liquid inlet for the metering pump 740. As shown in FIG. 52, the inlet aperture 762 includes a valve 764 biased in a closed position by a spring 766 and registered within the aperture 762 adjacent both ends by a plurality of guide projections 768. As will be recognized, the valve 764 allows liquid passage into the pumping chamber 746 but prohibits any flow of liquid in a reverse direction through the inlet aperture 762.

In operation, the pump piston 752 is initially raised upward through the length of the pumping chamber 746 by a rigid linkage 780 (shown schematically in FIGS. 53–55) attached to the upper end of the elongate section 754. During this upward travel, the pressure of the incoming liquid within the inlet aperture 762 (produced by the static head of liquid contained in storage reservoir 763, shown in FIG. 1) causes the valve 764 to move off its seats or open, thereby allowing liquid to fill the volume of the chamber 746. The pressure within the aperture 762 and within the chamber 746 rapidly equalizes at the end of this stroke, so that, due to the biasing force of the spring 766, the check valve 764 closes or seats against the bottom surface of the piston 752.

Subsequently, the piston 754 is forced in a downward direction by the rigid linkage 780 (shown in FIGS. 53–55), thereby displacing the liquid contained in the pumping chamber 746 through the ball check valve 730 of the nozzle 700. During this downward travel or pumping stroke of the metering pump 740, the spool 712 of the nozzle 700 must be vertically raised within the structure 702 (in the manner previously described) such that the channel 714 communicates with the inlet aperture 724. As such, upon reciprocation of the piston 754, the entire volume of liquid contained within the pumping chamber 746 flows through the nozzle 700 and is deposited within the carton blank 100. Subsequently, upon completion of the pumping stroke, the spool 712 of the nozzle 700 moves vertically downward, seating against the beveled diameter 712, thereby providing a positive shut-off for the nozzle 700.

It will be recognized that, in basic principle, the metering pump 740 of the present invention is conventional in design in that it simply provides a positive displacement piston pump including an inlet and outlet check valve. However, since in the present invention the metering pump 740 is combined with the nozzle 700 to form a single integral unit, the mechanism provides significant improvements over the prior art designs.

Besides the obvious size and weight reduction benefits made possible by such a design, the present invention significantly reduces the volume of the liquid passages on the outlet side of the metering pump 740, thereby greatly reducing the possibility of air ingestion into the liquid in the event that the spool 712 is not precisely timed to open and close at the beginning of the pump piston 752 travel. Further, since the lower surface of the piston 752 bottoms out directly against the top surface of the nozzle 700 at the end of the pumping stroke, the entire volume contained within the pumping chamber 746 is displaced through the nozzle 700, such that any air entering the system is swept out during each successive pumping cycle and will not accumulate in the pumping chamber. As will be recognized, this lack of air accumulation significantly increases the accuracy of the liquid quantity being delivered on each pumping cycle. Additionally, since the inlet to the pumping chamber 746 is concentric with the piston 752, any leakage through the valve 764 during the pumping cycle is substantially eliminated by the positive seating of the valve 764 caused by the increased pressure developed by the downward movement of the piston 752.

An alternative embodiment of a filler nozzle suitable for use in the present invention as well as many other filling applications is shown in FIG. 52A. The alternative nozzle 950 includes a generally cylindrical-shaped body configuration formed of an upper and lower housing portion 952 and 954, respectively. As with the nozzle 700 of FIG. 52, the nozzle 950 includes a central aperture 956 which extends in an axial orientation substantially throughout the length of both the upper and lower housing portions 952 and 954. Adjacent opposite ends of the lower housing portion 954, the central aperture 956 is enlarged to form two flow cavities 958 and 960. As shown, the upper flow cavity 958 communicates with the nozzle inlet 962, whereas the lower flow cavity 960 forms the outlet 964 of the nozzle 950.

Disposed within the central aperture 956 is a spool 966, the outside diameter of which is slightly less than the diameter of the aperture 956 such that the spool 966 may reciprocate. The spool 966 may be provided with an end cap 968 rigidly attached adjacent one end thereof which is preferably fabricated of DELRIN and formed to tightly mate with the beveled circumference of the nozzle outlet 964. As will be recognized, when this cap 968 is seated upon the outlet 964, the nozzle is valved with all flow through the outlet 964 being prohibited.

Intermediate the length of the spool 966, a plurality of flow channels 970 are formed which are spaced symmetrically about the circumference of the spool 966. As with the embodiment of FIG. 52, these flow channels 970 selectively communicate between the upper and lower flow cavities 958 and 960 thereby forming a metering passageway for liquid flowing through the nozzle 950.

At the intersection between the upper and lower housing portions 952 and 954, respectively, a cap seal assembly 972 is provided which provides a liquid-tight seal between the housing portions 952 and 954 as well as a low friction seal around the circumference of the spool 966. As best shown in FIG. 52B, the cap seal assembly 972 resides in an annular recess 974 formed in the lower housing portion 954 and includes an O-ring 976 and C-shaped seal 978. The C-shaped seal 978 is constantly biased against the periphery of the spool 966 by the O-ring 976 and is compressed between the upper and lower housing portions 952 and 954 to prevent leakage between the housing portions 952 and 954.

In the preferred embodiment, the seal 978 is fabricated from a moderately stiff yet resilient elastomeric material which effectively forms a liquid-tight seal with the spool 966 yet possessing a small coefficient of friction to allow the spool 966 to readily reciprocate within the aperture 956. As will be explained in more detail below, this low friction stationary cap seal configuration eliminates any liquid displacement during the closing of the nozzle caused by the piston effect of a sealing member (such as the O-ring 721 of the nozzle 700 of FIG. 52) reciprocating with the spool 970 within the aperture 956.

The upper housing portion 952 is preferably provided with a control chamber 980 which communicates with the upper end of the central aperture 956 and accommodates the bumper portion 982 of the spool 966. As shown, the control chamber 980 communicates with a vacuum pressure port 986 which may be connected to a vacuum and pressure source (not shown). As will be recognized, due to the cap seal assembly 972 being disposed between the housing portions 952 and 954 and tightly sealing against the spool 966, the control chamber 980 and upper portion of the central aperture 956 are isolated from liquid passing through the nozzle. As such, the control chamber 980 may be utilized to raise and lower the internal reciprocating spool 966 within the central aperture 956. In response to the alternative application of vacuum or pressure to the port 986. Further, in the preferred embodiment, an additional port 984 is provided which may be provided with an air switch (not shown) or other similar device for sensing when the nozzle 700 is in its open and closed position.

In operation, the nozzle 950 is preferably connected to a constant pressure liquid supply (such as the elevated liquid reservoir 763 of FIG. 1) which is connected to the inlet 962 of the nozzle 950 by means of the conduit 988. To permit liquid to flow through the nozzle 950, vacuum is selectively applied to the vacuum port 986 which causes the spool 966 to reciprocate upward within the aperture 956, thereby unseating the end cap 968 from the outlet 964. Liquid entering the inlet 962 then flows through the flow channels 970 into the enlarged cavity 960 and through the outlet 964.

In the preferred embodiment, the effective area of the flow channels 970 is formed to be less than the area of the lower cavity 960 such that the incoming liquid pressure may be dissipated and velocity attenuated through the valve 950 (as previously described in relation to the nozzle 700 of FIG. 52). Additionally, the nozzle 950, due to its internally reciprocating spool 966 and angularly beveled discharge 964 provides an axially coverging liquid discharge which, as previously mentioned, eliminates air entrapment beneath the nozzle discharge and foam generation during the filling operation.

To discontinue the flow of liquid through the nozzle 950, the vacuum to the port 986 is terminated and pressure is applied thereto, thereby causing the spool 966 to reciprocate downward toward the outlet 964. Due to the cap seal 972 remaining stationary during this reciprocation process, it will be recognized that the effective area of the spool 966 remains constant during closing. This same effective area prevents any displacement during the closing operation which would be present with the O-ring seal moving with the spool 966, and thereby eliminates the piston effect which causes a portion of the liquid contained within the aperture 956 to rapidly squirt from the discharge 964 during closing.

Further, in the preferred embodiment, the flow channels 970 are formed to provide a substantially constant ratio between the cross-sectional flow area of the channels 970 to the outlet 964 throughout opening and closing of the nozzle 950. As such, the fluid velocity remains at a constant value during closing of the valve thereby yielding laminar flow.

Thus, the flow channels 970 perform a metering effect which, in combination with the cap seal assembly 972, provides an effective shut-off nozzle which eliminates any piston effect during closing and effectively operates with only one moving part, i.e., the spool 966.

Figure 53:
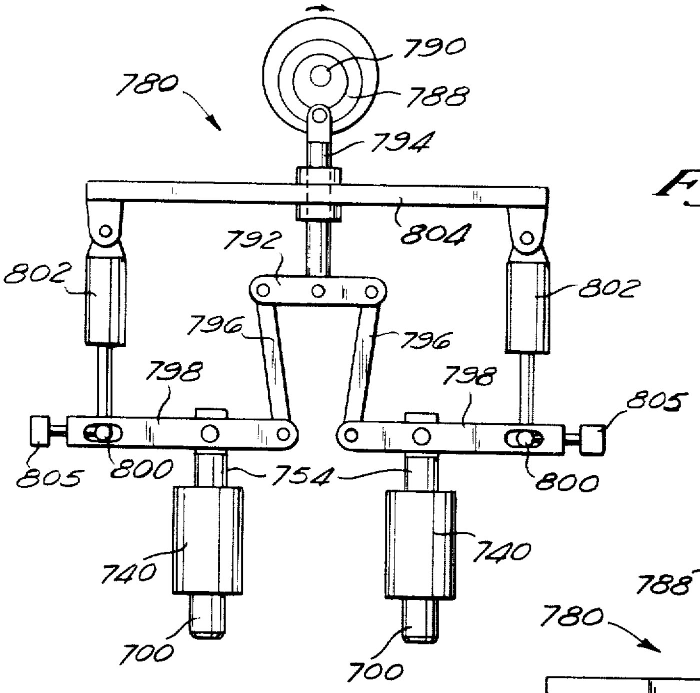
FIG. 53 is a schematic view of the operating and timing mechanism of the present invention connected to the nozzle and pump assembly of FIG. 52.

Referring now to FIG. 53, the operating and timing mechanism 780 of the present invention for synchronizing and adjusting the operation of the filler nozzles with respect to the motion of the carton blanks 100 carried by the conveyor 550 will be described. It should be noted that, for illustration purposes, the operating and timing mechanism 780 are described in relation to the nozzle 700 and metering pump 740 assembly of FIG. 52. However, the same operating and timing mechanism 780 may be modified for use with the alternative nozzle 750 of FIG. 52A without departing from the spirit of the present invention.

As shown in FIG. 53, the operating and timing mechanism 780 comprises a mechanical linkage driven by a cam operator 788 which is powered by a constantly rotating shaft 790 synchronized with the drive system (not shown) of the conveyor transport 550. The cam 788 converts the rotation of the shaft 790 into a reciprocating motion which drives a cross-head 792 via a vertical push rod 794. As will be recognized, the cross-head 792 is rigidly attached to this vertical push rod 794 such that the vertical push rod 794 and the cross-head reciprocate as an integral unit in a vertical direction in response to the rotation of the cam 788.

Opposite ends of the cross-head 792 are connected to adjacent metering pumps 740 by way of a drive linkage 796 having one end thereof pivotally mounted to the cross-head 792 and the other end thereof pivotally connected to a rocker arm 798. As shown, the rocker arms 798 are rotatably mounted intermediate their length to the piston 754 of the metering pump 740 to form a central pivot, and are additionally provided with an adjustable pivot 800 at their opposite ends. This adjustable pivot 800 connects one end of the rocker arm to an air or hydraulic cylinder 802 which is pivotally mounted to the machine frame 804.

Since the metering pump 740 and nozzle 700 are additionally rigidly mounted to the machine frame 804, it will be recognized that, upon the vertical reciprocated travel of the cross-heads 792, caused by the rotation of cam 788, the pistons 754 of the metering pumps 740 are raised and lowered (i.e., comprising the pump stroke of the metering pump 740) by means of the vertical linkage 796 and rocker arms 798.

Figure 54:
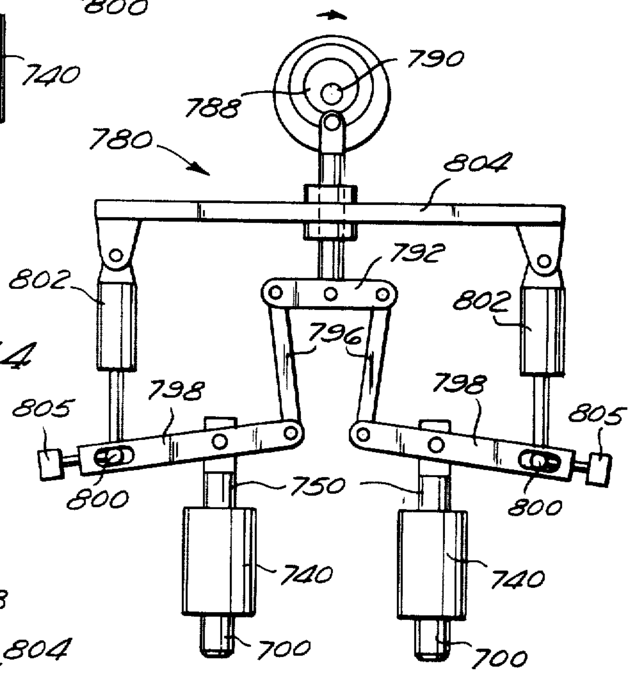
FIG. 54 is a schematic view of the operating and timing mechanism of FIG. 53 shown in a normal intake stroke.
Figure 55:
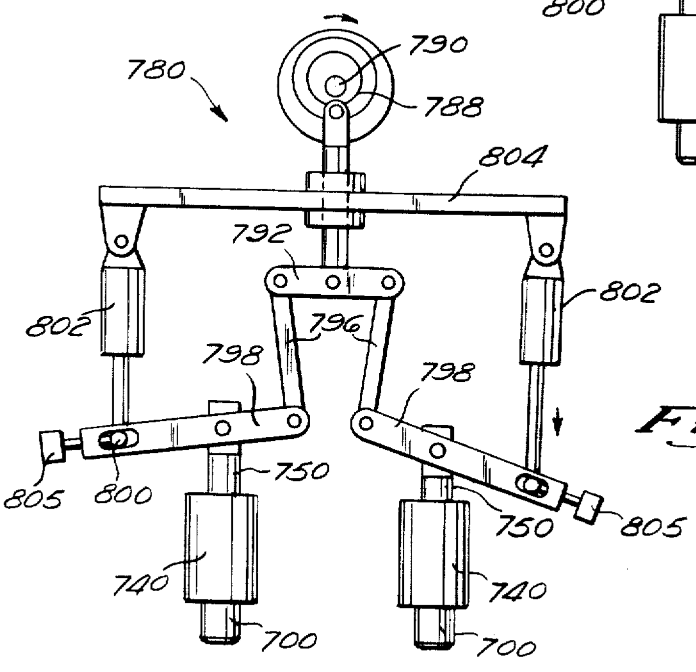
FIG. 55 is a schematic view of the operating and timing mechanism of FIG. 53 illustrating the position of the operating and timing mechanism in a no-fill mode.

Referring now to FIGS. 53 through 55, the detailed operation of the mechanism 780 may be described. In FIG. 53, the mechanism 780 is shown in its normal operating position, having previously completed a pump stroke and filling operation, wherein the piston 754 is extended to its lower-most position against the top surface of the nozzle 700 (as shown in FIG. 52). In this normal position, the pneumatic or hydraulic cylinders 802 are retracted to their upper-most position, thereby providing a rigid structure for the pivot point 800 of the rocker arm 798.

Referring now to FIG. 54, the operation of the mechanism 780 during the normal intake stroke of the metering pumps 740 is illustrated. In normal operation, the pneumatic cylinders 802 are pressurized to constantly remain retracted to their upper-most position as shown in FIG. 53 whereby the rotation of the cam 788 causes the cross-head 792 to raise in a vertical direction. Upon this vertical travel of the cross-head 792, the rocker arms 798 pivot about the points 800, which are rigidly maintained in a stationary position by pressure exerted upon the cylinders 802, thereby raising the pump pistons 754. As previously described, during this upward pump piston 754 travel, the incoming liquid opens the check valve 764 and fills the pumping chamber 746 (shown in FIG. 52) of the pumps 740.

Continued rotation of the cam 788 causes the cross-head 792 to reciprocate downward, thereby forcing the pump pistons 754 of the metering pump 740 in a downward direction, discharging the liquid contained therein through both nozzles 700.

It will be recognized that, since the vertical travel of the pistons 754 is dependent upon the ratio of the distances between each of the rocker arm end pivots 800 to the central pivots, minor adjustments on the pump stroke, and thus the pump displacement, can be independently facilitated by the limited travel of the adjustable pivot 800 along the respective rocker arm 798. As such, the displacement of each of the metering pumps 740 may be finely adjusted during operation simply by manually turning a respective thumb screw 805 positioned on the end of the rocker arms 798. Further, it will be recognized that to accommodate substantial differences in the metering pump 740 displacement, the cam 788 may be replaced with a larger cam having a greater degree of eccentricity.

Referring now to FIG. 55, the operation of the mechanism 780 in a no-fill mode is illustrated. To provide a no-fill mode for one or both of the metering pumps 740, upon completion of the pumping stroke of the metering pump 740 and prior to initiating the intake stroke of the metering pumps 740, the air pressure maintaining one or both of the air cylinders 802 in a retracted position is discontinued, and nominal air pressure is applied to the reverse side of the air cylinders 802. By this nominal reverse pressure, the air cylinders 802 function in a manner analogous to a shock absorber being biased and extending in a downward direction proportionately to the upward travel of the cross-head 792 and causing the pivot point 800 of the respective rocker arm 798 to travel vertically downward. By this downward vertical travel of the pivot point 800, the pump piston 754 does not rise with the cross-head 742, but rather is positively maintained at the bottom of its stroke against the top surface of the nozzle 700 (shown in FIG. 52). As such, the piston 754 fails to complete its intake stroke and fails to receive liquid for its discharge stroke. Subsequently, upon completion of the discharge stroke of the cross-head 792, the hydraulic cylinder 802 may be selectively pressured in a manner previously described and raised to its normal operating position for the continued pumping and discharge cycle.

In FIG. 55, this no-fill mode of the mechanism 780 is depicted wherein the right metering pump 740 is placed in a no-fill position (i.e., with the air cylinder 802 being biased in a downward direction) and the left metering pump 740 is placed in the normal position (i.e., with the air cylinder 802 retracted to its upper-most position). During the rotation of the cam 788 and the upward travel of the cross-head 792, the left metering pump 740 raises through its normal intake stroke whereas the right metering pump 740 is inhibited from moving upward by the proportional downward extension of the air cylinder 802. As such, only the left metering pump 740 receives a liquid charge during the intake stroke.

Further, upon the subsequent pumping stroke, the downward travel of the cross-head 792 overcomes the nominal reverse pressure exerted in the right air cylinder 802 thereby causing the right air cylinder 802 to raise upward proportionately to the downward travel of the cross-head 792. Thus, the right metering pump 740 is maintained in its bottomed position against the top surface of the right nozzle 700, while the left metering pump 740 discharges liquid through its respective nozzle 700 in a manner previously described. Thus, by reversing the pressure on a respective air cylinder 802, at the end of the preceding pumping stroke, the operator may selectively prohibit the subsequent filling operation occurring in individual nozzles 700 without effecting the operation of the remaining nozzle 700 connected to the mechanism 780.

It will be recognized that the cylinders 802 may be advantageously provided with a simple valving arrangement to actuate their operation which may be incorporated by a switch located on the operator's panel (not shown). Thus, the selective activation of the cylinders 802 may be easily accomplished by manually tripping the switch. Further, in the preferred embodiment, the mechanism 780 is connected to a carton blank electronic sensing device (not shown) provided on the conveyor 550. This electronic sensor, upon detecting the absence of a carton blank 100 upon the conveyor 550, automatically reverse pressurizes the air cylinder 802 such that the no-fill mode of a respective nozzle 700 is actuated.

In the preferred embodiment, both the pre-fill nozzles and the topper nozzles (shown in FIG. 1) are provided with their own operating and timing mechanism 780, with the topper nozzle having a cam 788 substantially smaller than the cam of the pre-fill nozzle such that the amount of liquid delivered through the topper nozzle is much less than the amount of liquid delivered through the pre-fill nozzles. Further, it will be recognized that, since in the preferred embodiment, there are four pre-fill nozzles and four topper nozzles, there will be two operating and timing mechanisms 780 for both the pre-fill and topper nozzles. Additionally, although in the preferred embodiment a mechanical operating and timing mechanism 780 is shown, it will be recognized that alternatively a hydraulic or pneumatic actuator connected to each of the pump pistons 750 including an appropriate metering valve system may be utilized without departing from the teachings of the present invention.

Work Station VII—End Closure and Bonding Apparatus

Subsequent to the filling operation occurring at Work Station VI, the carton blank 100, carried by the conveyor 550, is transported to Work Station VII, the End Closure and Bonding Station. At this station, the end closure panel 114 which heretofor has been extending vertically above the surface of the anvil 550, is folded over the open end of the carton blank 100, and then bonded and sealed to the sealing tabs 120 (shown in FIG. 3) to produce the sealed container 12 shown in FIG. 1A.

In the preferred embodiment, this bonding operation is facilitated by an ultrasonic welding process (previously described in reference to Work Station III), which significantly eliminates the production of vapors emitted from the polyethylene film which could contaminate the liquid contained within the carton blank 100 and additionally settles the adjacent sealing surfaces of the carton blank 100 into perfect alignment thereby insuring a positive seal.

Figure 56:
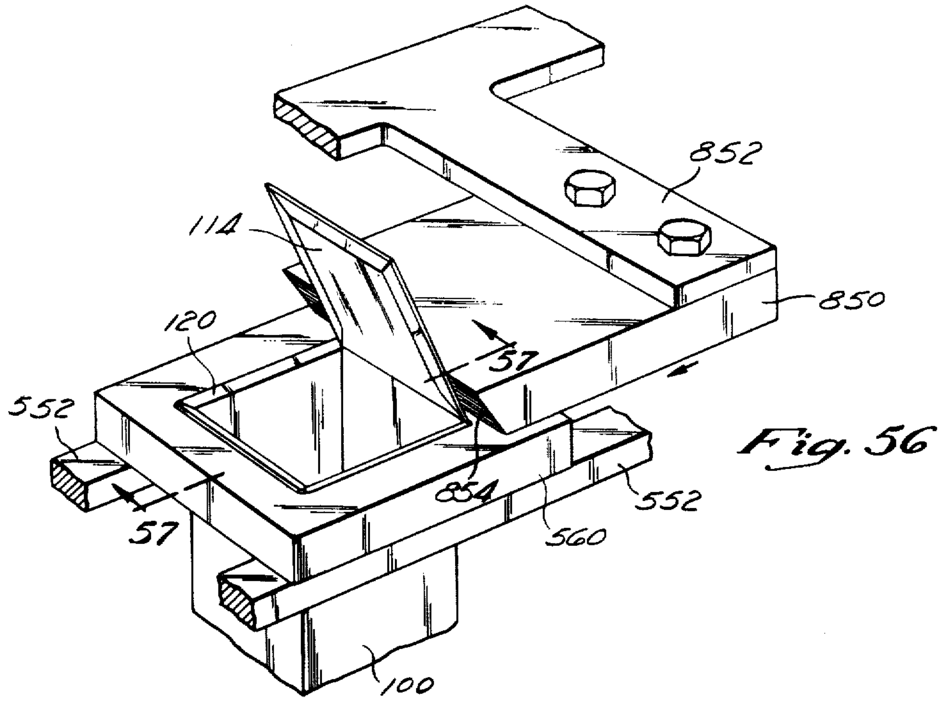
FIG. 56 is a perspective view of the camming plate mechanism of Work Station VII illustrating its interrelationships with the conveyor transport.
Figure 57:
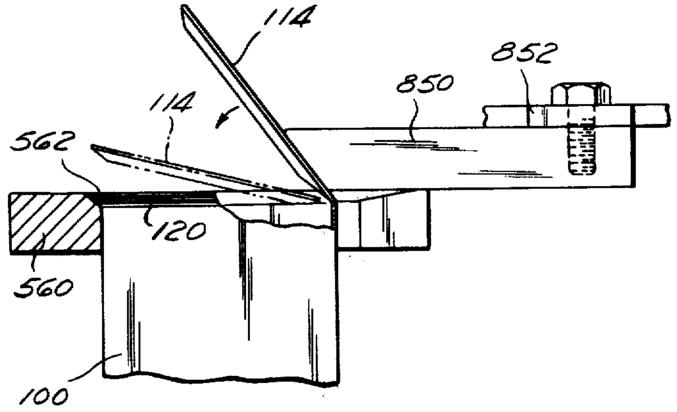
FIG. 57 is a cross-sectional view of the camming plate of FIG. 56 taken about lines 57—57 of FIG. 56.

Referring now to FIGS. 56 through 60, the apparatus comprising Work Station VII, the end closure and sealing apparatus, is illustrated. As shown in FIG. 56, the apparatus includes a camming plate 850 which is rigidly mounted to a linkage 852 and disposed slightly above the top surface of the anvil 560. The plate 850 is preferably formed of Teflon (a registered trademark of E. I. DuPont de Nemours) having a rectangular configuration, one edge 854 of which is tapered to provide a beveled or camming surface. Although, for illustration purposes, only one camming plate 850 is depicted in FIG. 56, it will be recognized that, in the preferred embodiment, four plates 850 are utilized being interconnected by the linkage 852, each being disposed adjacent a respective anvil 560 of the conveyor 550.

In operation, the carton blank 100 is transported by the intermittent cyclic drive of the conveyor 550 to a position, indicated in FIG. 56, wherein the anvil 560 resides adjacent the camming plate 850. In this position, the linkage 852 is activated, causing the linkage 852 to reciprocate in the direction shown by the arrow in FIG. 56, whereby the beveled edge 854 of the camming plate 850 contacts and extends over the end closure panel 114 of the carton blank 100 adjacent the top surface of the anvil 560. During this contact, the end closure panel 114 is urged in a downward direction as illustrated by the arrow in FIG. 57, whereby the end closure panel 114 is folded over between the lower surface of the plate 850 and the anvil 560 to reside slightly beneath the top surface of the anvil 560 (with the beveled panel 114 abutting the picture-frame-like sealing tabs 120.

As will be recognized, since the end closure panel 114 was previously creased by the pre-form apparatus of Work Station V to include a picture-frame-like beveled edge, during this fold-over process, the end closure panel 114 mates with the sealing tabs 120 of the carton blank 100 maintained against the beveled surfaces 562 formed along the top surface of the anvil 560. However, due to the moderate memory properties of the carton blank material, the end closure panel 114 tends to spring slightly upward away from the sealing tabs 120 after the operation of the camming plate 850, as depicted in phantom lines in FIG. 57. Thus, upon completion of the travel of the camming plate 850 across the end closure panel 114, the end closure panel 114 is substantially folded down upon the open end of the carton blank 100 and is pre-positioned for the subsequent sealing and bonding process.

Subsequently, the conveyor 550 continues its intermittent travel, thereby positioning the carton blank 100 beneath a sealing die or horn 860 (shown in FIG. 59) which, in the preferred embodiment, seals the perimeter of the end closure panel 114 onto the sealing tabs 120 of the carton blank 100. As best shown in FIG. 58, the sealing horn 860 is formed having a substantially square cross-sectional configuration and includes a beveled edge 862 formed adjacent its bottom surface, as well as a large radius 864 formed along its two frontal corners. The beveled surface 862 and the enlarged corner radii 864 tightly mate with the complementary surfaces 562 of the anvil 560 such that, when the horn 860 is lowered upon the anvil 560, the edges of the end closure panel 114 and the sealing tabs 120 are pressed tightly between the horn 860 and the anvil 560.

Referring to FIG. 59, the horn 860 is supported by a slider plate 861 disposed above the plane of the conveyor 550. The slider plate 861 is fabricated from two plate segments 861A and 861B which are maintained together by plural ball bearings (not shown) to permit the plate segments 861A and 861B to slightly move relative one another in a common plane. As shown, the horn 860 is mounted on the lower plate member 861B and is connected to an ultrasonic generator 866 which in turn is rigidly mounted to the lower plate member 861B. The slider plate 861 includes a pair of bushings 863 extending throughout the height of the slider plate 861 adjacent both ends thereof, which receive a pair of inclined posts 865. As shown, these posts 865 are rigidly mounted adjacent one end to a pair of support beams 867 extending transversely across the plane of the conveyor 550, and are angularly oriented to the vertical plane of the anvil 560. This angular orientation causes the die 860 to be located inboard of the end closure panel 114 of the carton blank 100 when maintained in its stored position, above the plane of the conveyor 550, as indicated in FIG. 59.

The slider plate 861 is additionally provided with a rigid extension 869 which protrudes adjacent the rear edge thereof, onto which is mounted a hydraulic or pneumatic actuator 871 connected to the housing of the apparatus (not shown). As will be recognized, by activating the hydraulic cylinder 871, the slider plate 861 reciprocates along the posts 865 in a direction shown by the arrows in FIG. 59, thereby lowering and raising the sealing horn 860 onto the end closure panel 114 of the carton blank 100.

In operation, the sealing horn 860 is lowered onto the end closure panel 114 of the carton blank 100, in an angular direction as indicated in FIG. 60. Due to the angular orientation of the posts 865 with respect to the anvil 560, upon contacting the end closure panel 114, the die base urges or cams the end closure panel 114 downward and toward the closed end of the anvil 560 such that the end closure panel 114 is properly seated upon the sealing tabs 120 of the carton blank 100 (as indicated in FIG. 58). As will be recognized, the sealing horn 860, being free to move in a plane normal to the inclined posts 865 due to the bearing interface of the slider plate segments 861A and 861B, self aligns itself with all three of the beveled recesses 562 of the anvil 560 thereby causing a wedging effect between end closure panels 114 and the sealing tabs 120.

While in this position, the beveled edges 862 and the enlarged corner radii 864 of the die 860 firmly press the peripheral edges of the end closure panel 114 tightly agaist the sealing tabs 120 of the carton blank 100 which are supported from their undersurface by the beveled edges of the anvil 560. Subsequently, the ultrasonic generator 866 is activated, causing the sealing die 860 to rapidly vibrate. This severe vibration results in the settling of the end closure panel 114 and the sealing tabs 120 into proper alignment with the small discontinuities or inconsistencies between the interfacing sealing surfaces being eliminated. Since the anvil 560 is maintained in a stationary position along the conveyor 550 and the lower surface of the sealing tabs 120 is gripped by the serrations 563 formed on the beveled recess 562 of the anvil 560 (shown in FIG. 50), this relative vibration of the sealing horn 860 against the anvil 560 generates heat exclusively along the peripheral edges of the sealing tab 120 and the end closure panel 114. This heat causes the polyethylene coating on the carton blank 100 to firmly bond the end closure panel 114 to the sealing tabs 120, thereby producing a liquid-tight seal for the carton blank 100, as illustrated in FIG. 58.

As previously mentioned, this ultrasonic welding process occurs in a matter of fractions of a second, whereupon, after the sealing of the end closure panel 114 to the sealing tabs 120 of the carton blank 100, the hydraulic cylinder 871 is deactivated, causing the slider plate 861 and the horn 860 to move angularly upward along the posts 865 and back to its initial position.

It will be recognized that alternative methods of sealing the end closure panel 114 to the sealing tab 120 may be utilized in the present invention. However, the applicant has found that, by use of the ultrasonic welding process, the liberation of fumes from the polyethylene substances is significantly eliminated and the polyethylene is heated exclusively adjacent the periphery of the end closure panel 114, thereby eliminating any possible damage to the coating on the remainder of the carton blank 100. Similarly, due to the severe vibration of the ultrasonic welding process, the tab 120 and end panel 114 is consistently aligned in proper position with voids or air pockets between the sealing surfaces being completely eliminated.

Work Station VIII—Filled Carton Ejector

With the liquid sealed within the carton blank 100, the final step to be performed on the apparatus 10 of the present invention is the ejection of the carton blank 100 from the conveyor 550. In the preferred embodiment, this ejection is accomplished in a simple yet effective maner at Work Station VIII (the Ejector Apparatus) wherein the filled and sealed carton blank 100 is expelled from the apparatus 10 through an aperture 901 formed in the housing 14 (as shown in FIG. 1).

Figure 61:
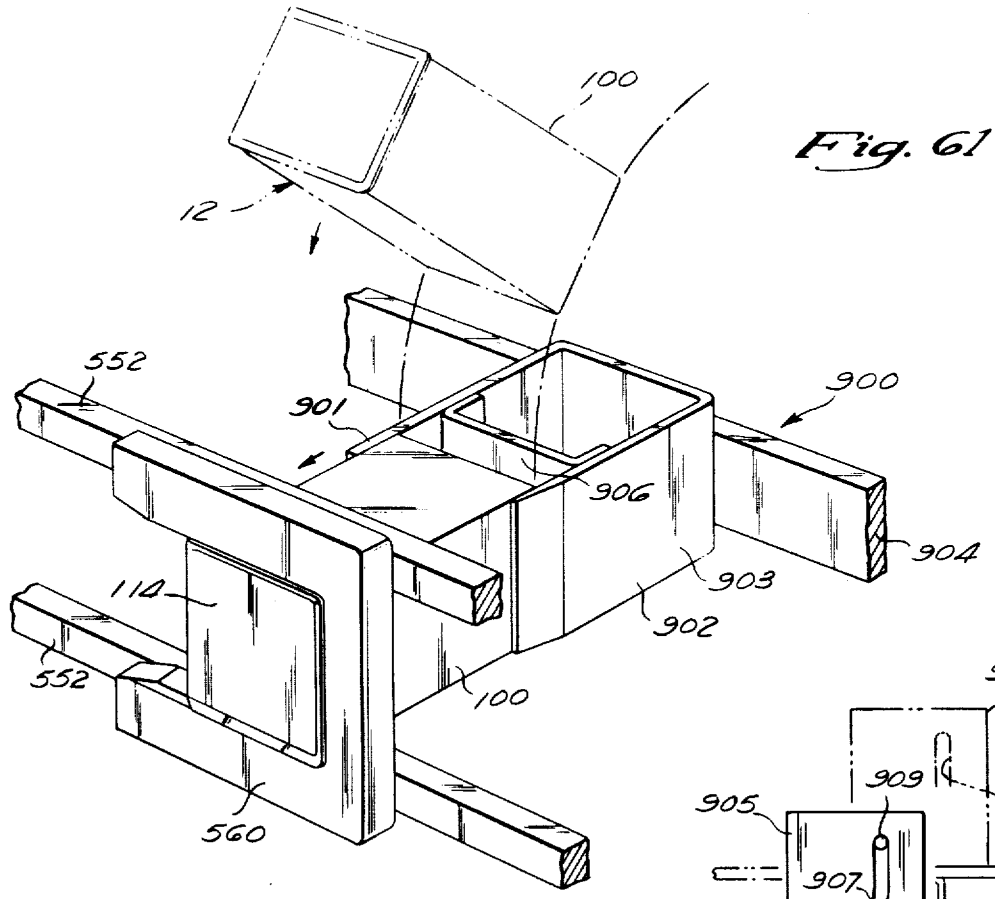
FIG. 61 is a perspective view of the ejector apparatus of Work Station VIII of the present invention disposed beneath the conveyor transport adjacent one end thereof.
Figure 63:
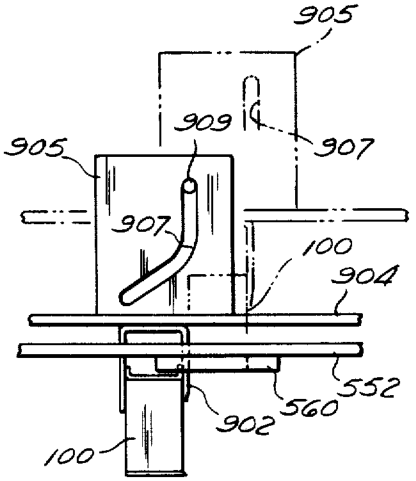
FIG. 63 is a plan view of the ejector apparatus of FIG. 61 illustrating the outward travel of the U-shaped fixture.
Figure 62:
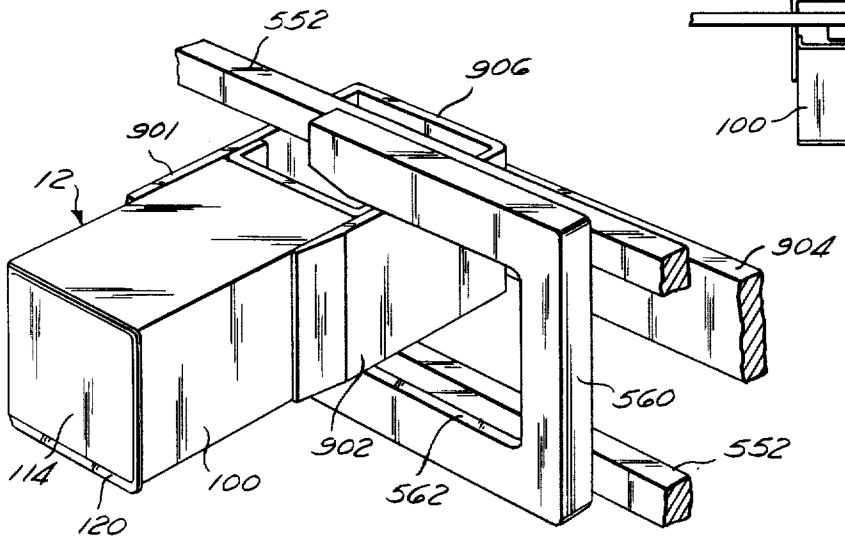
FIG. 62 is a perspective view of the ejector apparatus of FIG. 61 depicted in its final position wherein the carton blank is ejected from the conveyor transport.

Referring to FIGS. 61, 62, and 63, the ejector apparatus 900 of the present invention is illustrated. The apparatus 900 basically comprises a U-shaped fixture 902 which is rigidly mounted at one end to a linkage 904. As will be recognized, in the preferred embodiment four U-shaped fixtures 902 are symmetrically spaced along the linkage 904 such that all four of the filled and sealed carton blanks 100 contained on the conveyor 550 may be simultaneously ejected from the apparatus.

The common linkage 904 is rigidly attached to a cam plate 905 having a substantially J-shaped cam run 907 formed therein, which cooperates with a cam follower 909 rigidly attached to the housing (not shown) of the apparatus 10. The side walls of the U-shaped fixture 902 are preferably formed having differing lengths 901 and 903 and are spaced sufficiently apart from one another to slidingly receive a carton blank 100 therein. As will be recognized, the apparatus 900 is positioned beneath the upper horizontal surface of the conveyor 550 and is disposed proximal one end thereof to cooperate with the carton blanks 100 as the conveyor 550 begins its downward travel over the gear drive 561 (similar to the gear 561 shown in FIG. 39) and as it subsequently returns toward Work Station IV.

As shown in its stored position in FIG. 61 (this position corresponding to the phantom line of FIG. 63) when the conveyor 550 begins its downward travel over the gear drive 561, the U-shaped fixture 902 is aligned with the anvil 560 and carton blank 100 contained therein. As such, the carton blank 100 is received between the differing length side walls 901 and 903 of the U-shaped fixture 902. This downward movement of the conveyor 550 continues until the carton blank 100 is disposed in a parallel plane with the U-shaped fixture 902 (as indicated in FIG. 61) wherein the conveyor 550 momentarily remains stationary in the manner previously described.

While in this stationary position, the drive mechanism (not shown) connected to the linkage 904 is activated, causing the linkage 904 and the U-shaped fixture 902 to begin its outward movement toward the carton blank 100 in a direction indicated by the arrow in FIG. 61. As will be recognized, during this initial movement, the cam follower 909 travels through the short straight section of the cam run 907, thereby imparting only an outward component to the travel of the U-shaped fixture 902 (i.e., toward the anvil 560), which facilitates abutment of the rear panel 906 of the U-shaped fixture 902 against the lower end of the carton blank 100.

Further outward travel of the linkage 904 causes the U-shaped fixture 902 (following the cam run 907) to move further outward toward the anvil 560 and to simultaneously move transversely or horizontally across the plane of the anvil 560 (i.e., from right to left as viewed in FIG. 61), thereby causing the carton blank 100 to slide toward the open end of the anvil 560. This continued diagonal movement (i.e., outward and transverse) of the linkage 904 causes the carton blank 100 to be pushed forward through the anvil 560 and outward past the open end of the anvil into the position shown in FIG. 62. As will be recognized, this diagonal movement avoids interference between the relatively rigid carton corners and the anvil 560.

In this position, the carton blank 100 is no longer maintained in the slight interference fit of the anvil 560 and, due to the interior dimensions of the U-shaped fixture 902 being slightly greater than the distance across the carton segments 102 through 108 of the carton blank 100, the carton 100 may drop from the U-shaped fixture 902 and be carried away by an auxiliary packaging conveyor (not shown).

As will be recognized, by use of the ejector apparatus 900, the sides or carton blank segments 102 through 108 of the carton blank 100 are supported as they are pushed outward and through the anvil 560. The appicant has found that this support of the carton blank 100 during the ejection process eliminates any possibility of bending or deforming of the carton blank 100 which would occur during direct outward ejection of the carton blank 100 through the anvil opening 560. Further, the ejector apparatus 900 of the present invention automatically accommodates the differing sized containers produced by the apparatus 10 (i.e., $\frac{1}{2}$ pint and $\frac{1}{3}$ quart), with the decreased length of the smaller $\frac{1}{3}$ quart container being compensated by the initial travel of the U-shaped fixture 902 being exclusively in an outward direction which properly enters the carton within the fixture 902.

Summary

In summary, it will be recognized, that the apparatus and method of the present invention provides a significant improvement over the prior art apparatus by providing the increased versatility of producing dual-sized cartons without requiring drastic modification to the apparatus. In particular, to change from the one-half pint to one-third quart size container, the only modifications necessitated by the present invention are (1)the adjustment of the L-shaped alignment block 167 to tightly contact the smaller length of the carton blank segments 102 through 108, (2) the initial pre-loading of the differing sized carton blanks onto the conveyor loader 140 (of FIG. 5), (3) the pre-position of the stop 410 further outward upon the length of the anvil 402 to accommodate the shorter length of the carton segments 102 through 108 (as shown in FIG. 22), (4) the raising of the lower support members 569 of the conveyor 550 to the position indicated in FIG. 39, and (5) the adjustment of the pivot 800 of the timing and metering mechanism 800 to decrease the quantity of liquid discharged through the nozzle 700 (as shown in FIG. 41). As will be recognized, all of these minor adjustments may be accomplished in a matter of minutes, thereby easily facilitating the modification of the apparatus and method of the present invention to produce differing sized containers 12.

Further, it will be recognized that the present invention significantly eliminates the space, reliability, versatility, and output deficiencies associated in the prior art apparatus which heretofore have prevented the widespread use and adoption of the straw bearing cartons disclosed herein.

The significant reduction in required floor space was specifically addressed in each Work Station I–VIII of the present invention. In particular, the application of the straw element to the carton blank, as well as the sealing of the tape length to the carton blank, has been consolidated to be performed in sequential operation upon a single rotating drum. Additionally, the carton blank has been rotated through a 180° orientation upon completion of its travel through Work Station I, and returned to a position proximal its initial orientation upon the apparatus. Further, the mechanisms for collating, wrapping, and creasing the carton blank about the forming mandrels have been combined into a single mechanism with the plural forming mandrels being spaced from one another at a distance less than the effective length of the carton blanks 100. Additionally, this combined mechanism allows the collating and creasing of the carton blank to occur simultaneously.

By use of the crossbar mandrel 400 of Work Station III, the carton blanks have been sealed upon their side and one end without the use of a plurality of transport mechanisms. In addition, once the carton blanks have been inserted upon the conveyor transport 550, the remaining forming, filling, and sealing operations occur without relocating or transferring the carton blanks to a different support system.

The reliability benefits made possible by the present invention are additionally evident throughout each of the major sub-systems of the apparatus. In Work Stations I and II, the carton blank 100 has been continuously engaged by a pair of registry tabs adjacent the end panels 112 and 114, thereby insuring the proper alignment of the carton blank 100 upon the apparatus. As such, the sealing of the straw element and tape length to the carton blank, as well as the accuracy of the creasing and folding of the carton blank, has been maintained within positive limits. Further, the use of the conveyor transport 550 throughout Work Stations III–VIII significantly limits the possibility of misalignment through the remainder of the apparatus.

The significant increased output of the present invention over the prior art apparatus has been made possible by the use of both a serial and parallel track transport system which advantageously coincides the particular serial and parallel transport system with those operations which require the least and most operational time, respectively. Further, since the number of transfer mechanisms have been maintained to a minimum, the overall cycle time of the carton blanks through the apparatus of the present invention has been significantly reduced.

In addition, it should be noted that, throughout the disclosure, reference has been made to a main or common driving mechanism of the apparatus of the present invention to which all of the major sub-systems are synchronized. Although the details of this drive system have not been disclosed, it is well within the knowledge of one skilled in the art to install such a system and synchronize the operation of each of the various component systems disclosed herein with such a main drive.

I claim:

1. In an apparatus for fabricating a liquid-tight carton, a device for axially rotating a carton blank formed in a tubular configuration comprising:

a tubular fixture sized to receive said carton blank;

means connected to said fixture to selectively rotate said fixture between a first and second position; and a pair of arm members, one of said arm members inserting a carton blank into said fixture when said fixture is in said first position, and the other of said arm members ejecting said carton blank from said fixture when said fixture is in said second position;

an elongate aperture formed in said tubular fixture; and an actuator for sequentially circulating said arm members in a single direction along said elongate aperture.

2. The device of claim 1 further comprising:

means for selectively inserting and removing said arm members from said elongate aperture.

3. The device of claim 2 wherein said means for selectively inserting and removing said arm members from said elongate aperture simultaneously move said arm members in opposed directions.

4. In an apparatus for fabricating a liquid-tight carton, a device for axially rotating a carton blank formed in a tubular configuration comprising:

a tubular fixture sized to receive said carton blank;

means connected to said fixture to selectively rotate said fixture between a first and second position; and a pair of arm members, one of said arm members inserting a carton blank into said fixture when said fixture is in said first position, and the other of said arm members ejecting said carton blank from said fixture when said fixture is in said second position and wherein said pair of arm members are each attached to a respective slide mount reciprocal upon guide means disposed parallel to and displaced from the axis of said fixture.

5. The device of claim 4 wherein said pair of arm members are additionally pivotally mounted to each of said respective slider mounts for rotation about an axis parallel to the axis of said fixture.

* * * * *